(12) United States Patent
Perrelli et al.

(10) Patent No.: US 12,167,813 B2
(45) Date of Patent: Dec. 17, 2024

(54) PORTABLE SYSTEMS AND METHODS FOR ADJUSTING THE COMPOSITION OF A BEVERAGE

(71) Applicant: Cirkul, Inc., Tampa, FL (US)

(72) Inventors: Jonathon Perrelli, Leesburg, VA (US); Robert Lawson-Shanks, Reston, VA (US); Mark Lyons, Leesburg, VA (US)

(73) Assignee: Cirkul, Inc., Tampa, FL (US)

( * ) Notice: Subject to any disclaimer, the term of this patent is extended or adjusted under 35 U.S.C. 154(b) by 0 days.

(21) Appl. No.: 18/090,762

(22) Filed: Dec. 29, 2022

(65) Prior Publication Data

US 2023/0309739 A1    Oct. 5, 2023

Related U.S. Application Data

(63) Continuation of application No. 16/656,407, filed on Oct. 17, 2019, now abandoned, which is a
(Continued)

(51) Int. Cl.
*A47J 31/52* (2006.01)
*A45F 3/18* (2006.01)
(Continued)

(52) U.S. Cl.
CPC ............ *A47J 31/521* (2018.08); *A45F 3/18* (2013.01); *A47J 31/005* (2013.01);
(Continued)

(58) Field of Classification Search
CPC ............ B65D 81/3222; B65D 51/2807; B67D 1/0019; B67D 1/0078; A47J 31/521
See application file for complete search history.

(56) References Cited

U.S. PATENT DOCUMENTS

| D95,559 S | 5/1935 | Vogel |
| D97,347 S | 10/1935 | Gambell |

(Continued)

FOREIGN PATENT DOCUMENTS

| CN | 1942392 | 4/2007 |
| CN | 100575206 | 12/2009 |

(Continued)

OTHER PUBLICATIONS

Space Linear Acceleration Mass Measurement Device (SLAMMD); NASA Life Sciences Data Archive; https://lsda.jsc.nasa.gov/Hardware/hardw/963? / Date Jul. 15, 2004. (1 page).

(Continued)

*Primary Examiner* — Thien S Tran
(74) *Attorney, Agent, or Firm* — Wolf, Greenfield & Sacks, P.C.

(57) ABSTRACT

The systems and methods provide a container assembly comprising: a container having a known storage capacity for storing a liquid; an additive dispensing assembly, the additive dispensing assembly dispensing variable, non-zero quantities of one or more additives into the liquid stored in the container; one or more vessels that each contain one of the additives, of the one or more additives, to be dispensed into the liquid; and a gas dispensing assembly, the gas dispensing assembly releasing a gas into the liquid stored in the container, and the gas dispensing assembly including: an onboard gas tank; a valve assembly; and a gas outlet, and the valve assembly controlling flow of gas from the onboard gas tank, through the valve assembly, and to the gas outlet so as to output the gas into the liquid; and wherein the valve assembly, to perform the controlling the flow of gas, is movable between: an open position, in which flow of gas is allowed to flow from the onboard gas tank to the gas outlet;

(Continued)

and a closed position in which the flow of gas is prevented to flow from the onboard gas tank to the gas outlet.

20 Claims, 57 Drawing Sheets

Related U.S. Application Data continuation of application No. 16/157,062, filed on Oct. 10, 2018, now Pat. No. 10,512,358.

(51) Int. Cl.
*A47J 31/00* (2006.01)
*B01F 23/2361* (2022.01)
*B01F 35/22* (2022.01)
*B01F 101/14* (2022.01)
*B65D 51/28* (2006.01)
*B65D 81/32* (2006.01)
*B67D 1/00* (2006.01)

(52) U.S. Cl.
CPC .... *B01F 23/23611* (2022.01); *B01F 35/2205* (2022.01); *B65D 51/2807* (2013.01); *B65D 81/3222* (2013.01); *B67D 1/0016* (2013.01); *B67D 1/0019* (2013.01); *B67D 1/0078* (2013.01); *B01F 2101/14* (2022.01); *B67D 2210/00146* (2013.01)

(56) References Cited

U.S. PATENT DOCUMENTS

| | | |
|---|---|---|
| 2,071,399 A | 2/1937 | Gambell |
| 2,102,105 A | 12/1937 | Edward |
| 2,462,019 A | 2/1949 | Bowman |
| D157,486 S | 2/1950 | Glowacki |
| 2,682,355 A | 6/1954 | Robbins |
| 2,876,113 A | 3/1959 | Barton |
| 2,986,306 A | 5/1961 | Cocanour |
| D192,814 S | 5/1962 | Edwin |
| 3,319,637 A | 5/1967 | Gore |
| 3,506,460 A | 4/1970 | Bayne |
| 3,508,682 A | 4/1970 | Sherman et al. |
| 3,533,807 A | 10/1970 | Wakefield |
| 3,548,657 A | 12/1970 | Panerai |
| D225,364 S | 12/1972 | Antoni |
| 3,727,803 A | 4/1973 | Cobb |
| D242,132 S | 11/1976 | Hasegawa |
| 4,051,726 A | 10/1977 | Hastbacka |
| 4,087,024 A | 5/1978 | Martin |
| 4,125,187 A | 11/1978 | Vecchiotti |
| 4,133,457 A | 1/1979 | Klassen |
| 4,252,253 A | 2/1981 | Shannon |
| 4,278,186 A | 7/1981 | Williamson |
| 4,304,736 A | 12/1981 | McMillin et al. |
| 4,306,667 A | 12/1981 | Sedam et al. |
| 4,310,025 A | 1/1982 | Tracy |
| 4,316,409 A | 2/1982 | Adams |
| 4,354,806 A | 10/1982 | McMillin et al. |
| 4,359,432 A | 11/1982 | Sedam et al. |
| 4,376,496 A | 3/1983 | Sedam et al. |
| 4,450,722 A | 5/1984 | Keyes, IV |
| 4,481,986 A | 11/1984 | Meyers |
| D279,621 S | 7/1985 | Richer |
| 4,610,282 A | 9/1986 | Brooks |
| 4,655,124 A | 4/1987 | Child |
| 4,688,701 A | 8/1987 | Sedam |
| 4,728,006 A | 3/1988 | Drobish |
| D295,954 S | 5/1988 | Kirchhoff |
| D296,302 S | 6/1988 | Weber |
| 4,800,492 A | 1/1989 | Johnson |
| 4,827,426 A | 5/1989 | Patton |
| 4,840,291 A | 6/1989 | Merlin |
| 4,850,269 A | 7/1989 | Hancock et al. |
| 4,898,306 A | 2/1990 | Pardes |
| 4,909,417 A | 3/1990 | Ripley |
| 4,915,261 A | 4/1990 | Strenger |
| 4,938,387 A | 7/1990 | Kervefors |
| 4,964,541 A | 10/1990 | Gueret |
| 5,080,260 A | 1/1992 | Doring |
| 5,092,750 A | 3/1992 | Leroy et al. |
| 5,119,279 A | 6/1992 | Makowsky |
| 5,139,169 A | 8/1992 | Boyer |
| 5,165,569 A | 11/1992 | Furuhashi et al. |
| 5,174,458 A | 12/1992 | Segati |
| 5,182,084 A | 1/1993 | Plester |
| 5,192,513 A | 3/1993 | Stumphauzer et al. |
| D336,216 S | 6/1993 | Rohrbeck |
| 5,282,131 A | 1/1994 | Rudd |
| 5,325,765 A | 7/1994 | Sylvan |
| 5,344,034 A | 9/1994 | Eagan |
| D352,204 S | 11/1994 | Hayes |
| 5,377,877 A | 1/1995 | Brown |
| 5,379,916 A | 1/1995 | Martindale |
| 5,398,853 A | 3/1995 | Latham |
| 5,474,211 A | 12/1995 | Hellenberg |
| 5,531,254 A | 7/1996 | Rosenbach |
| D372,867 S | 8/1996 | Lambelet |
| 5,588,557 A | 12/1996 | Topar |
| 5,592,867 A | 1/1997 | Walsh et al. |
| D382,808 S | 8/1997 | Fenton |
| D383,383 S | 9/1997 | Prestia |
| 5,664,702 A | 9/1997 | Beauchamp |
| D387,992 S | 12/1997 | Kotoucek |
| 5,725,125 A | 3/1998 | Bessette |
| 5,747,824 A | 5/1998 | Jung |
| D396,603 S | 8/1998 | Gasser |
| 5,810,062 A | 9/1998 | Bonora |
| D399,098 S | 10/1998 | Yang |
| D400,050 S | 10/1998 | Littmann |
| D404,253 S | 1/1999 | Littmann |
| 5,890,624 A | 4/1999 | Klima et al. |
| 5,938,080 A | 8/1999 | Haaser |
| 5,960,701 A | 10/1999 | Reese |
| 5,967,367 A | 10/1999 | Orsborn |
| 6,077,579 A | 6/2000 | De Laforcade |
| 6,140,932 A | 10/2000 | Frank |
| 6,142,063 A | 11/2000 | Beaulieu |
| 6,170,712 B1 | 1/2001 | Kasboske |
| 6,230,884 B1 | 5/2001 | Coory |
| 6,230,923 B1 | 5/2001 | Hung |
| 6,372,270 B1 | 4/2002 | Denny |
| 6,422,422 B1 | 7/2002 | Forbes |
| 6,424,884 B1 | 7/2002 | Brooke, Jr. |
| 6,446,049 B1 | 9/2002 | Janning |
| 6,504,481 B2 | 1/2003 | Teller |
| 6,517,878 B2 | 2/2003 | Heczko |
| 6,520,070 B1 | 2/2003 | Heczko |
| 6,529,446 B1 | 3/2003 | de la Huerga |
| 6,574,575 B2 | 6/2003 | Deng |
| D477,791 S | 7/2003 | Wells |
| D478,073 S | 8/2003 | Topinka |
| 6,615,881 B2 | 9/2003 | Bartholomew |
| 6,644,471 B1 | 11/2003 | Anderson |
| 6,703,935 B1 | 3/2004 | Chung |
| 6,722,530 B1 | 4/2004 | King |
| 6,761,318 B2 | 7/2004 | Dudek |
| D499,603 S | 12/2004 | Nikkhah |
| D500,936 S | 1/2005 | Nikkhah |
| 6,889,872 B2 | 5/2005 | Herman |
| 6,921,911 B2 | 7/2005 | Siepmann |
| 6,925,871 B2 | 8/2005 | Frank |
| 6,935,493 B2 | 8/2005 | Cho |
| D514,385 S | 2/2006 | Smith |
| 7,004,213 B2 | 2/2006 | Hansen |
| D517,852 S | 3/2006 | Jalet |
| 7,009,519 B2 | 3/2006 | Leonard |
| 7,032,818 B2 | 4/2006 | Thomas |
| D522,860 S | 6/2006 | LaFortune |
| D523,332 S | 6/2006 | McEldowney |
| D525,135 S | 7/2006 | Bakic |
| 7,104,184 B2 | 9/2006 | Biderman |
| 7,107,838 B2 | 9/2006 | Chai |

(56) References Cited

U.S. PATENT DOCUMENTS

| | | |
|---|---|---|
| D529,340 S | 10/2006 | Laib |
| D530,968 S | 10/2006 | Bodum |
| D533,018 S | 12/2006 | Berg |
| 7,172,095 B2 | 2/2007 | Marshall |
| 7,196,624 B2 | 3/2007 | Teller |
| D541,106 S | 4/2007 | Spiegel |
| D541,596 S | 5/2007 | Hicks |
| 7,228,879 B2 | 6/2007 | Miller |
| 7,319,523 B2 | 1/2008 | Chiarello |
| D565,350 S | 4/2008 | Gauger |
| 7,387,239 B2 | 6/2008 | Thomas |
| D572,588 S | 7/2008 | Osborn |
| D573,464 S | 7/2008 | Kogure |
| 7,439,859 B2 | 10/2008 | Humphrey |
| D582,767 S | 12/2008 | Batton |
| 7,464,811 B2 | 12/2008 | Patterson |
| 7,501,933 B2 | 3/2009 | Rousso |
| D591,599 S | 5/2009 | Okin |
| D593,411 S | 6/2009 | Bizzell |
| D596,487 S | 7/2009 | Batton |
| 7,612,675 B2 | 11/2009 | Miller |
| 7,614,496 B2 | 11/2009 | Dvorak |
| D608,637 S | 1/2010 | Getsy |
| 7,661,561 B2 | 2/2010 | Ophardt et al. |
| D611,298 S | 3/2010 | Freeman |
| D613,183 S | 4/2010 | Overgaard |
| 7,710,567 B1 | 5/2010 | Mentzer |
| 7,715,277 B2 | 5/2010 | de la Huerga |
| D618,963 S | 7/2010 | Freeman |
| 7,762,181 B2 | 7/2010 | Boland |
| D621,283 S | 8/2010 | Overgaard |
| 7,798,373 B1 | 9/2010 | Wroblewski |
| 7,806,294 B2 | 10/2010 | Gatipon et al. |
| 7,825,804 B2 | 11/2010 | Malik |
| D634,157 S | 3/2011 | Hoff |
| D635,823 S | 4/2011 | Mauffette |
| D635,864 S | 4/2011 | Lee |
| D639,607 S | 6/2011 | Bracq |
| RE42,937 E | 11/2011 | Lasher |
| 8,083,055 B2 | 12/2011 | Simonian |
| D651,474 S | 1/2012 | Gut |
| 8,091,735 B2 | 1/2012 | Girard |
| 8,141,700 B2 | 3/2012 | Simonian |
| D658,982 S | 5/2012 | Pauser |
| D659,472 S | 5/2012 | D'Amato |
| 8,196,776 B2 | 6/2012 | Doglioni Majer |
| 8,210,396 B2 | 7/2012 | Girard |
| 8,240,508 B2 | 8/2012 | Wegelin |
| 8,302,795 B2 | 11/2012 | Van den Broek |
| 8,306,655 B2 | 11/2012 | Newman |
| 8,361,527 B2 | 1/2013 | Winkler |
| 8,378,830 B2 | 2/2013 | Moran |
| 8,397,519 B2 | 3/2013 | Loibl |
| 8,417,377 B2 | 4/2013 | Rothchild |
| 8,442,674 B2 | 5/2013 | Tilton |
| 8,463,447 B2 | 6/2013 | Newman |
| 8,464,633 B2 | 6/2013 | Anson |
| 8,485,359 B2 | 7/2013 | Anderson |
| D688,531 S | 8/2013 | Ceder |
| 8,515,574 B2 | 8/2013 | Studor |
| 8,519,824 B1 | 8/2013 | Rankin |
| 8,522,968 B2 | 9/2013 | Middleman |
| 8,523,837 B2 | 9/2013 | Wiggins |
| D690,990 S | 10/2013 | Boggs |
| D690,991 S | 10/2013 | Boggs |
| 8,556,127 B2 | 10/2013 | Olson |
| 8,584,691 B2 | 11/2013 | Hammonds |
| 8,584,840 B2 | 11/2013 | Kim |
| 8,590,753 B2 | 11/2013 | Marina |
| D699,106 S | 2/2014 | Glaser |
| D699,996 S | 2/2014 | De Leo |
| D700,008 S | 2/2014 | Ehrenhaus |
| 8,641,016 B2 | 2/2014 | Tatera |
| 8,678,183 B2 | 3/2014 | Jones |
| D702,474 S | 4/2014 | Scherer |
| 8,684,231 B2 | 4/2014 | Lane |
| 8,684,240 B2 | 4/2014 | Sauer et al. |
| 8,695,420 B1 | 4/2014 | Korman |
| 8,701,906 B1 | 4/2014 | Anderson |
| 8,717,182 B1 | 5/2014 | Brashears |
| 8,718,819 B2 | 5/2014 | Hyde |
| 8,751,037 B2 | 6/2014 | Peters |
| 8,754,769 B2 | 6/2014 | Stein |
| 8,757,227 B2 | 6/2014 | Girard |
| D709,387 S | 7/2014 | Marina |
| 8,794,485 B2 | 8/2014 | Lunn |
| 8,801,688 B2 | 8/2014 | Wiggins |
| 8,808,775 B2 | 8/2014 | Novak |
| 8,833,607 B2 | 9/2014 | Wegelin |
| 8,851,740 B1 | 10/2014 | Mills |
| 8,863,649 B1 | 10/2014 | Rao |
| 8,919,613 B2 | 12/2014 | Mileti |
| 8,940,163 B2 | 1/2015 | Bassett |
| 8,945,374 B2 | 2/2015 | Chase |
| 8,977,389 B2 | 3/2015 | Witchell |
| 8,979,539 B1 | 3/2015 | Snyder |
| 8,985,395 B2 | 3/2015 | Tansey |
| 8,989,673 B2 | 3/2015 | Sandy |
| 8,991,648 B2 | 3/2015 | Smith |
| D727,171 S | 4/2015 | Marina |
| 9,014,846 B2 | 4/2015 | Newman |
| 9,020,635 B2 | 4/2015 | Hortin |
| D729,571 S | 5/2015 | Wilson |
| 9,031,689 B1 | 5/2015 | Fink |
| 9,035,222 B2 | 5/2015 | Alexander |
| 9,035,765 B2 | 5/2015 | Engelhard |
| D731,242 S | 6/2015 | Machovina |
| D731,243 S | 6/2015 | Machovina |
| 9,051,162 B2 | 6/2015 | Peters |
| 9,102,441 B1 | 8/2015 | Orvik |
| 9,111,324 B2 | 8/2015 | Hyde |
| 9,126,738 B2 | 9/2015 | Boggs |
| 9,134,020 B1 | 9/2015 | Wells |
| 9,138,091 B2 | 9/2015 | Zhao |
| 9,151,605 B1 | 10/2015 | Sweeney |
| 9,161,654 B2 | 10/2015 | Belmont |
| 9,169,112 B2 | 10/2015 | Chase |
| D742,691 S | 11/2015 | Zhang |
| 9,174,777 B2 | 11/2015 | Defemme et al. |
| D746,046 S | 12/2015 | Lee |
| 9,230,923 B2 | 1/2016 | Lamy et al. |
| D748,955 S | 2/2016 | Oliver |
| 9,254,250 B1 | 2/2016 | Orofino |
| D751,865 S | 3/2016 | Harris |
| D752,391 S | 3/2016 | Hatherell |
| D752,396 S | 3/2016 | Tu |
| 9,290,309 B1 | 3/2016 | Pabon |
| D758,868 S | 6/2016 | Bretschneider |
| 9,357,887 B2 | 6/2016 | Wegelin |
| D760,537 S | 7/2016 | Hertaus |
| D768,507 S | 10/2016 | Hotell |
| 9,499,385 B1 | 11/2016 | Studor |
| 9,506,798 B2 | 11/2016 | Saltzgiver |
| 9,511,987 B2 | 12/2016 | Hayakawa |
| D779,881 S | 2/2017 | Lee |
| D813,049 S | 3/2018 | Richmond |
| 9,932,217 B2 | 4/2018 | Perrelli |
| D826,052 S | 8/2018 | Harris |
| 10,095,972 B2 | 10/2018 | Bhatia |
| 10,112,752 B2 | 10/2018 | Tonn |
| D836,385 S | 12/2018 | Arzunyan |
| D837,594 S | 1/2019 | Palese |
| 10,178,925 B2 | 1/2019 | Rithener |
| 10,231,567 B2 | 3/2019 | Perrelli |
| 10,314,320 B2 | 6/2019 | Roberts |
| 10,328,402 B2 | 6/2019 | Kolar |
| 10,363,530 B2 | 7/2019 | Kolar |
| D856,083 S | 8/2019 | Lawson-Shanks |
| 10,413,131 B2 | 9/2019 | Kolar |
| 10,489,868 B2 | 11/2019 | Long, II |
| 10,512,358 B1 | 12/2019 | Perrelli |
| 10,513,424 B2 | 12/2019 | Tansey, Jr. |
| D878,864 S | 3/2020 | Lawson-Shanks |
| 10,621,850 B2 | 4/2020 | Laidlaw |

(56) References Cited

U.S. PATENT DOCUMENTS

| | | |
|---|---|---|
| D887,769 S | 6/2020 | Lyons |
| 10,674,857 B2 | 6/2020 | Lyons |
| 10,758,077 B1 | 9/2020 | Wilkie |
| 10,765,252 B2 | 9/2020 | Perrelli |
| 10,863,852 B1 | 12/2020 | Lyons |
| 10,881,239 B2 | 1/2021 | Perrelli |
| 10,888,191 B1 | 1/2021 | Lyons |
| 10,889,424 B1 | 1/2021 | Lyons |
| 10,889,425 B1 | 1/2021 | Lyons |
| 10,889,481 B2 | 1/2021 | Perrelli |
| 10,889,482 B1 | 1/2021 | MacLean |
| 10,913,647 B2 | 2/2021 | Lyons |
| 10,934,150 B1 | 3/2021 | MacLean |
| 10,941,030 B1 | 3/2021 | Lyons |
| 10,947,102 B1 | 3/2021 | Lyons |
| 10,981,769 B2 | 4/2021 | Lyons |
| 10,981,772 B1 | 4/2021 | Lyons |
| 10,994,979 B1 | 5/2021 | Lyons |
| 11,001,487 B2 | 5/2021 | Lyons |
| 11,059,711 B1 | 7/2021 | Lyons |
| 11,337,533 B1 | 5/2022 | Perrelli |
| 2001/0025859 A1 | 10/2001 | Dumont |
| 2001/0032036 A1 | 10/2001 | Sudolcan |
| 2001/0054083 A1 | 12/2001 | Defosse |
| 2002/0070861 A1 | 6/2002 | Teller |
| 2002/0090426 A1 | 7/2002 | Denny |
| 2002/0129663 A1 | 9/2002 | Hoyt |
| 2003/0090892 A1 | 5/2003 | Su |
| 2003/0121937 A1 | 7/2003 | Black |
| 2003/0191558 A1 | 10/2003 | Arellano |
| 2004/0112070 A1 | 6/2004 | Schanin |
| 2005/0258082 A1 | 11/2005 | Lund et al. |
| 2005/0284302 A1 | 12/2005 | Levin |
| 2006/0011664 A1* | 1/2006 | Hammond ............ B67D 1/0412 222/400.7 |
| 2006/0061985 A1 | 3/2006 | Elkins |
| 2006/0081653 A1 | 4/2006 | Boland |
| 2006/0115570 A1 | 6/2006 | Guerrero |
| 2006/0191824 A1 | 8/2006 | Arett |
| 2006/0219858 A1 | 10/2006 | Iacovino |
| 2007/0024465 A1 | 2/2007 | Howell |
| 2007/0095859 A1 | 5/2007 | Maser |
| 2007/0114244 A1 | 5/2007 | Gatipon |
| 2007/0137643 A1 | 6/2007 | Bonney |
| 2007/0157576 A1 | 7/2007 | Till |
| 2007/0203587 A1 | 8/2007 | Erlandsson |
| 2007/0214055 A1 | 9/2007 | Temko |
| 2008/0023488 A1 | 1/2008 | Guerrero |
| 2008/0178749 A1 | 7/2008 | Stutman |
| 2008/0190958 A1 | 8/2008 | Wyner |
| 2009/0069930 A1 | 3/2009 | Peters |
| 2009/0069934 A1 | 3/2009 | Newman |
| 2009/0069947 A1 | 3/2009 | Newman |
| 2009/0069949 A1 | 3/2009 | Carpenter |
| 2009/0120815 A1 | 5/2009 | Mitchell |
| 2009/0205506 A1 | 8/2009 | Lin |
| 2009/0206084 A1 | 8/2009 | Woolf |
| 2009/0228367 A1 | 9/2009 | Hughes |
| 2009/0272274 A1 | 11/2009 | De Graaff |
| 2010/0024660 A1 | 2/2010 | Wallace |
| 2010/0040743 A1 | 2/2010 | Drost |
| 2010/0055252 A1 | 3/2010 | Marina |
| 2010/0125362 A1 | 5/2010 | Canora |
| 2010/0133222 A1 | 6/2010 | Mathiu |
| 2010/0145522 A1 | 6/2010 | Claesson |
| 2010/0163567 A1 | 7/2010 | Chiang |
| 2010/0183776 A1 | 7/2010 | Gruenwald |
| 2010/0219151 A1 | 9/2010 | Risheq |
| 2010/0242497 A1 | 9/2010 | Bertone |
| 2010/0316434 A1 | 12/2010 | Maxwell |
| 2010/0318221 A1 | 12/2010 | Wiemer |
| 2011/0006071 A1 | 1/2011 | Koumans |
| 2011/0024537 A1 | 2/2011 | Gonzalez |
| 2011/0036803 A1 | 2/2011 | Mejia |
| 2011/0049161 A1 | 3/2011 | Savinsky |
| 2011/0049195 A1 | 3/2011 | Russell |
| 2011/0050431 A1 | 3/2011 | Hood |
| 2011/0052764 A1 | 3/2011 | Bulgin |
| 2011/0060457 A1 | 3/2011 | De Vrught |
| 2011/0166910 A1 | 7/2011 | Marina |
| 2011/0180563 A1 | 7/2011 | Fitchett |
| 2011/0220106 A1 | 9/2011 | Ganem |
| 2011/0290677 A1 | 12/2011 | Simonian et al. |
| 2011/0290678 A1 | 12/2011 | Simonian et al. |
| 2011/0301768 A1 | 12/2011 | Hammonds |
| 2012/0017766 A1 | 1/2012 | Anson |
| 2012/0035761 A1 | 2/2012 | Tilton |
| 2012/0088022 A1 | 4/2012 | Carbone |
| 2012/0094261 A1 | 4/2012 | Hayn |
| 2012/0097567 A1 | 4/2012 | Zhao |
| 2012/0100275 A1 | 4/2012 | Bishop |
| 2012/0104023 A1 | 5/2012 | Anselmino |
| 2012/0156337 A1 | 6/2012 | Studor |
| 2012/0173164 A1 | 7/2012 | Steuerwald |
| 2012/0230149 A1 | 9/2012 | Martin |
| 2012/0234183 A1 | 9/2012 | Edwards |
| 2012/0267320 A1 | 10/2012 | Baccigalopi |
| 2012/0285985 A1 | 11/2012 | Jones |
| 2012/0298532 A1 | 11/2012 | Woolf |
| 2013/0001244 A1 | 1/2013 | Wegelin |
| 2013/0037506 A1 | 2/2013 | Wahlstrom |
| 2013/0043304 A1 | 2/2013 | Agan |
| 2013/0062366 A1 | 3/2013 | Tansey |
| 2013/0068772 A1 | 3/2013 | Durden |
| 2013/0082022 A1 | 3/2013 | Cronin |
| 2013/0085599 A1 | 4/2013 | Nicol |
| 2013/0089645 A1 | 4/2013 | Leung |
| 2013/0092567 A1 | 4/2013 | Lok |
| 2013/0127748 A1 | 5/2013 | Vertegaal |
| 2013/0139703 A1 | 6/2013 | Hogarth |
| 2013/0139893 A1 | 6/2013 | Anson et al. |
| 2013/0156903 A1 | 6/2013 | Bambeck |
| 2013/0156904 A1 | 6/2013 | Nosler |
| 2013/0186779 A1 | 7/2013 | Kambouris |
| 2013/0226337 A1 | 8/2013 | Leech |
| 2013/0240079 A1 | 9/2013 | Petrini |
| 2013/0247770 A1 | 9/2013 | Wilder |
| 2013/0319915 A1 | 12/2013 | Gellibolian |
| 2013/0325174 A1 | 12/2013 | Crisp |
| 2013/0334250 A1 | 12/2013 | Albaum |
| 2013/0340453 A1 | 12/2013 | Chan |
| 2013/0341395 A1 | 12/2013 | Chan |
| 2014/0004241 A1* | 1/2014 | Hatherell ................. A23L 2/54 261/150 |
| 2014/0034183 A1 | 2/2014 | Gross |
| 2014/0044837 A1 | 2/2014 | Weisman |
| 2014/0079856 A1* | 3/2014 | Hatherell ............ B67D 1/0406 426/477 |
| 2014/0110476 A1 | 4/2014 | Sheehan |
| 2014/0114469 A1 | 4/2014 | Givens |
| 2014/0150670 A1 | 6/2014 | Green |
| 2014/0154382 A1 | 6/2014 | Green |
| 2014/0166694 A1 | 6/2014 | Otto |
| 2014/0170279 A1 | 6/2014 | Kolls |
| 2014/0230659 A1 | 8/2014 | Waggoner et al. |
| 2014/0269154 A1 | 9/2014 | Kolar |
| 2014/0272019 A1 | 9/2014 | Schuh |
| 2014/0273925 A1 | 9/2014 | Burgett |
| 2014/0277707 A1 | 9/2014 | Akdogan |
| 2014/0303790 A1 | 10/2014 | Huang |
| 2014/0305952 A1 | 10/2014 | Harris |
| 2014/0312247 A1 | 10/2014 | McKee |
| 2014/0324585 A1 | 10/2014 | Mederos |
| 2014/0335490 A1 | 11/2014 | Baarman |
| 2014/0346063 A1 | 11/2014 | Woolf |
| 2014/0352843 A1 | 12/2014 | Solera et al. |
| 2014/0354438 A1 | 12/2014 | Hazen |
| 2014/0372045 A1 | 12/2014 | Keski-Pukkila |
| 2014/0374438 A1 | 12/2014 | Carpenter |
| 2015/0014369 A1 | 1/2015 | Hatton |
| 2015/0024349 A1 | 1/2015 | Bischoff |
| 2015/0053271 A1 | 2/2015 | Ko et al. |
| 2015/0060481 A1 | 3/2015 | Murray |
| 2015/0065587 A1 | 3/2015 | Ochoa et al. |

(56) References Cited

U.S. PATENT DOCUMENTS

| | | |
|---|---|---|
| 2015/0088304 A1 | 3/2015 | Ameye |
| 2015/0115158 A1 | 4/2015 | Fu |
| 2015/0060482 A1 | 5/2015 | Murray |
| 2015/0122688 A1 | 5/2015 | Dias |
| 2015/0128811 A1 | 5/2015 | Durairajasivam et al. |
| 2015/0173488 A1 | 6/2015 | Witchell |
| 2015/0175400 A1 | 6/2015 | Newman |
| 2015/0182797 A1 | 7/2015 | Wernow |
| 2015/0183627 A1 | 7/2015 | Tansey, Jr. |
| 2015/0223623 A1 | 8/2015 | Davis |
| 2015/0271582 A1 | 9/2015 | Cheng |
| 2015/0272394 A1 | 10/2015 | Lin |
| 2015/0284163 A1 | 10/2015 | Manwani |
| 2016/0055599 A1 | 2/2016 | Illy |
| 2016/0123786 A1 | 5/2016 | Hanna |
| 2016/0143474 A1 | 5/2016 | Wessels |
| 2016/0143583 A1 | 5/2016 | Jeukendrup et al. |
| 2016/0150914 A1 | 6/2016 | Waggoner et al. |
| 2016/0159632 A1 | 6/2016 | Wheatley |
| 2016/0174470 A1 | 6/2016 | Shaffer |
| 2016/0175785 A1 | 6/2016 | Li |
| 2016/0176696 A1 | 6/2016 | Hecht |
| 2016/0220973 A1 | 8/2016 | Kolar |
| 2016/0251234 A1 | 9/2016 | Hayslett |
| 2016/0257554 A1 | 9/2016 | Manwani |
| 2016/0286993 A1 | 10/2016 | Pau |
| 2016/0317985 A1 | 11/2016 | Mutschler |
| 2016/0325980 A1 | 11/2016 | Sawhney |
| 2016/0364814 A1 | 12/2016 | Yekutiely |
| 2016/0367072 A1 | 12/2016 | Boone |
| 2016/0376140 A1 | 12/2016 | Tansey |
| 2017/0000295 A1 | 1/2017 | Hanna |
| 2017/0066638 A1 | 3/2017 | Gatipon |
| 2017/0087524 A1 | 3/2017 | Deshpande |
| 2017/0088410 A1 | 3/2017 | Wing |
| 2017/0101298 A1 | 4/2017 | Renzi |
| 2017/0121165 A1 | 5/2017 | Gabrieli |
| 2017/0156540 A1 | 6/2017 | Wheatley |
| 2017/0186110 A1 | 6/2017 | Carpenter |
| 2017/0303744 A1 | 10/2017 | Sutton |
| 2017/0332829 A1 | 11/2017 | Kim |
| 2017/0335256 A1 | 11/2017 | Park |
| 2017/0347690 A1 | 12/2017 | Benedetti |
| 2017/0353820 A1 | 12/2017 | Chiang |
| 2017/0361984 A1 | 12/2017 | Fouad |
| 2017/0367522 A1 | 12/2017 | Ackel |
| 2018/0020875 A1 | 1/2018 | Kolar |
| 2018/0029859 A1 | 2/2018 | Hevia |
| 2018/0042258 A1 | 2/2018 | Roberts |
| 2018/0044157 A1 | 2/2018 | Cohen |
| 2018/0049582 A1 | 2/2018 | Rehfuss |
| 2018/0059790 A1 | 3/2018 | Kolar |
| 2018/0072460 A1 | 3/2018 | Wolfson |
| 2018/0072553 A1 | 3/2018 | Lyons |
| 2018/0099850 A1 | 4/2018 | Lyons |
| 2018/0129360 A1 | 5/2018 | Suh |
| 2018/0129379 A1 | 5/2018 | Suh |
| 2018/0129380 A1 | 5/2018 | Suh |
| 2018/0132507 A1 | 5/2018 | Siegel |
| 2018/0168385 A1 | 6/2018 | Boone |
| 2018/0177325 A1 | 6/2018 | Lyons |
| 2018/0178957 A1 | 6/2018 | Zalewski |
| 2018/0186528 A1 | 7/2018 | Tonn |
| 2018/0208447 A1 | 7/2018 | Perrelli |
| 2018/0344070 A1 | 12/2018 | Perrelli |
| 2019/0001288 A1 | 1/2019 | Ciepiel |
| 2019/0015803 A1 | 1/2019 | Goodson |
| 2019/0060849 A1 | 2/2019 | Waggoner |
| 2019/0185311 A1 | 6/2019 | Karol |
| 2019/0208948 A1 | 7/2019 | Perrelli |
| 2019/0254465 A1 | 8/2019 | Di Maria |
| 2019/0300355 A1 | 10/2019 | Pappas |
| 2020/0010257 A1 | 1/2020 | Lubbe |
| 2020/0031654 A1 | 1/2020 | Wing |
| 2020/0031656 A1 | 1/2020 | Rudick |
| 2020/0079637 A1 | 3/2020 | Kaplita |
| 2020/0095108 A1 | 3/2020 | Cook |
| 2020/0113374 A1 | 4/2020 | Perrelli |
| 2020/0115122 A1 | 4/2020 | Golden |
| 2020/0122992 A1 | 4/2020 | Lyons |
| 2020/0156020 A1 | 5/2020 | Waggoner et al. |
| 2020/0156922 A1 | 5/2020 | Lee |
| 2020/0165550 A1 | 5/2020 | Lee |
| 2020/0181559 A1 | 6/2020 | Kim |
| 2020/0205615 A1 | 7/2020 | Pamplin |
| 2020/0247661 A1 | 8/2020 | Rao |
| 2020/0242910 A1 | 9/2020 | Laidlaw |
| 2021/0007533 A1 | 1/2021 | Lyons |
| 2021/0316978 A1 | 10/2021 | Lyons |
| 2021/0340000 A1 | 11/2021 | Lyons |
| 2021/0347627 A1 | 11/2021 | Maclean |
| 2022/0016581 A1 | 1/2022 | Waggoner et al. |
| 2022/0039586 A1 | 2/2022 | Lyons |
| 2022/0259034 A1 | 8/2022 | Mullenaux |

FOREIGN PATENT DOCUMENTS

| | | |
|---|---|---|
| DE | 3428178 | 2/1986 |
| EP | 0258057 | 3/1988 |
| EP | 1793326 | 6/2007 |
| EP | 1671568 | 1/2008 |
| GB | 860987 | 2/1961 |
| KR | 20110007327 | 1/2011 |
| WO | WO 2008 / 111072 | 9/2008 |
| WO | WO 2016/081387 | 5/2016 |
| WO | WO 2016/090235 | 6/2016 |
| WO | WO 2016201305 | 12/2016 |
| WO | WO 2017/085073 | 5/2017 |
| WO | WO 2020/077137 | 4/2020 |

OTHER PUBLICATIONS

Low-Cost Seltzer Fanatics Hack Their SodaStream Machines, Grind, Kirsten, et al., The Wall Street Journal, Dow Jones Institutional News ; New York [New York] Sep. 21, 2018, (3 pages).

Physiology of nutritive sucking in newborns and infants; Mario Enrique Rendon Macias et al.; Bol Med Hosp Infant Mex 2011;68(4)—pp. 296-303; vol. 68, Jul.-Aug. 2011 (8 pages).

Sucking pressure and its relationship to milk transfer during breastfeeding in humans (Abstract); C R Prieto et al.; https://pubmed.ncbi.nim.nih.gov/8958830; Sep. 1996 (1 page).

A method of measuring sucking behavior of newborn infants; Reuben E. Kron et al. (John Lacey—editor); Psychosomatic Medicine: Journal of Biobehavioral Medicine—vol. XXV, No. 2, 1963, pp. 181-191 (11 pages).

Voltage—Confused with diodes and conventional vs real current flow; Stack Exchange Network: Electrical Engineering; https://electronics.stackexchange.com/questions/483777/confused-with-diodes-and-conventional-vs-real-current-flow ; Post date: Feb. 29, 2020 (8 pages).

Diode Bridge—Wikipedia; https://en.wikipedia.org/wiki/Diode_bridge ; Edit date: Jul. 26, 2020 (6 pages).

International Search Report and Written Opinion mailed Nov. 5, 2019 in connection with International Application No. PCT/US2019/055704.

International Preliminary Report on Patentability mailed Apr. 22, 2021 in connection with International Application No. PCT/US2019/055704.

Invitation to Pay Additional Fee mailed Oct. 6, 2021 in connection with International Application No. PCT/US21/41887.

International Search Report and Written Opinion mailed Dec. 23, 2021 in connection with International Application No. PCT/US21/41887.

International Preliminary Report on Patentability mailed Jan. 26, 2023 in connection with International Application No. PCT/US21/41887.

[No Author Listed], How to Clean a Draft Beer Tap Keg Coupler. Youtube.com, Leaders Beverage, Aug. 6, 2014;1 page. (https://www.youtube.com/watch?v=LmtdkjdEq1E) 0:00-6:03.

(56) References Cited

OTHER PUBLICATIONS

[No Author Listed], Inspection Keg 1/2 BBL. GW Kent, Mar. 24, 2017; 3 pages. (https://web.archive.org/web/20170424051250/http://www.gwkent.com/inspection-keg.html).

* cited by examiner

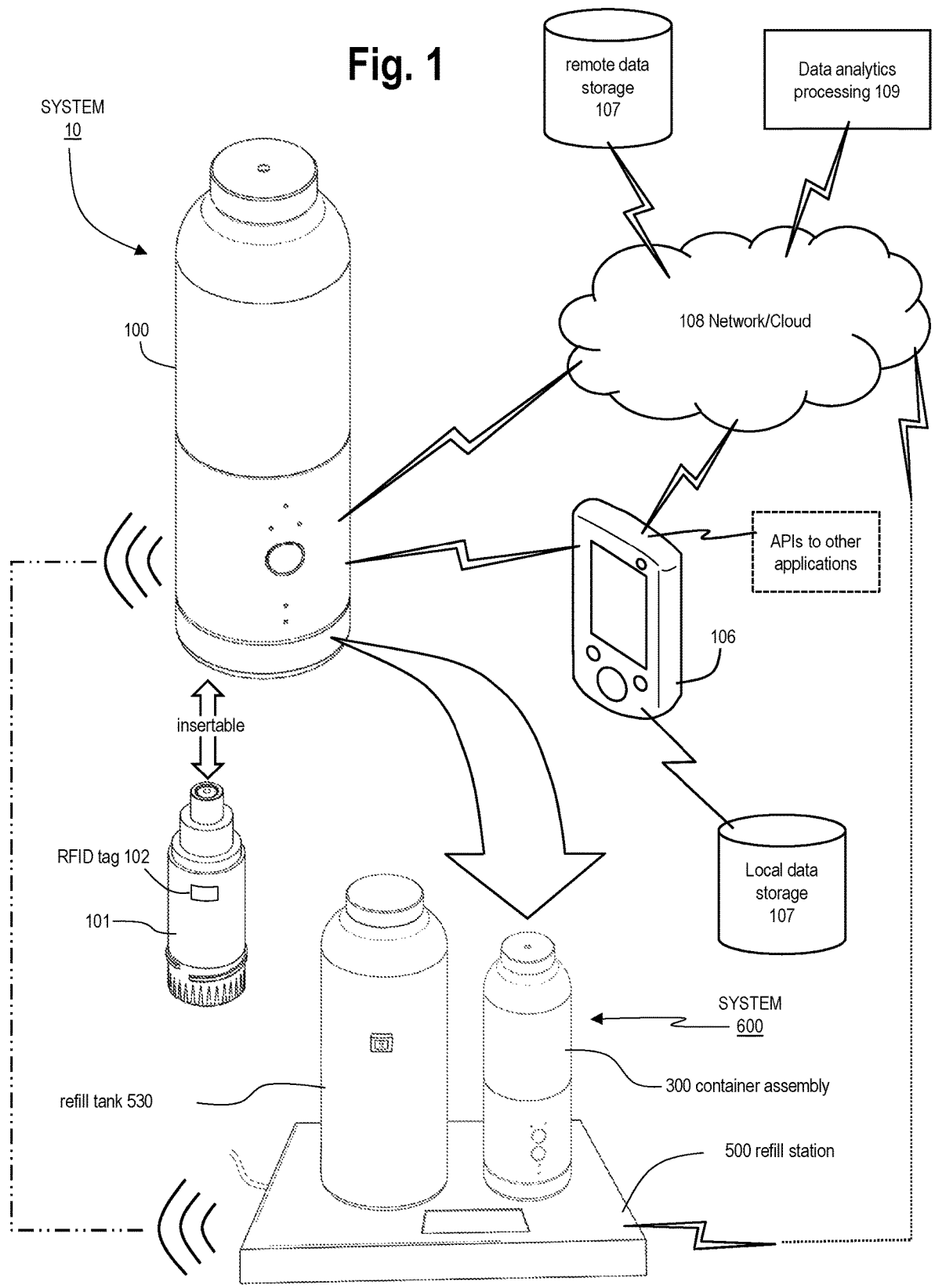

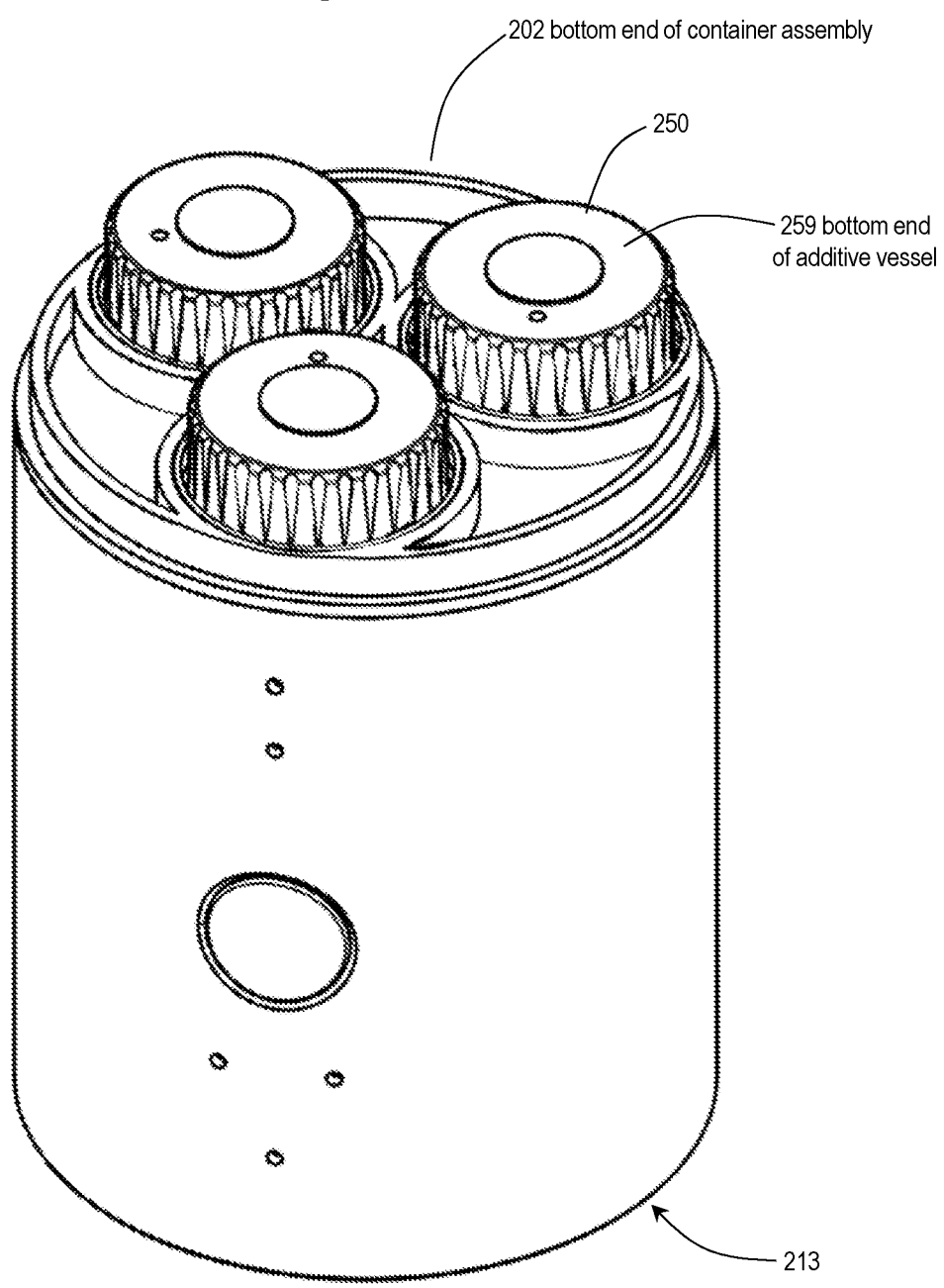

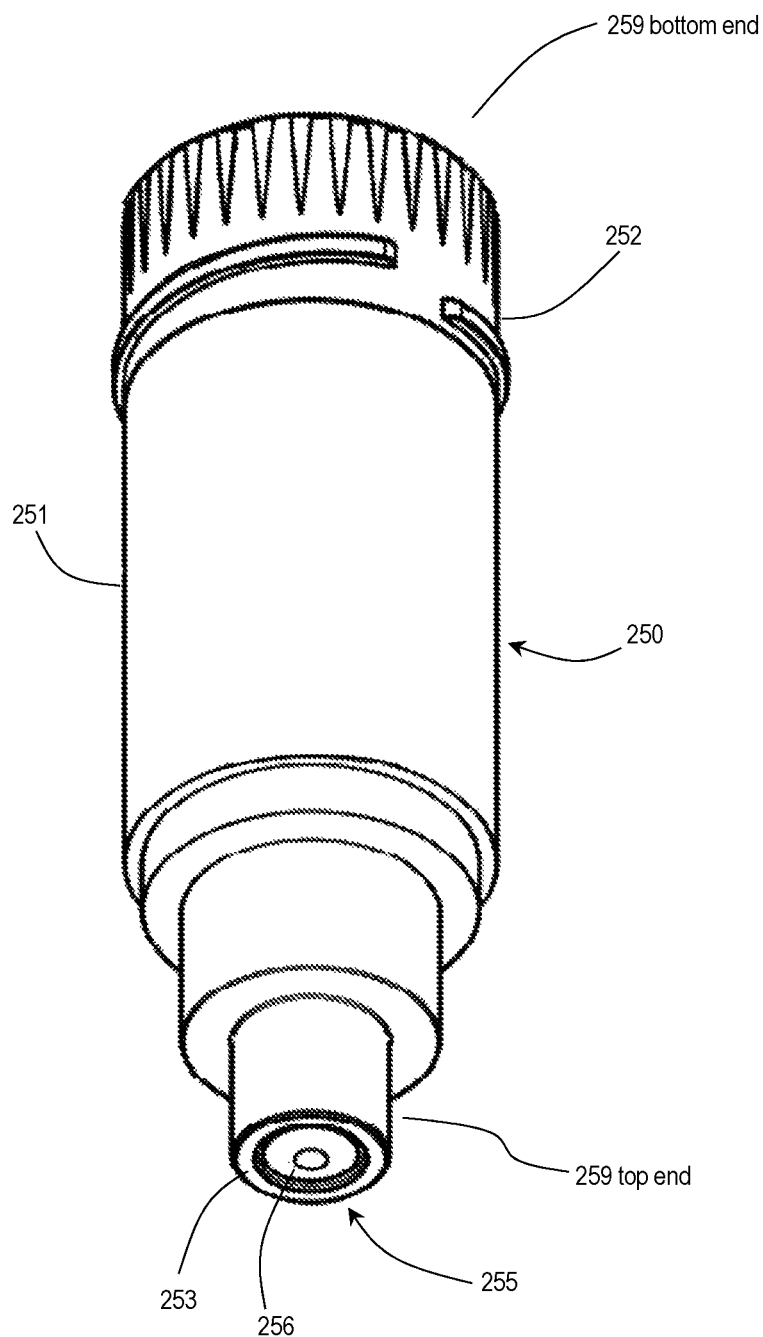

286
258 top end 286
258 top end

Fig. 15A Fig. 15B
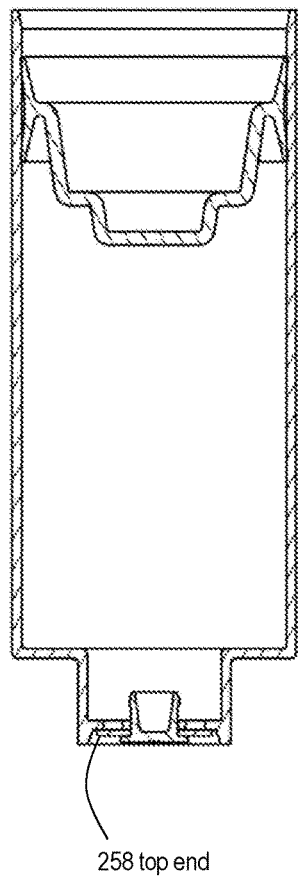
258 top end
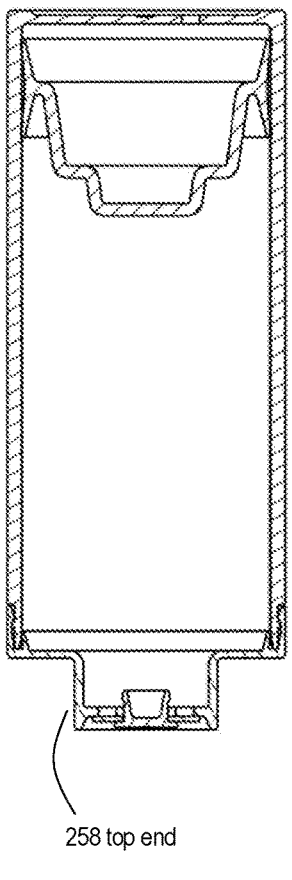
258 top end
Fig. 15C Fig. 15D
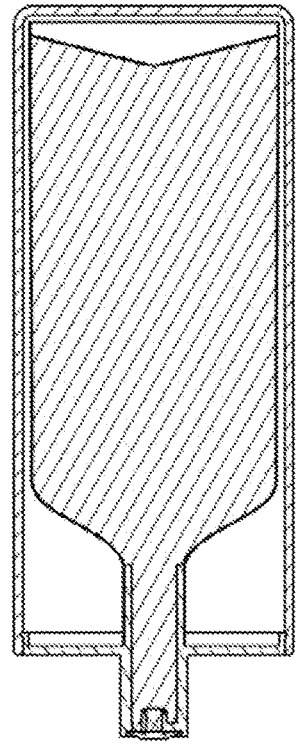 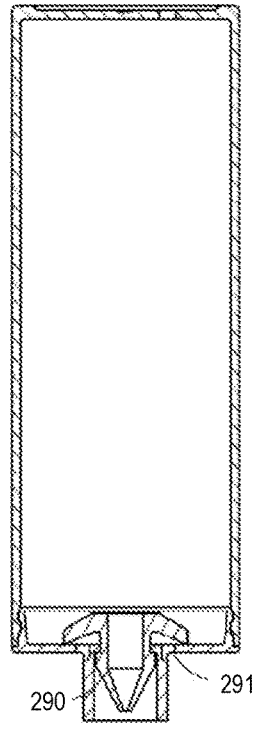
290  291

(cross section view from Fig. 21)

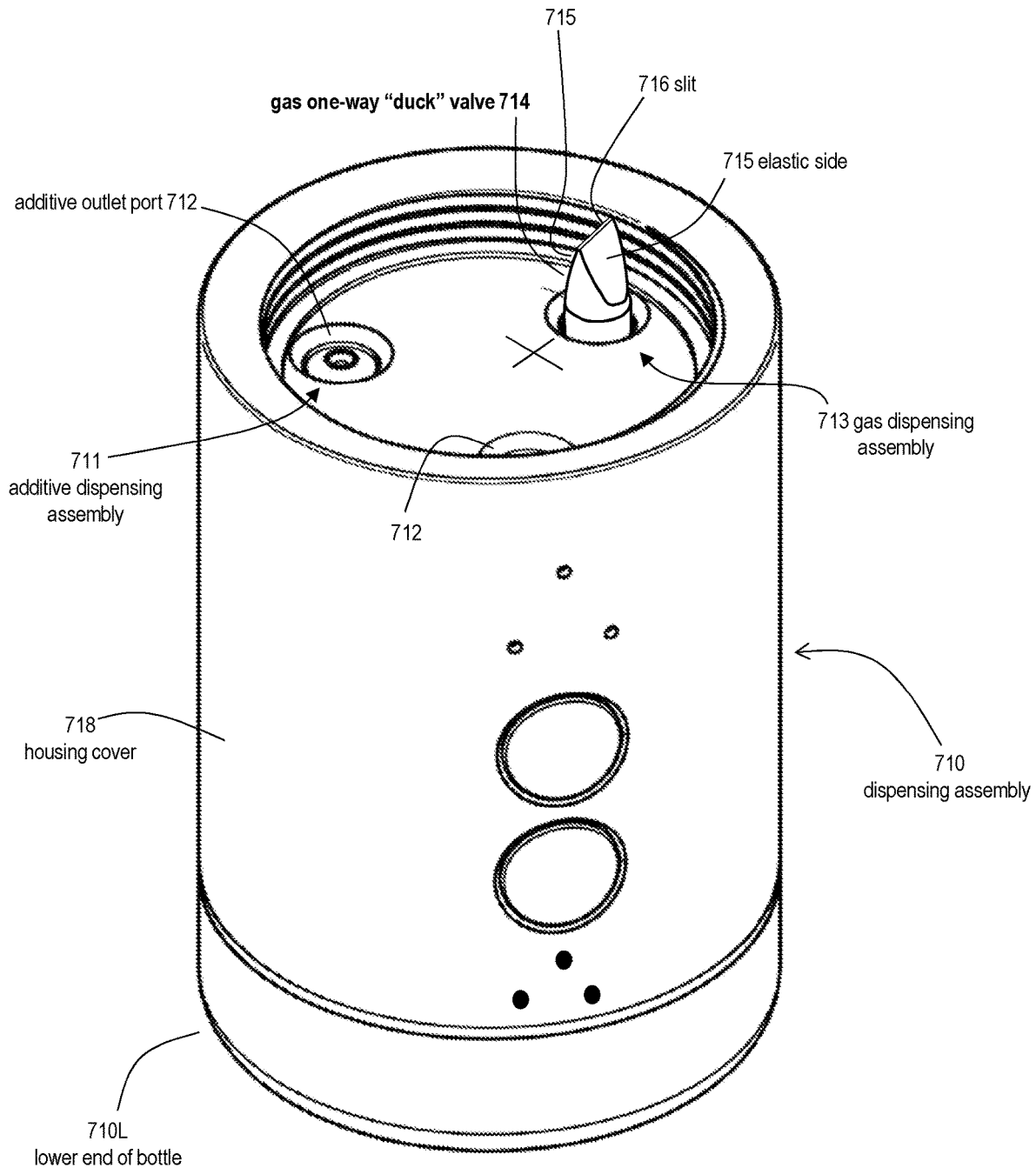

Fig. 43

900 System performs processing to control dispersion of gas

901 System performs processing to monitor for trigger event

910 Is user input received that dictates a dispersion of gas?

930 Is there a dispersion of additive event? (e.g. activation of motor or detected signal)

yes yes

920 Perform dictated action

940 Perform processing to determine if event is actionable to disperse gas (see Fig. 44)

Fig. 46

4600 Data record for gas dispense

| Monitor for dispense of Additive | Associated gas dispense enabled? | Lag Time | Duration | Strength |
|---|---|---|---|---|
| Additive 4546 | Yes | 0.1 sec | .02 sec | Low |
| Additive 4547 | Yes | 0.1 sec | .03 sec | High |
| Additive 4600 | No | 0.2 sec | .02 sec | Low |

4601

PORTABLE SYSTEMS AND METHODS FOR ADJUSTING THE COMPOSITION OF A BEVERAGE

RELATED APPLICATIONS

This application claims priority to and is a continuation of U.S. application Ser. No. 16/656,407 filed Oct. 17, 2019, which is incorporated herein by reference in its entirety.

Such U.S. application Ser. No. 16/656,407 claims priority to and is a continuation of U.S. application Ser. No. 16/157,062 filed Oct. 10, 2018, which is incorporated herein by reference in its entirety.

BACKGROUND

Portable refillable bottles and other containers used for water and other beverages are widely used and are important for health and hydration. Such bottles and containers are used with increasing frequency to consume functional ingredients, such as, for example, energy, protein, and sleep supplements. However, one limitation of such bottles and hydration containers is that the consumable contents remain constant and unchanged except for changes in quantity as the contents (frequently, but not exclusively water) are consumed and subsequently replenished.

Other problems and limitations exist with known bottles.

SUMMARY OF THE DISCLOSURE

The systems and methods provide a container assembly comprising: a container having a known storage capacity for storing a liquid; an additive dispensing assembly, the additive dispensing assembly dispensing variable, non-zero quantities of one or more additives into the liquid stored in the container; one or more vessels that each contain one of the additives, of the one or more additives, to be dispensed into the liquid; and a gas dispensing assembly, the gas dispensing assembly releasing a gas into the liquid stored in the container, and the gas dispensing assembly including: an onboard gas tank; a valve assembly; and a gas outlet, and the valve assembly controlling flow of gas from the onboard gas tank, through the valve assembly, and to the gas outlet so as to output the gas into the liquid; and wherein the valve assembly, to perform the controlling the flow of gas, is movable between: an open position, in which flow of gas is allowed to flow from the onboard gas tank to the gas outlet; and a closed position in which the flow of gas is prevented to flow from the onboard gas tank to the gas outlet.

BRIEF DESCRIPTION OF THE DRAWINGS

These and other objects, features, advantages, and characteristics of the present disclosure will become more apparent to those skilled in the art upon consideration of the following Detailed Description, taken in conjunction with the accompanying claims and drawings, all of which form a part of the present disclosure. In the drawings:

FIG. 1 is a block diagram illustrating an example high-level hydration ecosystem with gas recharge base according to one or more embodiments described herein.

FIG. 4A illustrates a bottom view of the dispensing assembly with a base cover removed and with additive vessels in accordance with one or more embodiments.

FIG. 5A illustrates an isometric perspective view of an additive container in accordance with one embodiment in accordance with one or more embodiments.

FIGS. 15A-15D illustrate different configurations of containers, vessels or pods for liquid additives that can be used in accordance with various embodiments.

FIG. 38A is a perspective view of a dispensing assembly with "duck valve" for dispensing of gas, in accordance with at least one embodiment.

FIG. 43 is a flowchart showing processing performed by a computer processing portion of the system, in accordance with one or more embodiments

FIG. 46 is an illustrative data record, in accordance with one or more embodiments.

Figure 2A:
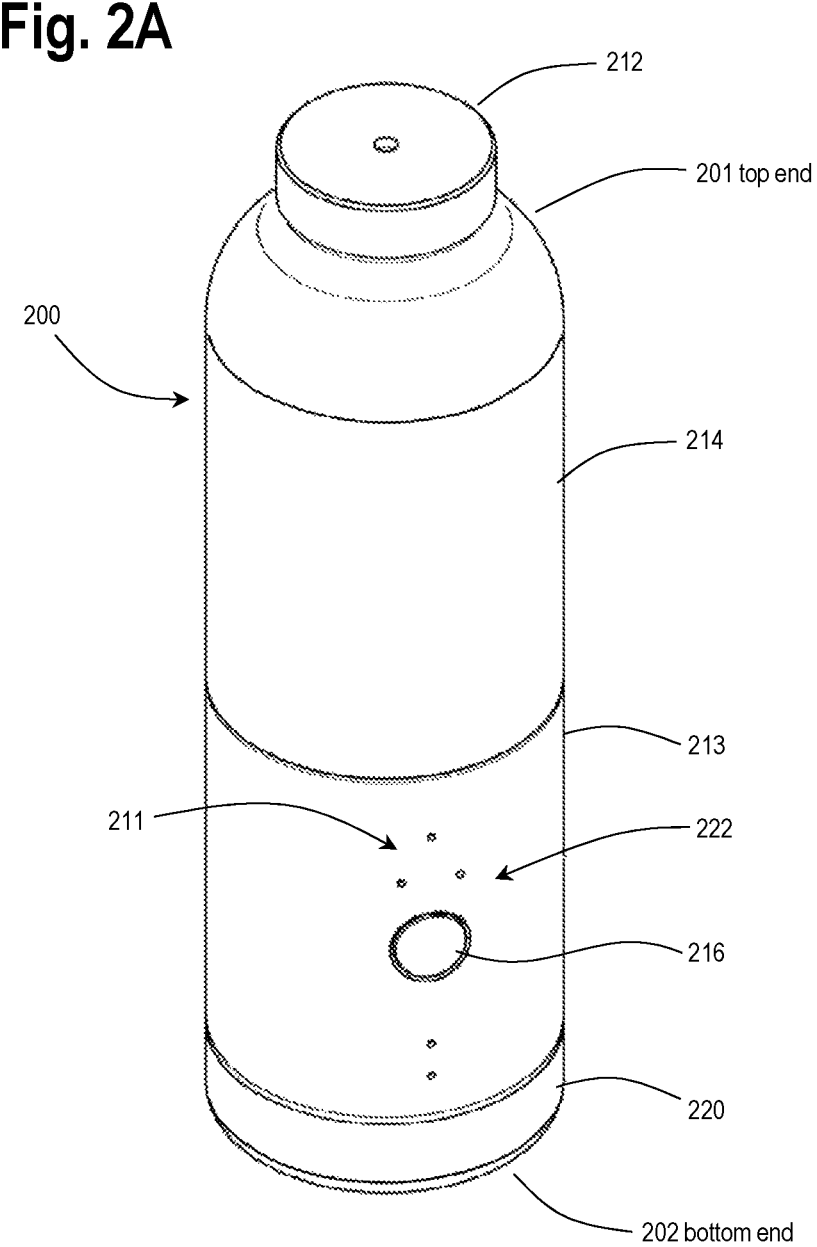
FIG. 2A illustrates a beverage container assembly in accordance with one or more embodiments.

The headings provided herein are for convenience only and do not necessarily affect the scope or meaning of what is claimed in the present disclosure.

In the drawings, same reference numerals and acronyms have been used to identify same or similar structure, components or functionality for ease of understanding and convenience.

DETAILED DESCRIPTION OF THE DISCLOSURE

In the following description, references are made to various embodiments in accordance with which the disclosed subject matter can be practiced. Multiple references to "one embodiment" or "an embodiment" do not necessarily refer to the same embodiment. Particular features, structures or characteristics associated with such embodiments can be combined in any suitable manner in various embodiments. Various examples and embodiments will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include many other obvious features not described in detail herein. Additionally, some well-known structures or functions may not be shown or described in detail below, so as to avoid unnecessarily obscuring the relevant description.

In one or more embodiments, the disclosure provides a container assembly that includes a gas dispensing assembly. The gas dispensing assembly can release gas into liquid stored in the container assembly. The container assembly can include a container having a known storage capacity for liquid or beverage. The container assembly can also include an additive dispensing assembly. The additive dispensing assembly can dispense variable, non-zero quantities of one or more additives into the liquid or beverage stored in the container. The container assembly can also include one or more vessels or additive vessels. Such additive vessels can contain one or more additives to be dispensed into the liquid. The gas dispensing assembly can include an onboard gas tank, a valve assembly, and a gas outlet. The valve assembly can control the flow of gas from the onboard gas tank, through the valve assembly, and to the gas outlet. As a result, gas is input into the liquid or beverage stored or contained in the container assembly. The valve assembly can be provided to control the flow of gas from the onboard gas tank into the liquid or beverage.

The valve assembly can be movable between an open position, in which flow of gas is allowed to flow from the onboard gas tank to the gas outlet, to a closed position in which such flow of gas is prevented or stopped.

FIGS. 2-16, and the description referring thereto, set forth various features of illustrative container assemblies of the disclosure. Various features are also described herein relating to gas dispensing in a container assembly. It is appreciated that various features of different embodiments of the disclosure can be combined as desired.

The present disclosure generally relates to hydration systems, methods, and apparatuses. More specifically, aspects of the present disclosure relate to a portable and non-portable hydration container that periodically fully or partially dispenses additives and/or gas into a liquid consumable or other solute within the container in continuously variable volumes or concentrations.

One embodiment of the present disclosure relates to a portable, self-contained beverage apparatus comprising: a container assembly having a known storage capacity for storing a consumable liquid; a dispensing assembly disposed within the container assembly that dispenses variable, non-zero quantities of additives into the consumable liquid stored in the container assembly, where the dispensing assembly includes a plurality of apertures structured and arranged to retain vessels containing the additives to be dispensed into the consumable liquid.

In at least one embodiment, the portable, self-contained beverage apparatus further includes a controller that controls the dispensing by the dispensing assembly of the variable, non-zero quantities of the additives into the consumable liquid stored in the container assembly.

In at least one embodiment, the controller of the portable, self-contained beverage apparatus controls the dispensing by the dispensing assembly to maintain the targeted concentration of at least one of the additives in the consumable liquid stored in the container assembly, wherein the controlling is based on tracked consumable liquid level and the quantity of the at least one additive.

In at least one embodiment, the portable, self-contained beverage apparatus further includes the vessels retained in the plurality of apertures that contain the additives to be dispensed into the consumable liquid stored in the container assembly.

As described above, one problem of existing portable bottles and other containers is that the consumable contents contained in such bottles and containers remain essentially unchanged other than in their quantity. The utility of such bottles and containers may be greatly enhanced if the flavor, consistency, and/or the nutritional, chemical, gas, CO2 (carbon dioxide), oxygen, or other make-up of the consumable liquid could be altered over some period of time (e.g., hourly, daily, etc.) and/or according to some other cycle based on, for example, the needs or desires of the user, in order to optimize the health and well-being of the user. For example, the consumable liquid may be enhanced with an energy boosting supplement in the morning to facilitate alertness and focus, with vitamin supplements throughout the day, and with a calming nutritional supplement at the end of the day to facilitate quality sleep. Such a daily cycle may be supplemented by an additional longer term cycle of additives dispensed on a weekly, bi-weekly, etc., basis or some other customized time-cycle. As well as nutritional supplements, it may additionally be desirable to dispense other types of substances or additives such as, for example, vitamins, flavorings, pharmaceuticals, and the like, into the contents of portable containers in order to further optimize the health, hydration, recovery, and other benefits to a user, athlete, or patient, for example.

Furthermore, mobile and wearable activity and fitness monitoring devices, as well as remote applications, may communicate with and/or receive data provided from portable bottles and other containers to control and monitor liquid and/or additive consumption and to perform other functions such as, for example, communicating a timely signal to portable and other containers to release all or a pre-defined amount of an additive substance from one of the additive vessels into the consumable contents of the container.

Furthermore, such data might modify the dispensing protocol of the additive vessels. Data might function to recommend or otherwise incentivize the discovery, purchase, and and/or consumption of the aforementioned additive vessels.

Since portable hydration containers may typically be filled in the morning and topped-off throughout the day as liquid is consumed, it is neither practical nor desirable to require that a user fill multiple compartments of a container with multiple different consumable liquids or mixtures for consumption throughout the course of the day. Therefore, a more practical and desirable solution is to sequentially dispense a selection, sequence or combination of different additives from one or more additive vessels into a consumable liquid at the appropriate time in response to a signal from a mobile or wearable device, processor or application. Neither is it desirable that a user have to carry around separate additive vessels and insert them into the hydration container when needed at various times throughout the day. An illustrative example of such an additive delivery ecosystem is shown in FIG. 1.

A hydration system such as that illustrated in FIG. 1 provides electrical, electromechanical, and electronic components to enable a number of functions. For example, measuring, monitoring or identifying the amount of liquid in the container at any point in time, determining when the container has been refilled and/or measuring the rate of consumption of the liquid consumable are desirable functions of such a system and require sensing, processing, communication technology and electronic components which may have to be in close proximity to the liquid or other substance within the container in order to monitor the quantity or level. The proximity and/or placement of the aforementioned systems and/or devices is sensitive, in many cases, regardless of whether or not the system directly, indirectly, or inferentially obtains such information. Similarly, electro-mechanical components and/or actuators may be required to dispense an additive into the contents of the container.

To achieve desired consumption temperatures, or to maintain a desired consumption temperature, it may be desirable to refrigerate the liquid container, in which case repeated and sustained exposure to low temperatures and humidity would be harmful to the electronic components. Though it may be desirable that these electronics components and sensors be in close proximity to the liquid container for functional reasons, it is also desirable that they be fully separable to enable thorough cooling of the liquid container, as well as washing.

One or more embodiments of the present disclosure relates to a consumable container having a dispensing module assembly with a number of apertures into which the above described additive vessels can be inserted by a user. Each of these additive vessels can have a passive RFID tag attached to the vessel. An RFID antenna can be mounted on the surface of a dispensing module located on the central axis of the consumable container and accesses data about the contents of the additive vessel from the RFID tag. Therefore, the methods, systems, and apparatuses of the disclosure are also designed to access data about the contents of an individual additive vessel. In accordance with at least one embodiment, the antenna and/or other read and/or write capable data modality is oriented in such a way so as to necessitate only one system, as opposed to a static modality that might require a unique instance of the modality on each unique aperture. One having ordinary skill in the art will recognize that although a passive data system such as RFID may be ideal due to its passive nature, read/write capability, and low-cost, that functionally, other methods could accomplish similar results, including but not limited to physical key-based methods, or optical methods.

Another feature of the disclosure is to determine the geo-location of the user and determine whether the dispensing of additives or gas should be adjusted based on some aspect or aspects of this location (e.g., home, gym, office, etc.). One learned in the art will understand that such data, working to inform or otherwise guide a dispensing system, could be directly extrapolated or indirectly inferred. Another feature is to determine the speed of motion of the user and determine whether the dispensing of additives should be adjusted based on this activity (e g walking, cycling, running) This data might further operate to corroborate supporting data feeds, such as those provided by wearable activity trackers and the like.

Another feature is to combine the user's location and the user's speed of motion to predict whether a user is indoors or outdoors and, if outdoors, to access weather, temperature and humidity data and adjust the dispensing of additives according to the needs of those environmental conditions. Such contextual data associated with ambient conditions relevant to dispensing events and/or additive recommendations or purchase does not necessarily need to relate to the user's physical movements however.

As will be described in greater detail below, the methods, systems, and apparatus of the present disclosure are also designed to present information to a user regarding the additives consumed and/or remaining in the vessels inserted in the hydration container. For example, in accordance with one or more embodiments, the portable container may display (e.g., on a user interface screen of the container) information or generate an alert to the user when one or more of the additive vessels inserted in the hydration container is, or will soon become empty. In another example, the container may be configured to predict a future date when one or more of the additive vessels inserted in the hydration container will become empty. Such a feature serves to recommend and/or automate future purchases. Such a system might also function to adjust or otherwise modify dispensing protocol to ensure that the additive does not become depleted on or before a targeted time.

In accordance with one or more embodiments, the methods, systems, and apparatus described herein may optionally include or be capable/configured to perform one or more of the following: correlate depletion information of additive vessels with purchase history and previous rate of consumption to ascertain when a user will run out of supplies of the additive vessel irrespective of whether they are currently inserted in the container; enable the user to order replacement additive vessels by adding to their shopping cart on an eCommerce site through some type of user action (e.g., pressing a button on the container, interacting with an associated application, etc.).

In accordance with at least one embodiment, the methods, systems, and apparatuses may be designed to provide for direct or indirect communication of an instruction from a central control application to a consumable container. Such a direct or indirect communication may be, for example, an instruction to dispense an additive, may include a dispensing schedule and/or protocol, or may indicate that an additive (e.g., medication, pharmaceutical, or the like) has, or has not, been dispensed by the dispensing apparatus within the container. Data associated with the dispensing event (or lack thereof) might also be collected and communicated directly or indirectly between the dispensing device and the aforementioned central control application. In accordance with at least one embodiment, Bluetooth low energy may be used as the primary transmission method of such data.

In accordance with one or more embodiments, data may be communicated from a container that an additive (e.g., medication, pharmaceutical, or other additive) has, or has not, been added to the consumable contents of the container; data may be communicated from a container that the consumable contents of the container have been fully consumed, partially consumed, or not consumed. Direct or indirect mechanisms might further corroborate or invalidate such information directly or inferentially (e.g. the user has dumped the contents, as opposed to properly consuming them).

Also provided are a method and apparatus for the precise and continuously variable dispensing of a removable additive vessel through the use of a discretely adjustable piston or actuator, the key adjustment variable being stroke length (and therefore displacement volume) by the user, which then by the user's input (in the preferred disclosure's use case, the user's finger) translates into a dispensing event that is precise and repeatable. Passive electronics measuring which additive vessel, and what dispensing quantity, and how many dispensing events are initiated could log the user's consumption activity and behaviors.

Embodiments of some or all of the methods disclosed herein may be represented as instructions embodied on transitory or non-transitory processor-readable storage media such as optical or magnetic memory or represented as a propagated signal provided to a processor or data processing device via a communication network such as, for example, an Internet or telephone connection.

Another feature of the methods, systems, and apparatuses described herein relates to audio engagement processing. Another feature of the methods, systems, and apparatuses described herein relates to situational processing. Another feature of the methods, systems, and apparatuses described herein relates to group engagement processing. Further scope of applicability of the systems, apparatuses, and methods of the present disclosure will become apparent from the Detailed Description given below. However, it should be understood that the Detailed Description and specific examples, while indicating embodiments of the systems, apparatuses, and methods, are given by way of illustration only, since various changes and modifications within the spirit and scope of the concepts disclosed herein will become apparent to those skilled in the art from this disclosure.

It is appreciated that any of the features described in this disclosure as relating to an additive, such as a nutritional additive, for example, can also be applied to gas, as may be desired. Any of the features described herein relating to dispensing of an additive can also be applied to the dispensing of gas, as desired. Any of the features described herein as relating to control or monitoring, for example, of the dispensing of an additive can also be applied to the control and dispensing of a gas, as desired. It is desirable for a portable hydration container or bottle to have, included within it, one or more separate additive vessels containing various additives that may be chosen and inserted within the hydration container by the user in various different combinations, such that some of the beverages, functional beverages, vitamins, pharmaceuticals, etc., may be periodically dispensed into the liquid contents of the container when required or desired, and consumed by the user. It is desirable for a portable hydration container or bottle to have, included within it, one or more on board gas tanks or gas containers so as to provide the ability to selectively dispense gas into liquid contents of the container.

Such a hydration apparatus or system may communicate with an application (e.g., mobile telephone application, computer program, etc.) that controls and monitors the additive dispensing from the vessels, and adjusts or otherwise modifies the dispensing of those additives according to real-time environmental and contextual variables. Hydration systems and containers such as those described herein also need to be periodically washed or sterilized in order to maintain hygiene levels and to avoid or eliminate cross-contamination between different additives. Furthermore, when a container assembly includes sensitive electronics, it is also beneficial to design the apparatus in such a way that washing, cleaning, or sterilization, or cooling, can be carried out without undue risk of damage to the electronic components. An amount of consumable within a portable hydration container of the disclosure will vary over time as it is consumed. As such, the methods, systems, and apparatus of the present disclosure are capable of varying and/or adjusting the amount of additive or gas to be dispensed into the consumable in order to achieve or maintain a targeted (e.g., optimal) or desired level of concentration of the additive (or additives) in the consumable. In addition, the consumption behaviors of the user related to hydration and the consumption of additives and the like would benefit from tracking and level measurement to provide apparatus-level context for non-zero dispensing, but also for the overall tracking and recommendation of additives and/or additive vessels, present and future.

Furthermore, since such hydration containers are portable and may be carried around to many different places, it would also be beneficial to a user if they could periodically re-order products from an online (e.g., eCommerce, and/or Mobile Application) website, and replenish their supplies of additives, vitamins, etc., directly from the container in which they are used, or from an associated mobile device, at any time and irrespective of the user's location. In addition, while hydration containers such as those described herein are of considerable value to an individual user, a collection of such containers may also be used by a group of users with common interests, such as, for example, a sports team, patients in a medical facility or assisted-living home, participants in clinical trials of a drug, and the like. In such instances it may be of considerable additional value to control, monitor, or otherwise coordinate the dispensing of additives both individually and/or collectively, and/or to monitor the consumption of consumables and additives individually and/or collectively. The following description of examples and embodiments of the methods, systems, and apparatus of the present disclosure provides additional details about many of the above features and functions.

FIG. 1 shows an illustrative block diagram of an overall ecosystem or system 10 within which one or more embodiments of the present disclosure has application and/or may be implemented. FIG. 1 includes a container assembly 100, generally but not necessarily portable, that may contain a consumable (e.g., a liquid) into which liquid, powder, and/or other forms of consumable additives may be dispensed from one or more separate removable additive vessels 101. Data about the additives within each additive vessel 101 may be encoded within an RFID or similar active or passive type tag 102 mounted on or otherwise attached to the additive vessel 101. Such data about the additives contained within the additive vessel or vessels 101 can be read from the RFID or similar type tag 102 by, for example, an RFID or similar-type antenna that is a component of the container assembly 100. For example, in accordance with at least one embodiment, the container assembly 100 may include an RFID antenna (not shown) that rotates around or that is positioned around a central axis of the container assembly 100 to individually and/or sequentially read data from the additive vessels 101. The additive vessels 101 can be inserted in a circular arrangement around the central axis of the hydration container. There can be one or more than one additive vessel 101. Data about the additives contained in the additive vessels 101, as well as gas contained in a onboard gas tank, may be collected, analyzed, and/or communicated by the container assembly 100 (e.g., by a processor and/or other components of the container assembly 100), and made available to one or more user devices 106, local data storage 105, remote data storage 107, and the like. Such information may also be presented to the user using a display 111 mounted on the container assembly 100 and/or using a display on the user device 106. Communications may be performed or provided between the various components of the system 10 over a network 108. The network 108 may be provided using a cloud based architecture.

As described above, FIG. 1 shows system 10. FIG. 1 also shows a system or hydration system 600. The system 600 can include a refill station 500, a refill tank 530, and a container assembly 300. In addition to the various benefits and attributes provided by the system 10, the system 600 can provide benefits and attributes associated with dispensing of gas into liquid or beverage contained in the container assembly 300. The system 600 can include features of the system 10 as desired. Further details are described below.

Figure 2B:
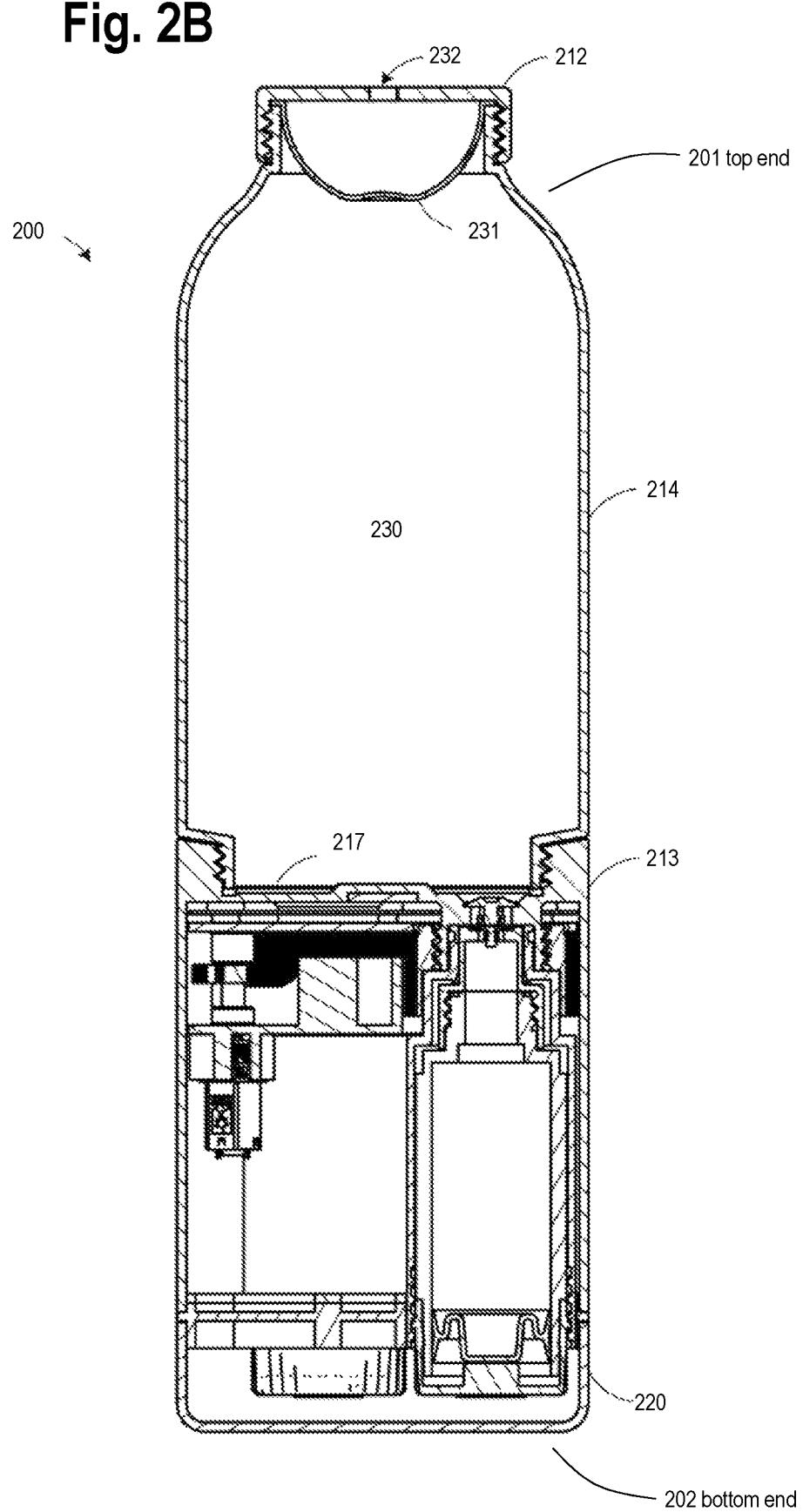
FIG. 2B is a cross section view of a beverage container assembly in accordance with one or more additional embodiments.

FIGS. 2A and 2B illustrate a beverage container assembly 200, in accordance with at least one embodiment, that will be shown in further detail in subsequent FIGS. 3-12 and described in the further description that follows. As will be understood by one skilled in the art, the various features and functionality described above and elsewhere in this disclosure can be applied, combined and used in conjunction with the container assembly 200 in accordance with the various embodiments described below. The container assembly 200 may be of similar or same construction as the container assembly 100 of FIG. 1.

FIG. 2A illustrates an isometric view while FIG. 2B illustrates a cross section cutaway view of the beverage container assembly or container assembly 200, in accordance with one or more embodiments. The beverage container assembly 200 includes a beverage chamber housing 214, which forms a portion of a chamber 230 to contain a beverage. The beverage chamber housing 214 can be configured with an open threaded base that threads on to a top end of a dispensing assembly 213. A top portion of the dispensing assembly 213 can include a platform 217, which can form a bottom half or portion of the chamber 230 to contain the beverage. The dispensing assembly 213 can house one or more containers of additives to be dispensed into the chamber 230, a dispensing mechanism configured to control the addition of the additives, and electronics configured to control the dispensing mechanism. A removable base cover 220 can be configured to thread on to and off of a bottom end of the dispensing assembly 213 in order to provide access so as to insert and remove containers of additives. Consistent with the description above, each of these containers of additives will be referred to below as an additive vessel 250 (see FIGS. 4A, 5A and 5B, for example).

As shown in FIG. 2A, the container assembly 200 includes a top end 201 and a bottom end 202. It should be appreciated that the various illustrative drawings of embodiments of the disclosure are shown in an upright orientation and in various illustrative drawings of embodiments of the disclosure are shown in an upside down or inverted orientation. Accordingly, the labeling of top end and bottom end are provided for clarity.

The container assembly 200 can include a removable cap 212, which, in the illustrated embodiment, seals a top opening of the beverage chamber housing 214 to complete the chamber 230. The cap 212 can be configured to thread or snap on to a top end of the beverage chamber housing 214. Referring to FIG. 2B, in one embodiment, the cap 212 includes a compressible bladder 231 formed of silicone or other suitable rubber or material, that allows for deformation of the bladder so as to accommodate the addition of liquid additives into the chamber 230 by the dispensing assembly 213. The cap 212 also includes an air passageway 232 to allow air to escape from behind the bladder 231 so that the bladder can compress to accommodate the addition of the liquid additives.

Referring to FIG. 2A, the dispensing assembly 213 can be further configured with a user interface 222, which can include a display 211 and one or more user input buttons 216. In the illustrated embodiment of FIG. 2, the display 211 includes five LEDs, with three LEDs in a triangle that can be configured to indicate selection of one of three additive vessels. Another LED can be configured to indicate a power on or wake up condition of the dispensing assembly, and yet another LED that can be configured to indicate that a dispensing of an additive to the beverage chamber housing 214 has been selected. The LEDs may use specific lensing or may be embedded behind a micro-perforated material to abstract the user from the physical components of the LEDs. In one embodiment, a single user input button can be configured as a multi-function button to perform different actions depending on the amount of pressure applied to it by the user, by duration of presses, sequence or pattern of presses, and/or by quantity of presses, for example.

The button 216 can also be configured to accommodate partial or complete depression of the button, which can be differentiated by a perceptible detent or click, for example. Such arrangement can provide further varied functionality. The user interface 222 can provide an arrangement for the user to, for example, dispense an additive from an additive vessel or display the current battery level of the system and apparatus.

Figure 3:
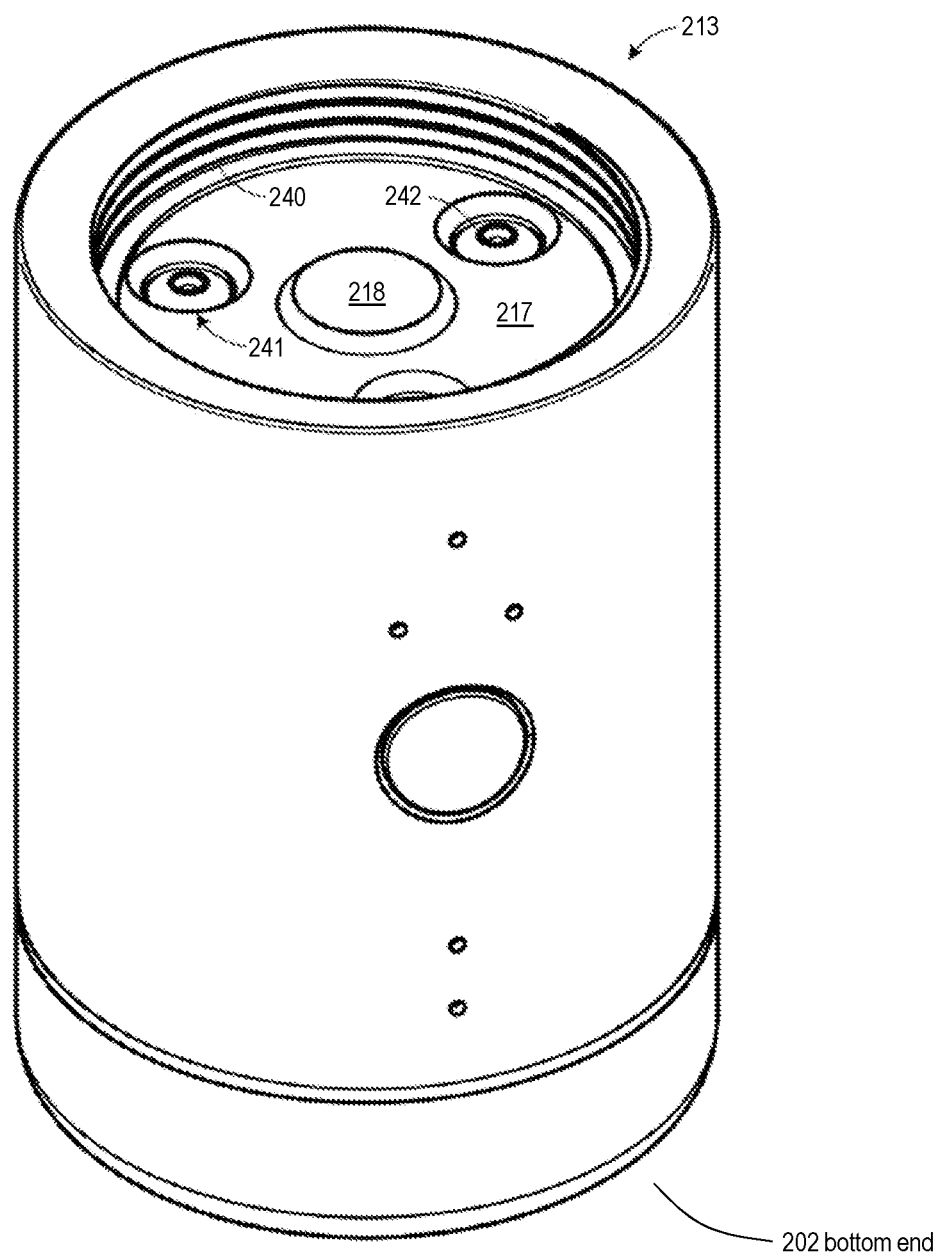
FIG. 3 illustrates a view of a dispensing assembly with a beverage chamber housing removed and with additive vessels in accordance with one or more embodiments.

FIG. 3 illustrates a view of the dispensing assembly 213 with the beverage chamber housing 214 removed. A top portion of the dispensing assembly 213 includes an annular wall with threads 240 that engage with matching threads on the beverage chamber housing 214. The top portion of the dispensing assembly 213 can also include the platform 217 to form a base for the beverage chamber housing 214 in order to contain the beverage within the chamber 230. The platform 217 can include one or more outlet ports 241 through which additives are added to the beverage in the chamber, and in the illustrated embodiment, three such ports are shown. In one embodiment, each port 241 can be sealed by a one-way valve 242 (e.g. an umbrella valve of rubber or silicone) that permits one-way passage of a liquid additive into the chamber. As will be discussed below, each one-way valve 242 can form part of a pumping mechanism 260 (FIG. 6) that injects liquid additives into the chamber. In one embodiment, the pumping mechanism 260 is a reciprocating positive displacement pump.

FIG. 3 also illustrates an ultrasonic fluid level sensor 218 disposed on or within the platform 217. In accordance with one embodiment, the fluid level sensor 218 uses "round trip time" for a reflected sound wave to measure the height of a fluid or water column within the chamber 230 and thereby infer fill volume.

Figure 4B:
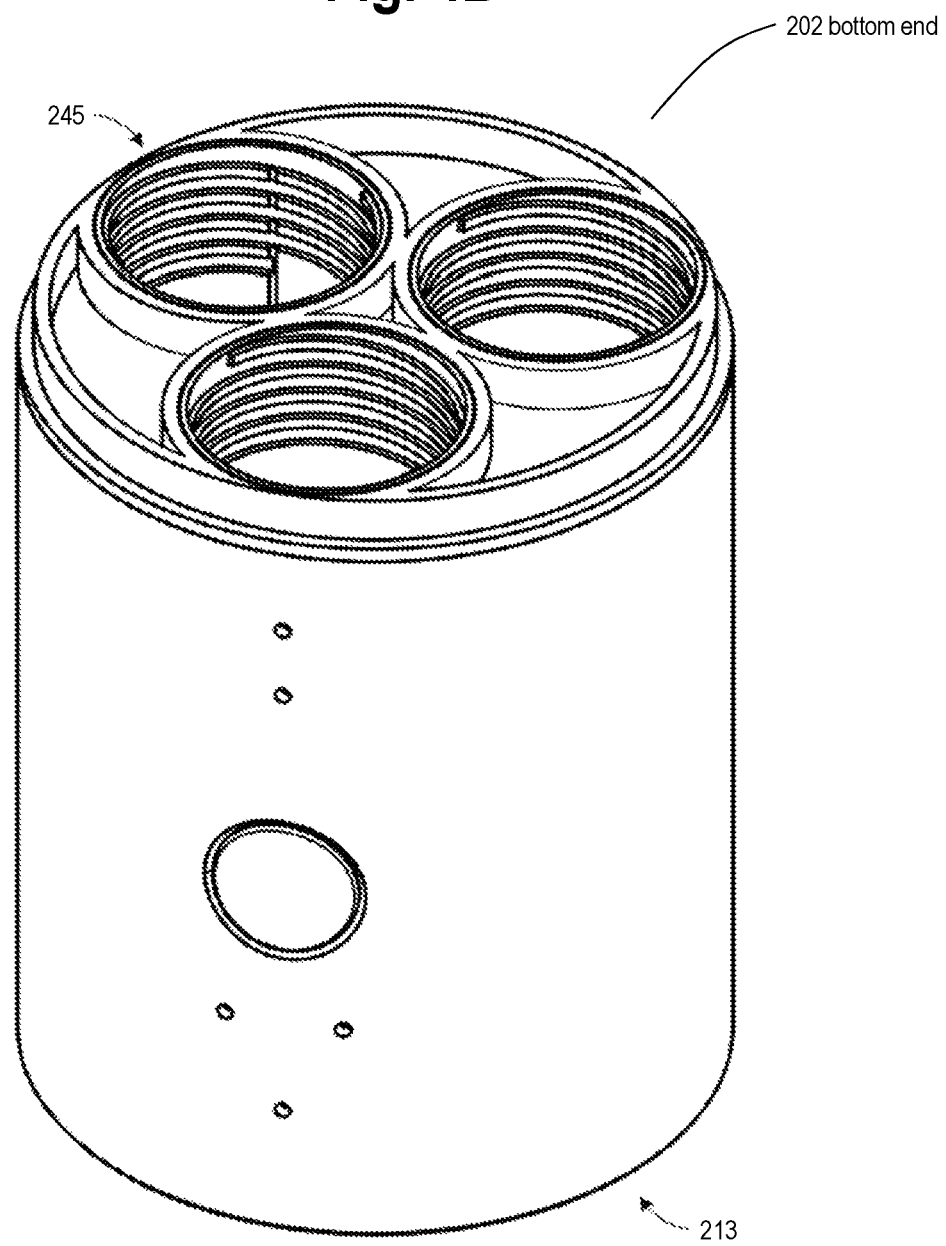
FIG. 4B illustrates a bottom view of the dispensing assembly with a base cover removed and with additive vessels removed in accordance with one or more embodiments.

FIGS. 4A and 4B illustrate a bottom view of the dispensing assembly 213 with the base cover 220 removed. FIG. 4A shows the ends of each of three additive vessels 250 that are threaded into three corresponding receptacles or apertures 245 as shown in FIG. 4B. While the term "receptacle" is used in the description that follows, for the purpose of consistency with various embodiments described above, the receptacles 245 can also be referred to as "apertures".

It should be noted that FIG. 4A shows, near the vessels 250, a number of semicircular artifacts that could not be easily removed from an available CAD rendering. These artifacts do not form any part of the illustrated embodiment and should be ignored by the reader.

Figure 5B:
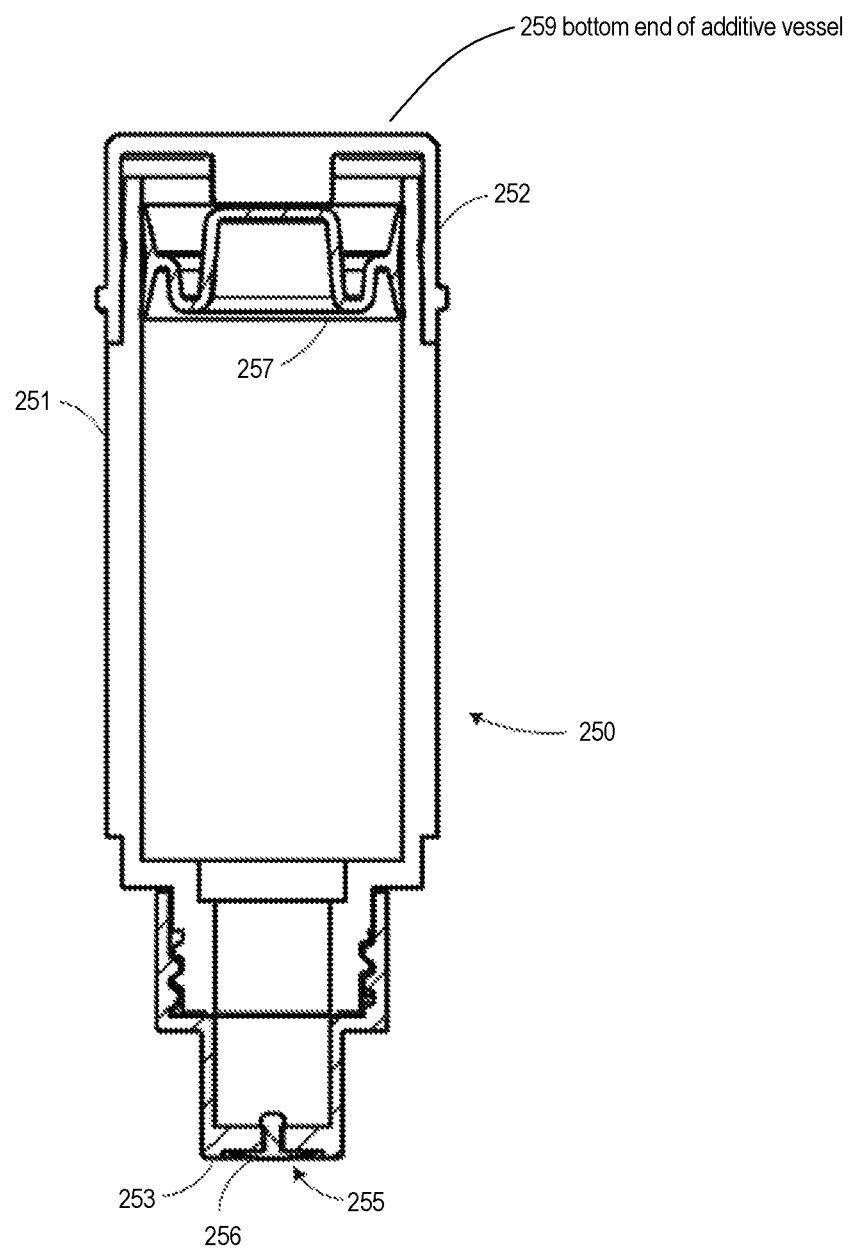
FIG. 5B illustrates a cross section cutaway view of an additive container in accordance with one embodiment in accordance with one or more embodiments.

FIGS. 5A and 5B illustrate an isometric perspective view and a cross section cutaway view of an additive vessel 250 in accordance with one embodiment. FIG. 5A shows a top end 258 of the additive vessel 250 and a bottom end 259 of the additive vessel 250, as such additive vessel would be positioned in routine use of the container assembly, such as is shown in FIG. 2A. The additive vessel 250 can include a housing 251, which can be cylindrical in shape to fit into a corresponding cylindrically shaped receptacle or aperture 245. At a first end or proximal end, the housing 251 can be covered with a threaded cap 252, which snaps onto the housing 251 and the threads of which also engage with receiving threads in a receptacle 245 so as to lock the additive vessel 250 into place within the dispensing assembly 213. At a second end or distal end, the vessel 250 includes a piston head 253 that includes a port 255 that is capped by another one-way valve 256 (e.g. an umbrella valve of rubber or silicone). The port 255 and one-way valve 256 function to permit additive to flow in only one direction from the vessel 250, i.e. out of the additive vessel, and into a pumping chamber 261 of the pumping mechanism 260 (FIG. 6).

Referring to FIG. 5B, a slideable plunger 257 is disposed within an interior portion of the housing 251. The interior of the housing 251 and the exterior of the plunger 257 can be a matching cylindrical shape such that the plunger can slide along the length of the housing 251, from the proximal to the distal end of the housing, as additive contained within the housing is dispensed from the vessel. The plunger is preferably formed of soft plastic such as LDPE that seals against the interior of the housing and moves so that no air is allowed into the vessel 250 during dispensing of the additive.

Figure 6:
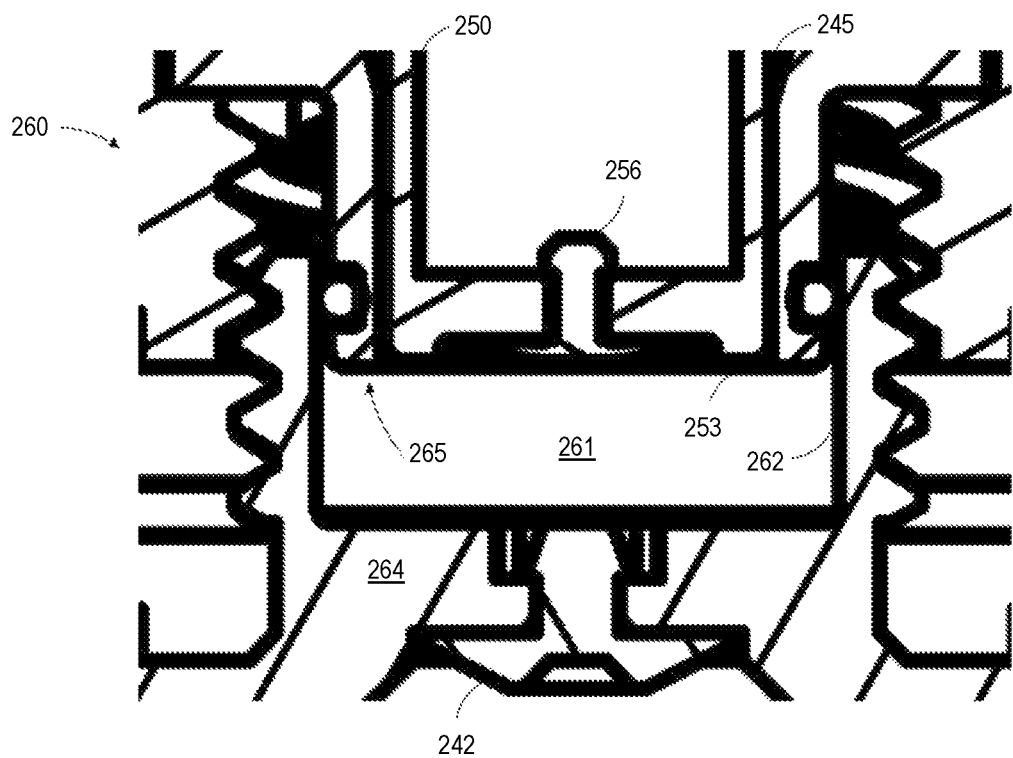
FIG. 6 illustrates a cutaway cross section of the dispensing assembly showing the operation of a pumping mechanism for an additive container in accordance with one or more embodiments.
Figure 7A:
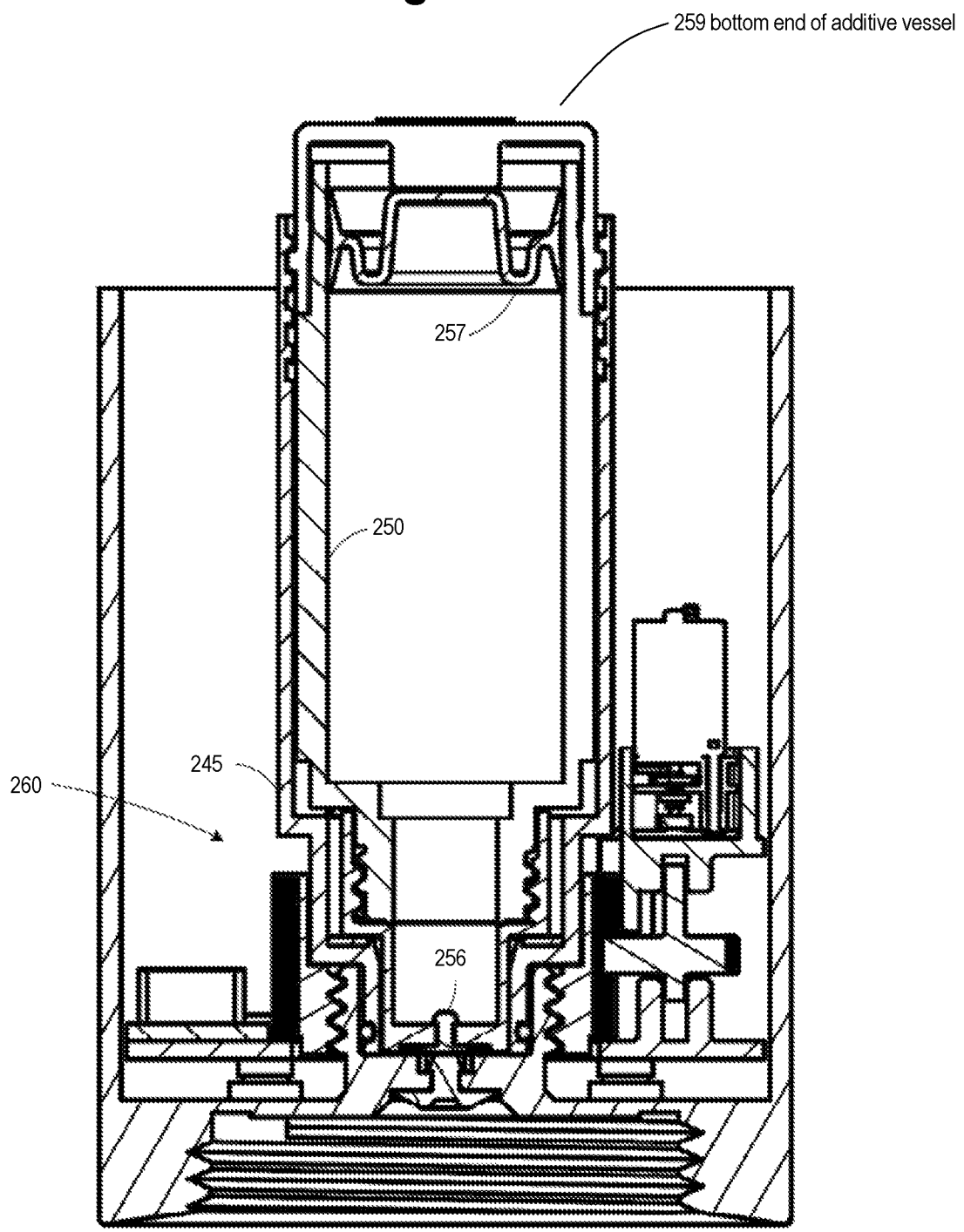
FIGS. 7A-7C illustrate a cutaway cross section of the dispensing assembly showing the operation of a pumping mechanism for an additive container in accordance with one or more embodiments.
Figure 7B:
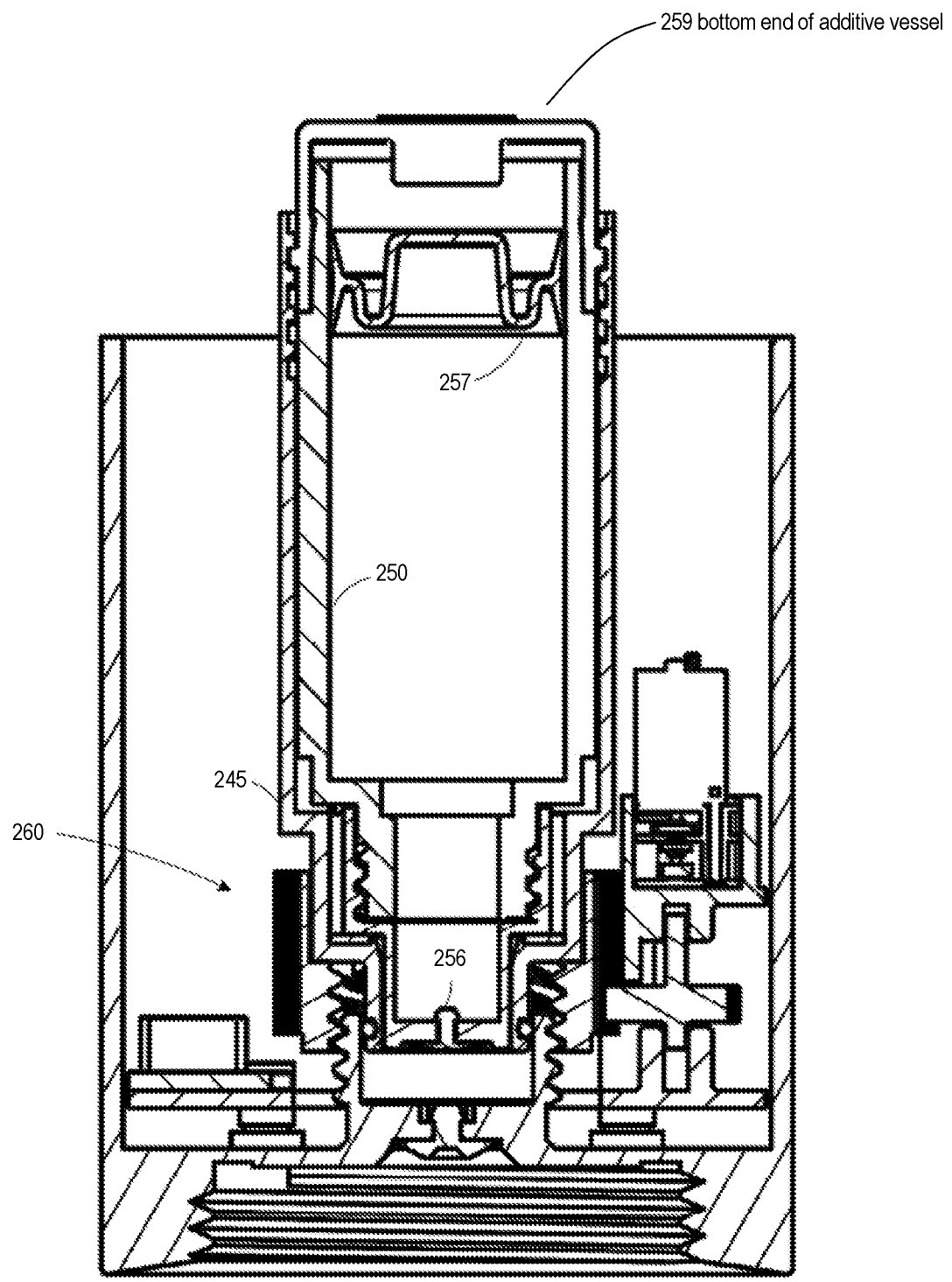

FIGS. 6 and 7A-C illustrate a cutaway cross section of the dispensing assembly showing the operation of the pumping mechanism 260 for an additive vessel 250. FIG. 6 shows an enlarged view of a portion of FIG. 7B showing the pumping mechanism 260 in a partially actuated state. As illustrated, the vessel 250 is threaded into the receptacle 245 such that the piston head 253 of the vessel 250 engages with a housing of the receptacle to form or provide a piston 265. The piston 265 can slide back and forth within a pumping chamber 261 formed by a cylinder 262 of a pump housing 264. As noted above, the piston head 253 includes a one-way valve 256 that permits flow from the vessel 250 into the pumping chamber 261. At an opposite end of the chamber 261 from the piston head 253, the second one-way valve 242 permits liquid additive to flow from the pumping chamber 261 into the beverage chamber 230 as the piston 265 moves forward, i.e. downward as shown in FIG. 6, in the cylinder 262.

Figure 7C:
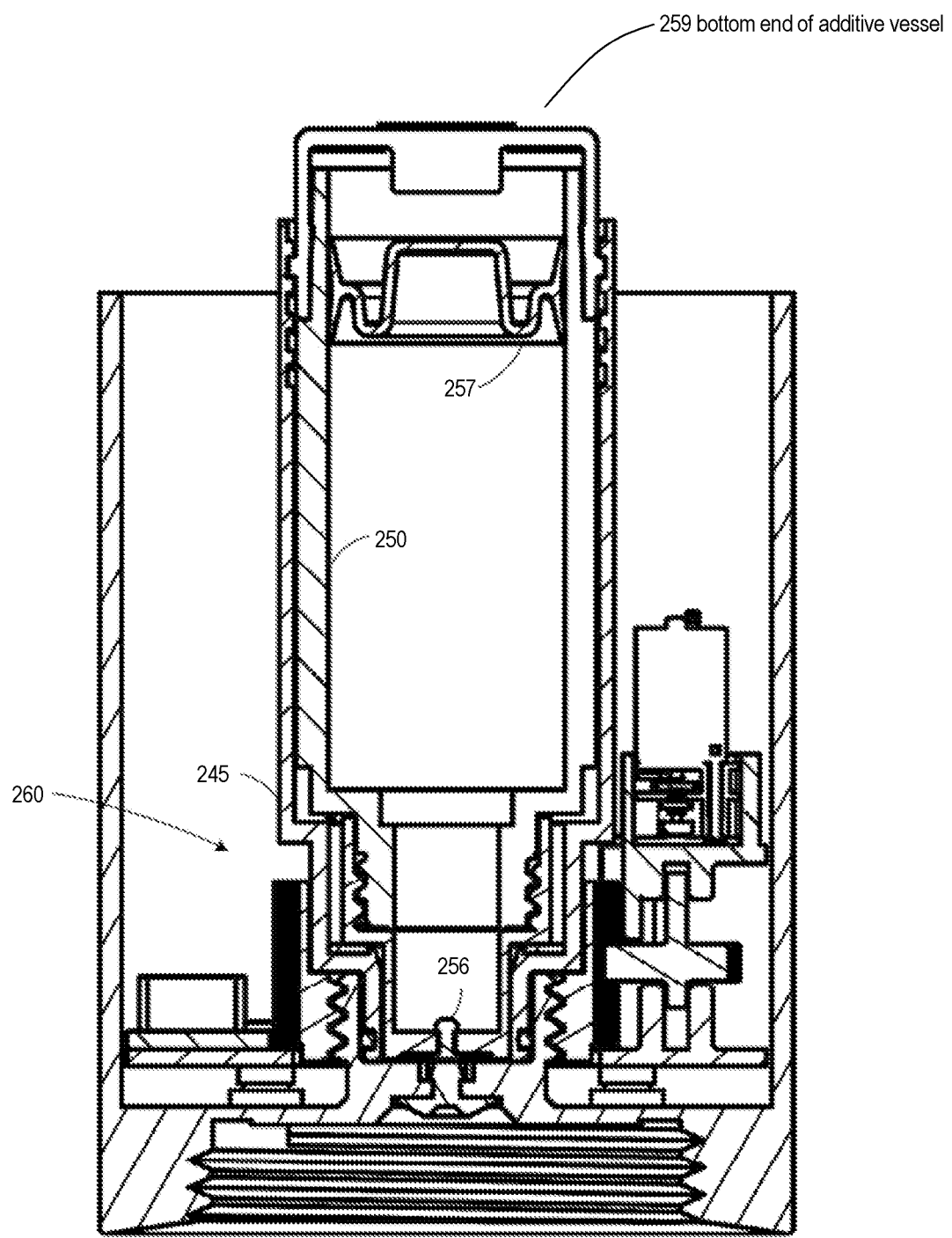

FIG. 7A shows the receptacle 245 and piston 265 in a starting position and the plunger 257 of the additive vessel 250 in an initial position prior to any additive being dispensed from a full additive vessel 250. As shown in FIG. 7B, the piston 265 is withdrawn, and the one-way valve 242 at the outlet port 241 blocks fluid flow in the reverse direction, creating a vacuum which draws fluid from the additive vessel 250 through the one-way valve 256 into the pumping chamber 261. It should be noted that in FIG. 7B, the plunger 257 has moved from its starting position illustrated in FIG. 7A to accommodate fluid flow from the vessel 250 into the pumping chamber 261. As shown in FIG. 7C, the piston 265 is driven back to its starting position, compressing the fluid within the chamber 261 and forcing the fluid through the one-way valve 242 at the outlet port 241 (see FIG. 3) and into the beverage chamber 230. The one-way valve 256 blocks the flow of fluid from returning into the vessel 250. Positive pressure, accordingly, is produced in this compression stroke, dispensing the contents of the pump chamber through the outlet port 241 into the beverage chamber 230.

The volume dispensed during a single piston stroke can be modulated linearly by modifying the piston stroke length. Multiple piston strokes can be used to dispense larger quantities. By design, the volume of the pumping chamber can be configured to be as small as practically possible when the piston 265 is in the starting position to avoid wasting additive liquid when a depleted additive vessel is withdrawn from the receptacle.

Figure 8A:
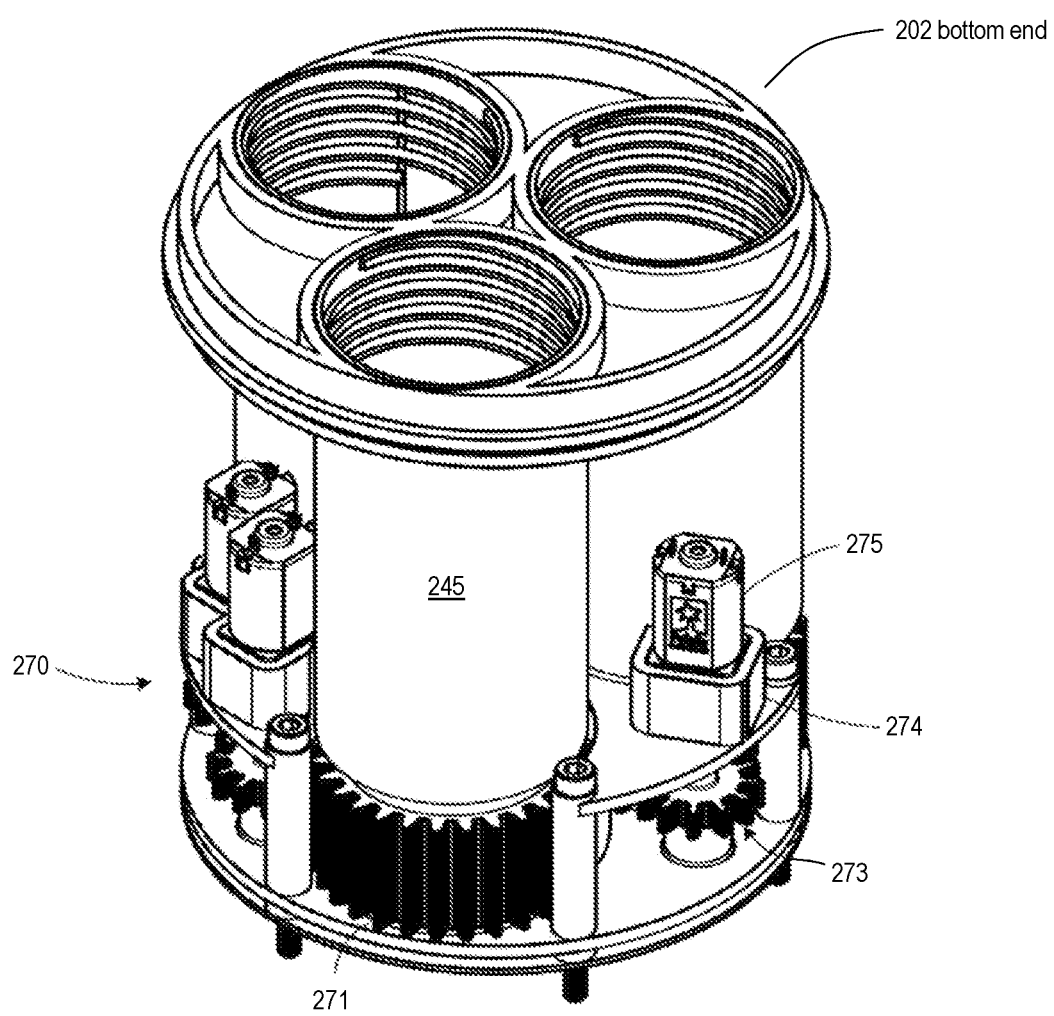
FIGS. 8A and 8B illustrate views of a drive mechanism for actuating a receptacle and associated piston of a pumping mechanism in accordance with one or more embodiments.
Figure 8B:
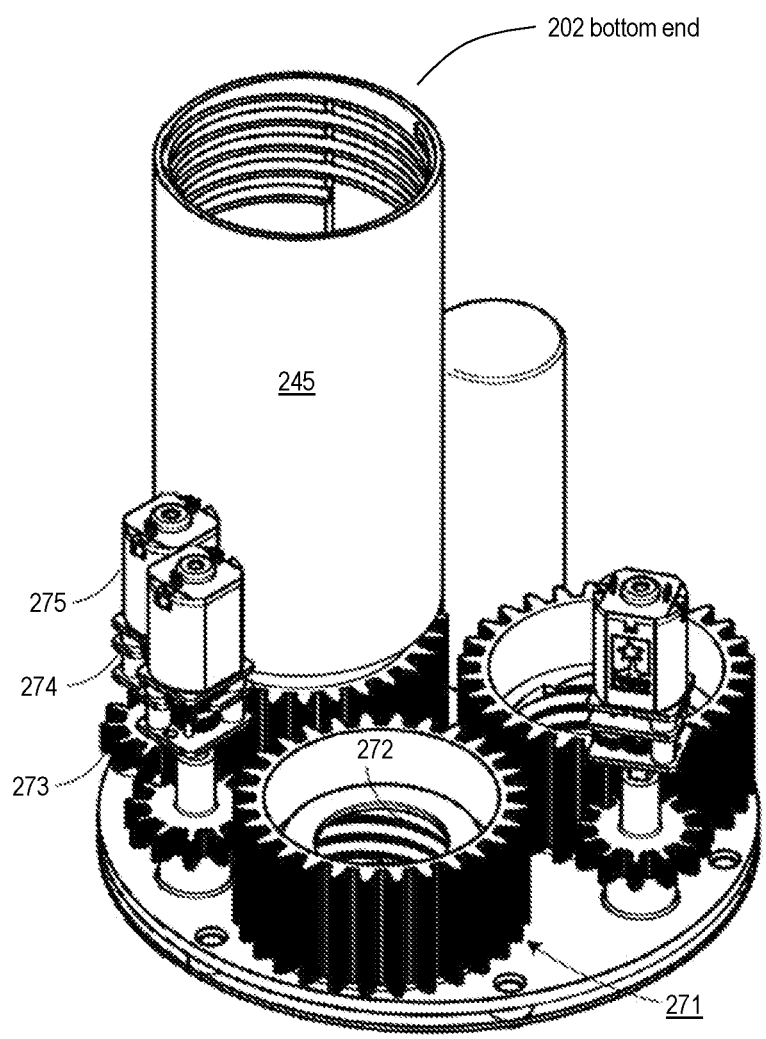

FIGS. 8A and 8B illustrate views of a drive mechanism 270 for actuating the receptacle 245 and associated piston 265 of the pumping mechanism 260. FIG. 8A illustrates an internal perspective view of the dispensing assembly 213 without an outer cover. FIG. 8B illustrates an additional internal perspective view of the dispensing assembly 213, with structure removed, to better illustrate certain aspects of the drive mechanism 270. As illustrated, each receptacle 245 and its associated piston 265 (not visible in FIGS. 8A-B) is moved down and up by an internally threaded toothed ring 271. A set of internal threads 272 on each internally threaded toothed ring 271 engage with a threaded extension 276 (FIG. 9B) of the pump housing 264. Each internally threaded toothed ring 271, can be driven by a gear 273, which in turn can be driven by an optional gearbox 274, which in turn is driven by an electric motor 275.

Figure 9A:
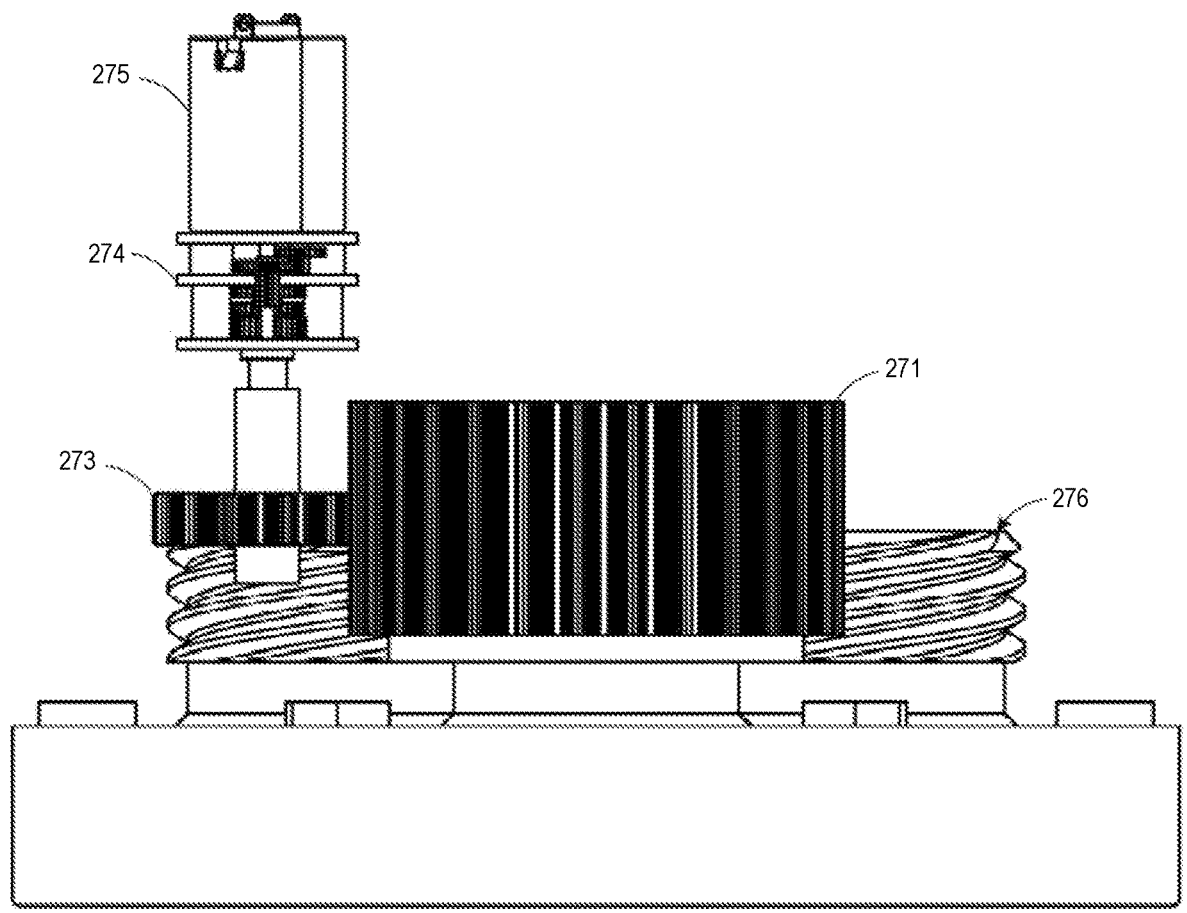
FIGS. 9A and 9B illustrate an elevation view of the drive mechanism with the receptacle in a starting position and in a withdrawn position, respectively, in accordance with one or more embodiments.
Figure 9B:
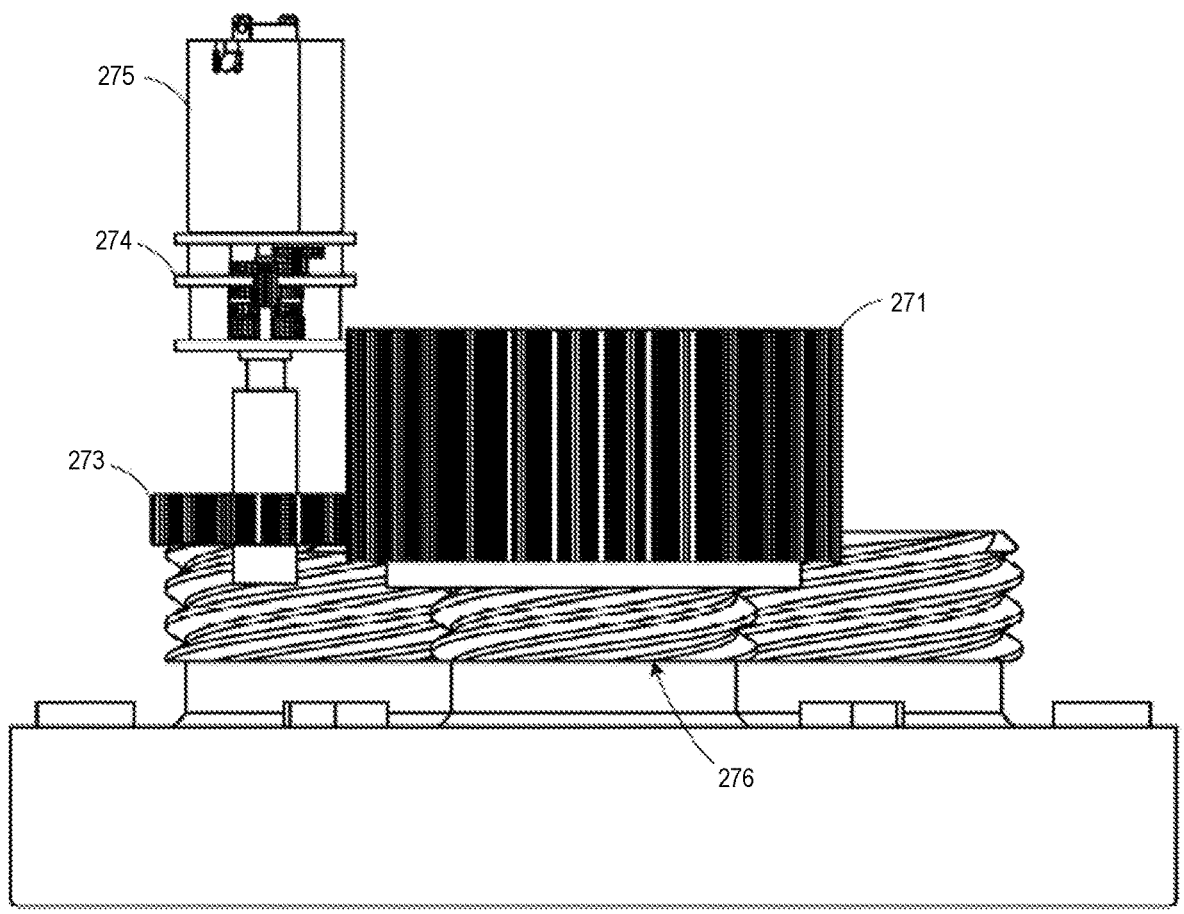

FIGS. 9A and 9B illustrate an elevation view of the drive mechanism with the receptacle in a starting position (9A) and in a withdrawn position (9B). As the toothed ring 271 rotates, the internal threads 272 cause the toothed ring to rise and fall on the threaded extension 276 of the pump housing 264. The receptacle, which can be snapped into or adhered to the toothed ring 271, also therefore rises and falls with the toothed ring, causing the piston 265 to move within the cylinder 262. In accordance with one embodiment, the threads on the toothed ring 271 and the threaded extension 276 are a "fast" 4-start thread that cause the toothed ring 271 to travel to full linear extension with 180 degrees of rotation. The threads can be configured to have an ACME profile or similar.

Figure 10:
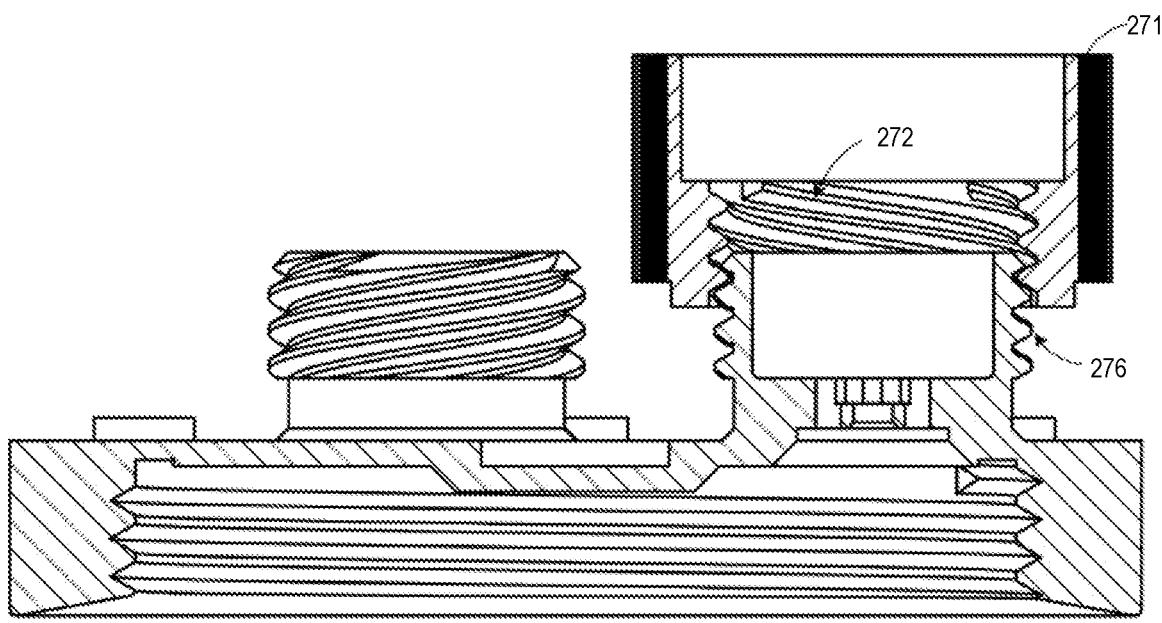
FIG. 10 illustrates a cross section of an internally threaded toothed ring engaged with a threaded extension of a pump housing in accordance with one or more embodiments.

FIG. 10 illustrates a cross section of an internally threaded toothed ring 271 engaged with a threaded extension 276 (FIG. 9B) of the pump housing 264.

Figure 11A:
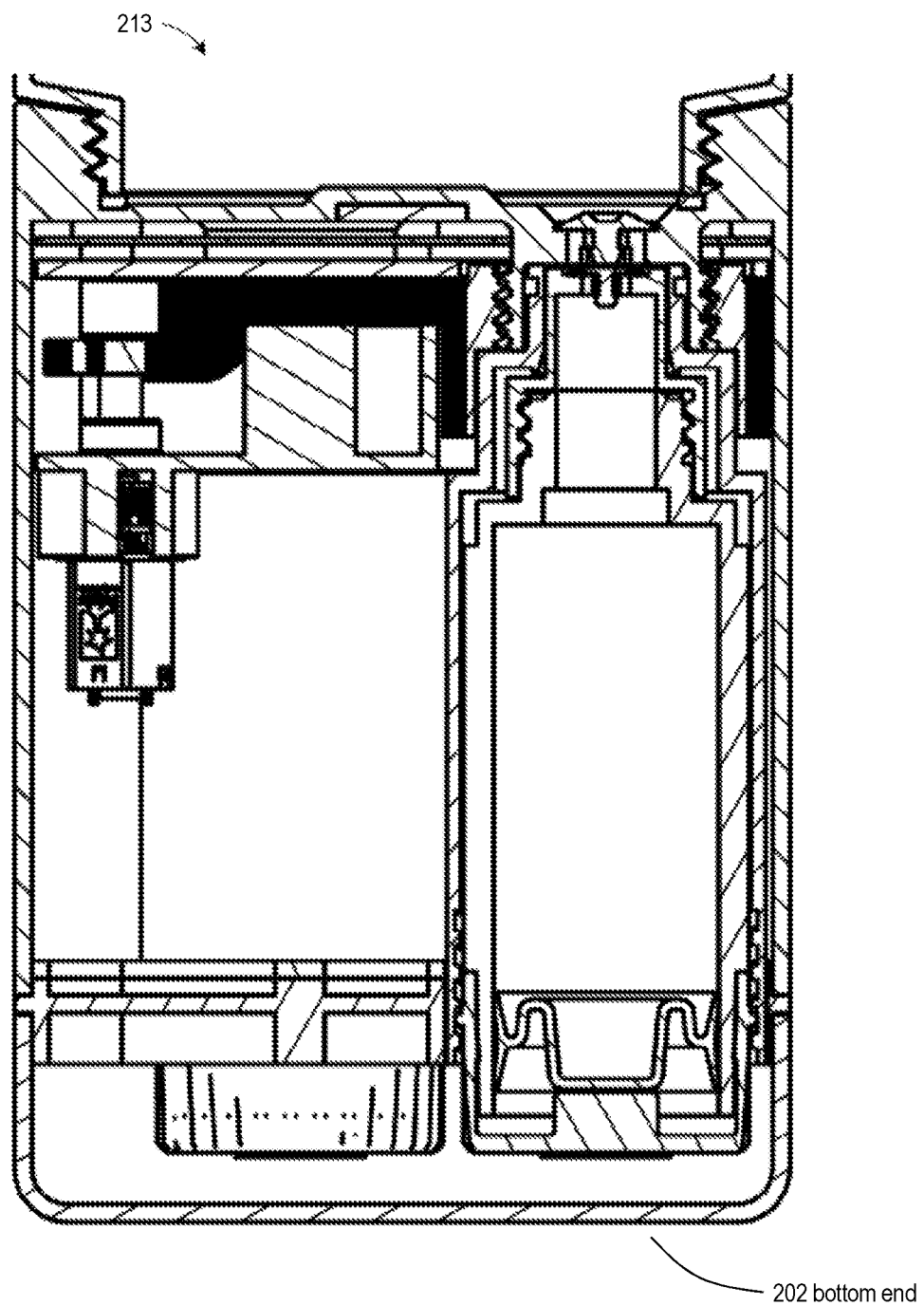
FIGS. 11A-11C illustrate three different cross-sectional cutaway views of the dispensing assembly 213.
Figure 11B:
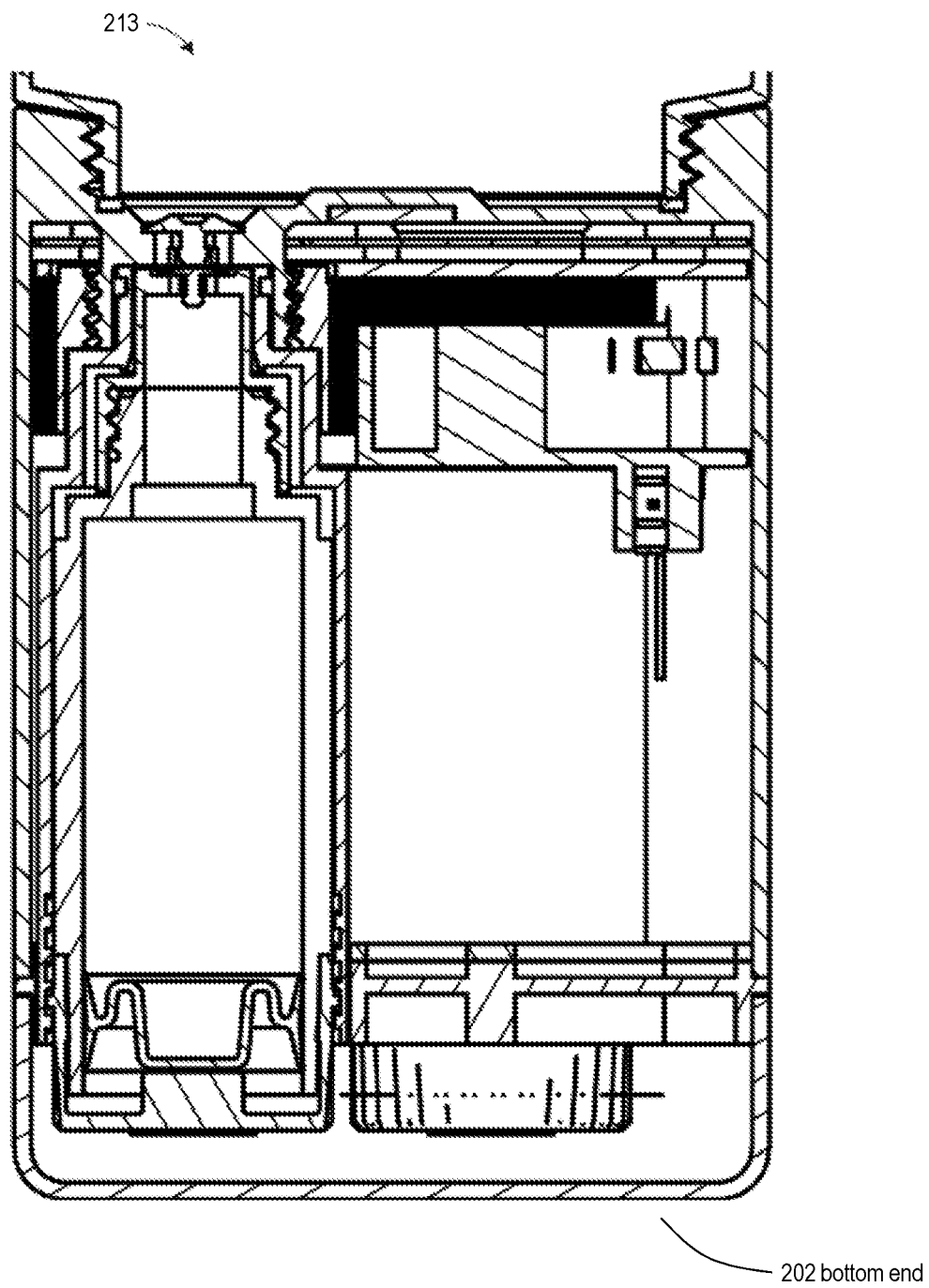
Figure 11C:
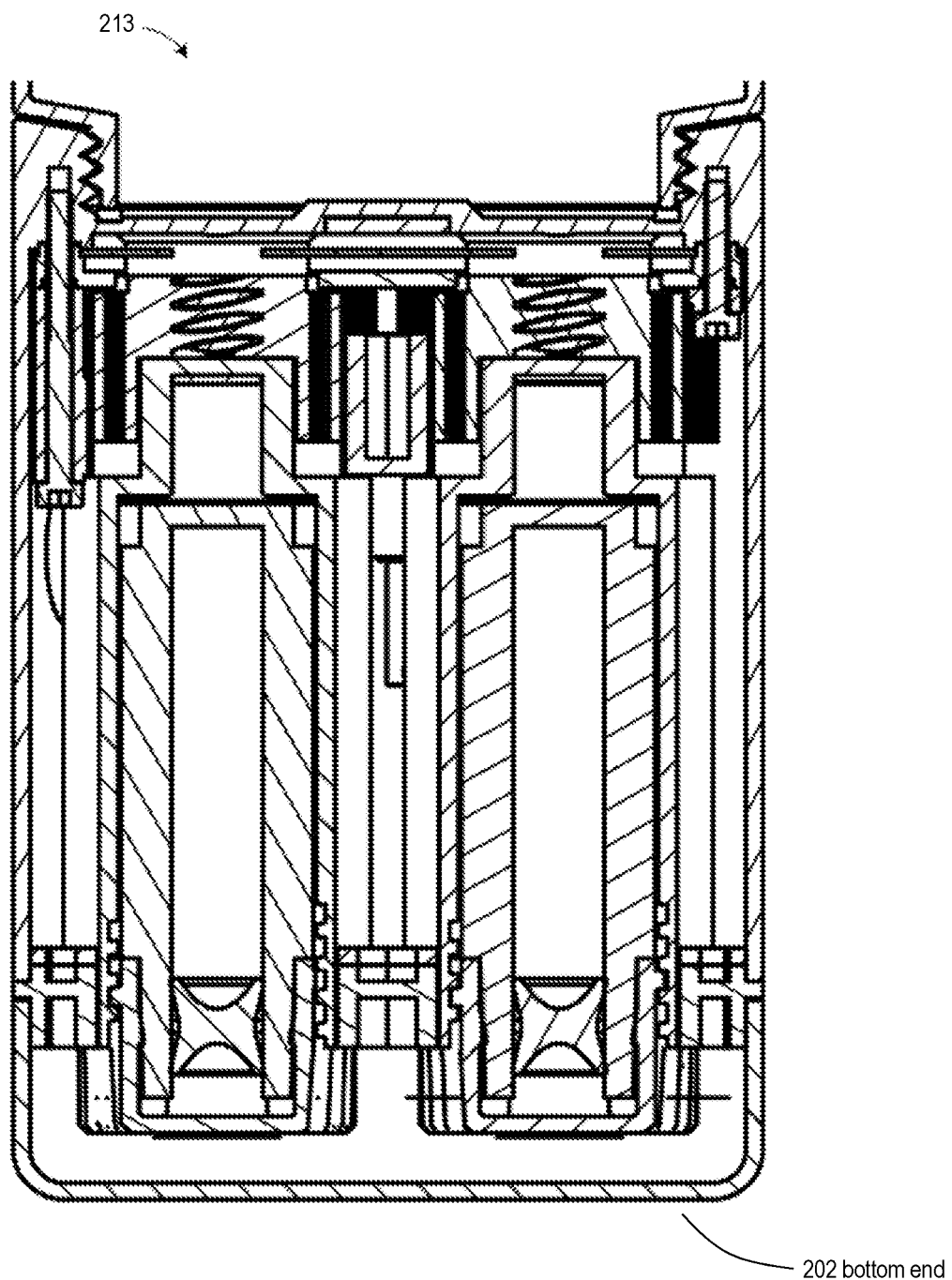
Figure 12A:
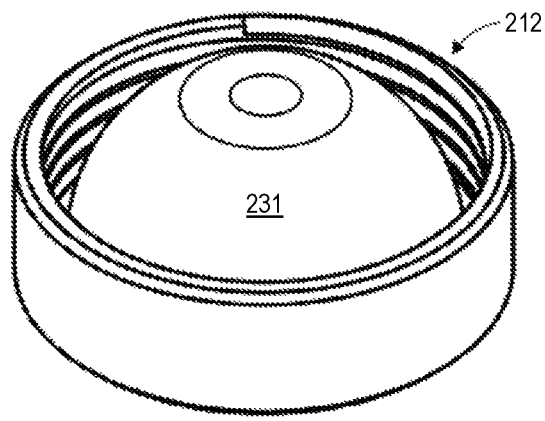
FIGS. 12A-12B illustrate isometric and cutaway views of a removable cap in accordance with one or more embodiments.
Figure 12B:
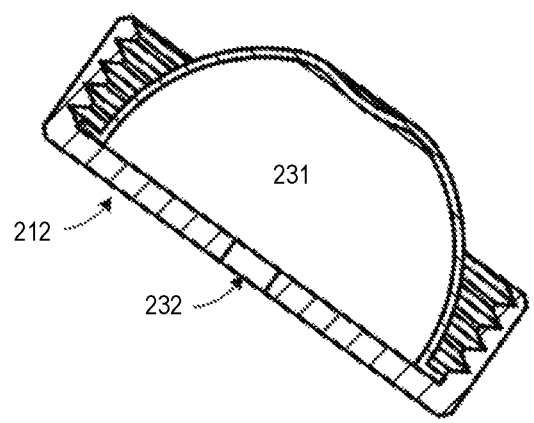

FIGS. 11A-11C illustrate three different cross sectional cutaway views of the dispensing assembly 213. FIGS. 12A-B illustrate isometric and cutaway views of the removable cap 212. As discussed above with reference to FIG. 2, in the illustrated embodiment, the cap 212 seals a top opening of the beverage chamber housing 214 to complete the chamber 230. The cap 212 can be configured to thread or snap on to a top end of the beverage chamber housing 214. The cap 212 includes a compressible bladder 231 formed of silicone or other suitable rubber, that allows for deformation of the bladder so as to accommodate the addition of liquid additives into the chamber 230 by the dispensing assembly 213. The cap 212 also includes an air passageway 232 to allow air to escape from behind the bladder 231 so that the bladder can compress to accommodate the addition of the liquid additives. As shown in FIGS. 12A-B, the bladder 231 can be configured with a dimpled dome shape that yields an approximately linear resistance to deformation.

Figure 13:
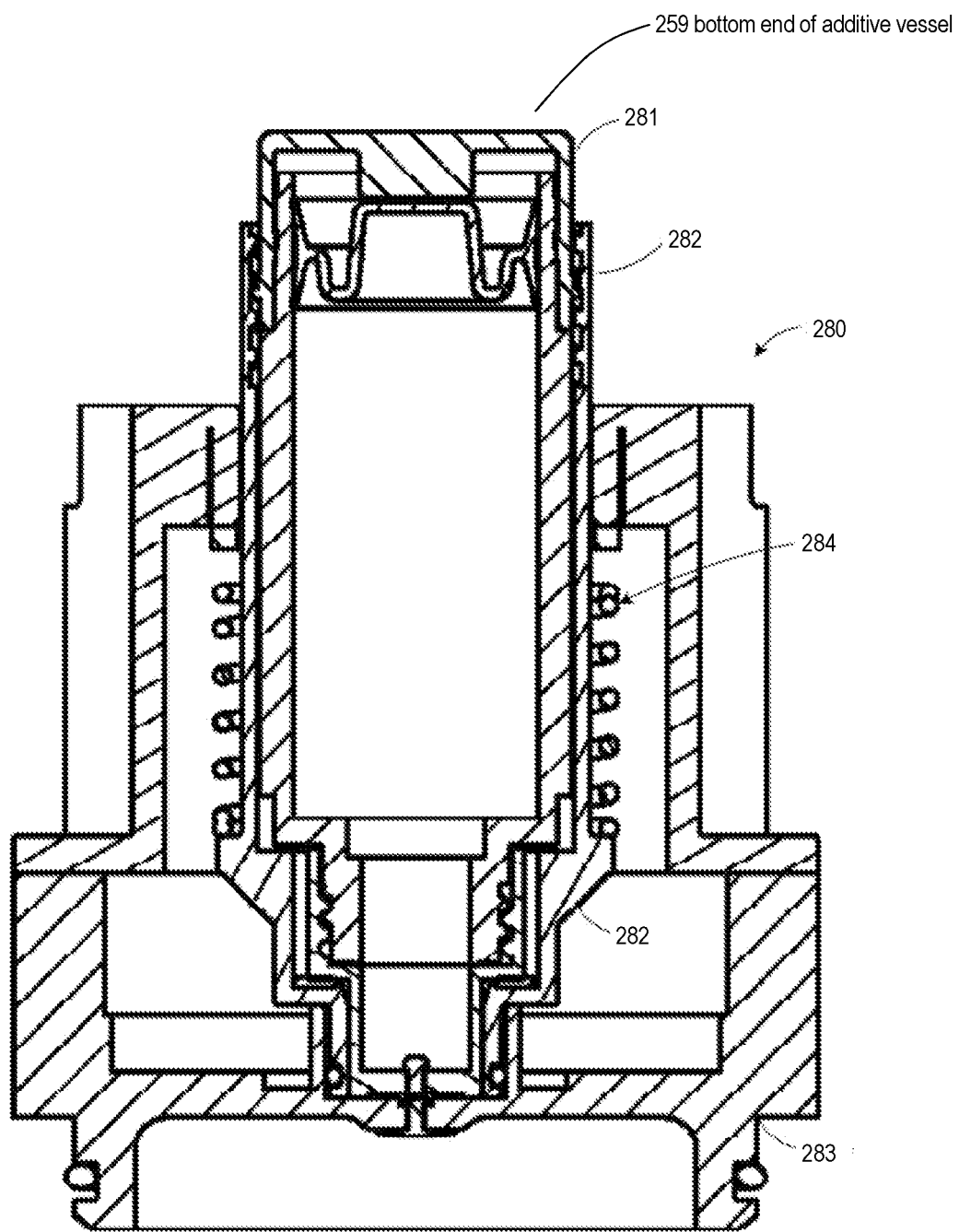
FIG. 13 illustrates a cutaway view of a pumping mechanism in accordance with one embodiment.

FIG. 13 illustrates a cutaway view of a pumping mechanism 280 in accordance with one embodiment. Similar to the embodiments discussed above with reference to FIGS. 2-12, an additive vessel 281 is received in a receptacle 282, which engages within a pump housing 283. Two one-way valves similarly work together with a sliding piston and cylinder to pump additive liquid through a pumping chamber. In the embodiment illustrated in FIG. 13, however, the receptacle 282 can be actuated manually, by a user grasping and withdrawing the receptacle from the pump housing 283, or by another mechanical means. The receptacle 282 is withdrawn against pressure of a spring 284, which is biased to press the receptacle back to its start position, such that when the receptacle is released, any additive fluid drawn into the pumping chamber is then automatically ejected into the beverage chamber.

Figure 14A:
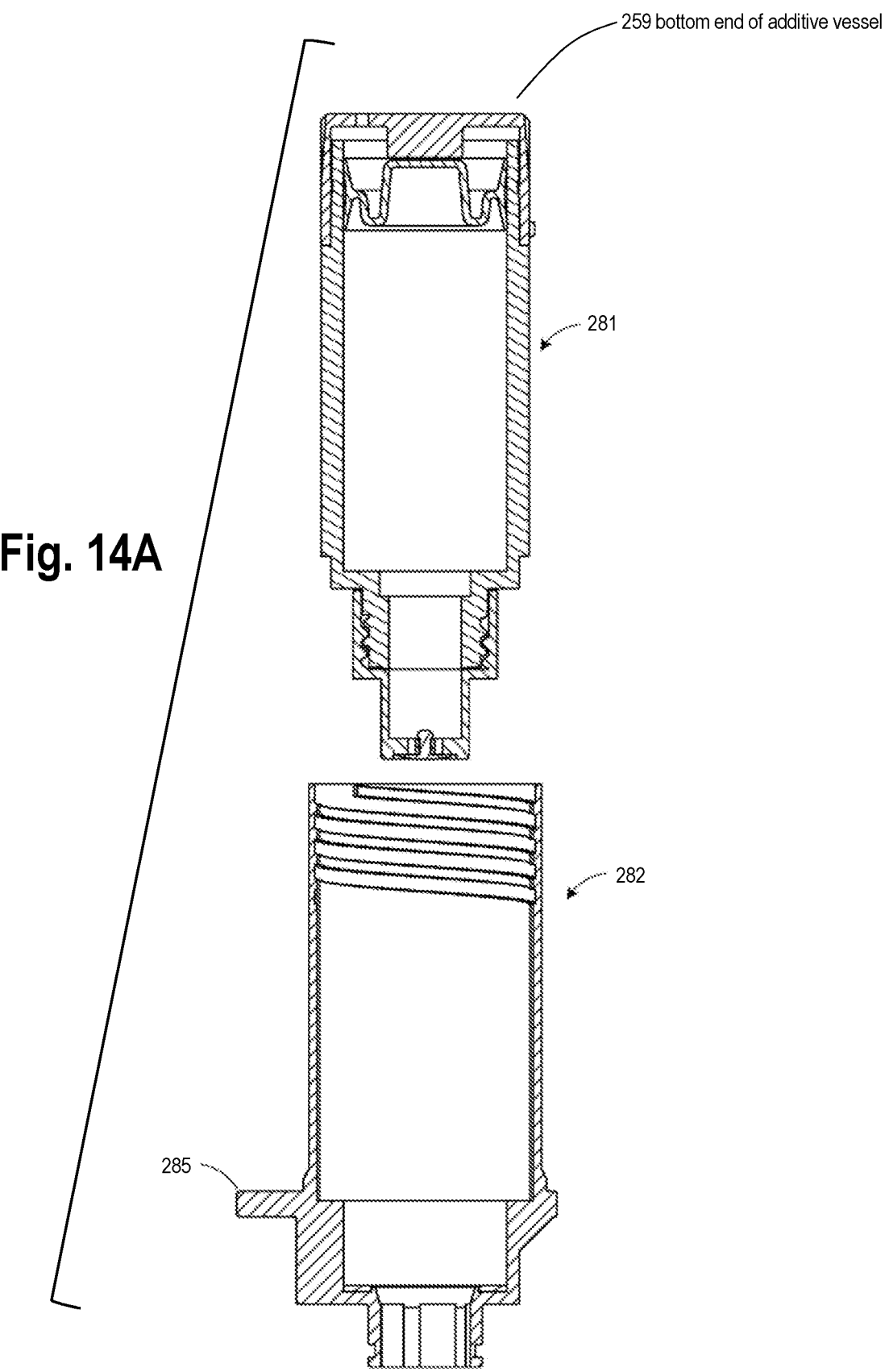
FIG. 14A illustrates a cutaway view of a receptacle of the embodiment of FIG. 13, but shown from a different perspective rotated 90 degrees around a vertical axis in accordance with one or more embodiments.

FIG. 14A illustrates a cutaway view of the receptacle 282 of the embodiment of FIG. 13, but shown from a different perspective rotated 90 degrees around a vertical axis. The receptacle 282 includes a tab 285 that can be used either manually or actuated by a mechanism in order to withdraw the receptacle against the tension of the spring 284 from the pump housing 283. FIG. 14A also shows the additive vessel 281 removed from the receptacle 282.

Figure 14B:
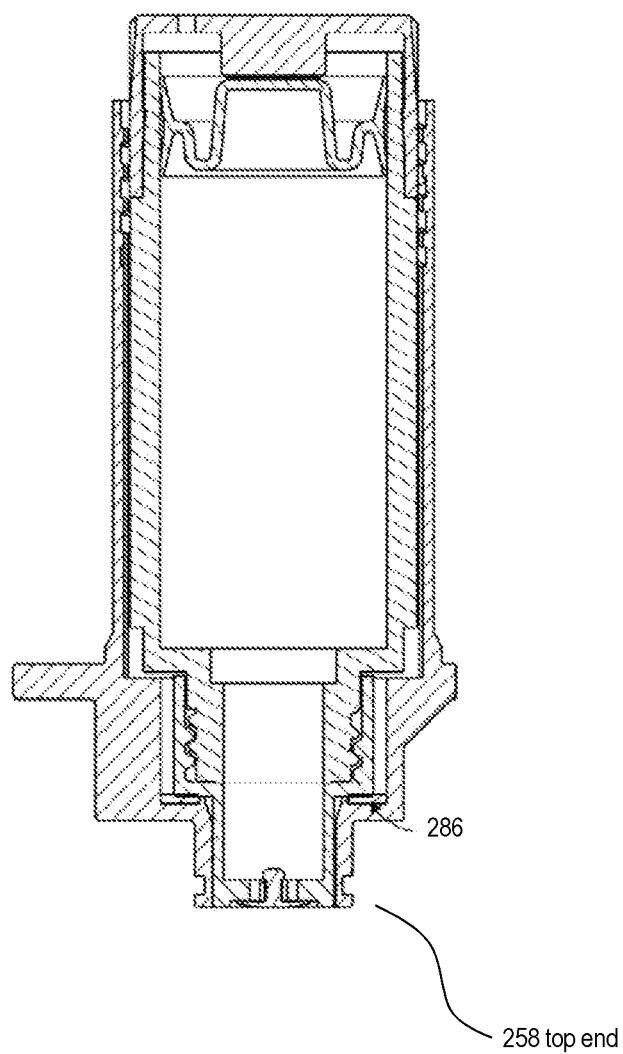
FIGS. 14B and 14C illustrate a seal placed in a shoulder portion of the receptacle that serves a vacuum breaker function as an additive container is withdrawn from the receptacle in accordance with one or more embodiments.
Figure 14C:
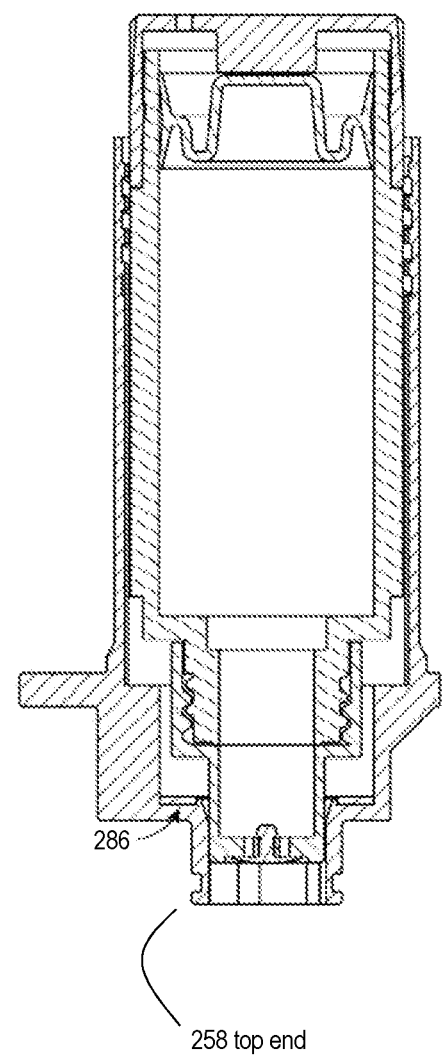

FIGS. 14B and 14C illustrate a seal 286 placed in a shoulder portion of the receptacle 282 that serves a vacuum breaker function as the additive vessel 281 is withdrawn from the receptacle. Once the additive vessel 281 is withdrawn even a slightest amount, the vessel no longer contacts the seal 286 and therefore air is allowed to pass into the pumping chamber area as the vessel is withdrawn. If no air were allowed to pass into the pumping chamber, the action of withdrawing the vessel or additive vessel would create a vacuum that would suck additive fluid out of the vessel and into the now open pumping chamber.

FIGS. 15A-D illustrate different configurations of additive vessels, containers or pods for liquid additives that can be used in accordance with various embodiments. FIG. 15A illustrates an airless or non-vented rear load vessel with a rigid tubular side wall. The additive vessel of FIG. 15A is similar in function to the vessel 250 illustrated in FIGS. 5A-B, with a plunger 257 that moves to prevent air from entering the vessel. FIG. 15B illustrates an airless front load vessel with a rigid tubular side wall. FIG. 15C illustrates a collapsible bag or sachet enclosed within an outer container. The collapsible bag makes the plunger unnecessary. FIG. 15D illustrates a vented additive vessel, which allows air to pass back into the vessel to take the place of pumped additive fluid. A two-way valve 290 allows additive fluid to pass out of the vessel through a center portion of the valve, while air is allowed to enter the vessel through ports 291 around the periphery of the valve and under an umbrella portion of the valve.

Figure 16:
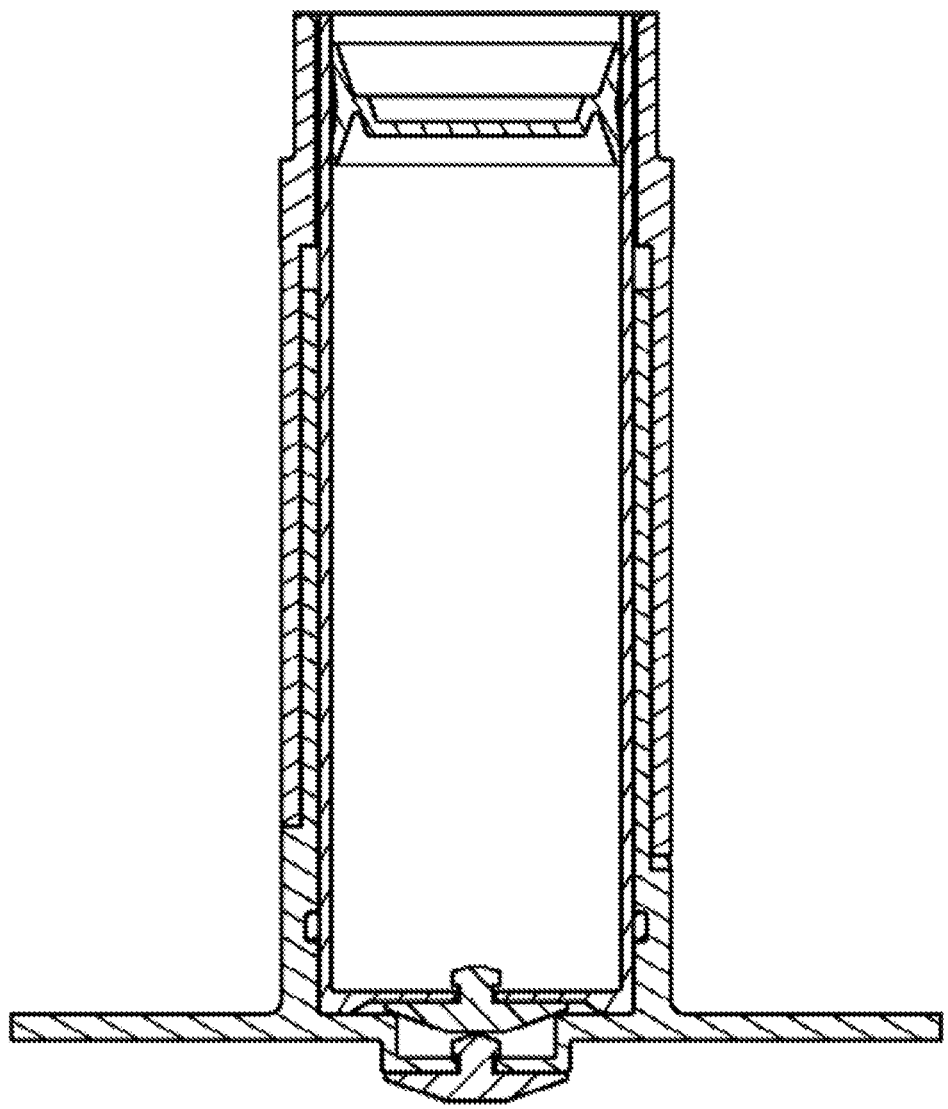
FIG. 16 illustrates a simplified positive displacement pumping mechanism that can be used with various actuation mechanisms in accordance with various embodiments.

FIG. 16 illustrates a simplified positive displacement pumping mechanism that can be used with various actuation mechanisms in accordance with various embodiments.

One benefit of the foregoing described positive displacement pump configurations is that when the additive vessel is withdrawn and when the beverage chamber housing is removed from the dispensing assembly all parts of the pumping mechanism become visible and accessible for cleaning. The pumping chamber is accessible through the receptacle and only a one-way umbrella valve, for example, sits in the port between the pumping chamber and the platform which is otherwise also accessible for cleaning. A one-way umbrella valve can be easily removed and cleaned or replaced.

As noted above, the various features and functionality of the embodiments described above with reference to FIGS. 2-12, and further with respect to FIGS. 13-16, can be combined as desired. In general, various features and functionality of the embodiments described herein can be combined and used in conjunction with various features and functionality of other embodiments.

For example, the dispensing assembly 213 illustrated in FIG. 3 can be further configured with an attachment sensor that monitors whether the beverage chamber housing 214 is threaded onto the dispensing assembly 213 before a dispensing event occurs. An attachment sensor can replace or supplement a lid sensor and checks can be performed before initiating a dispensing event. Each additive vessel can be configured with an RFID tag. In the various embodiments of FIGS. 2-16, each vessel can be configured with its own separate pumping mechanism 260.

Figure 17:
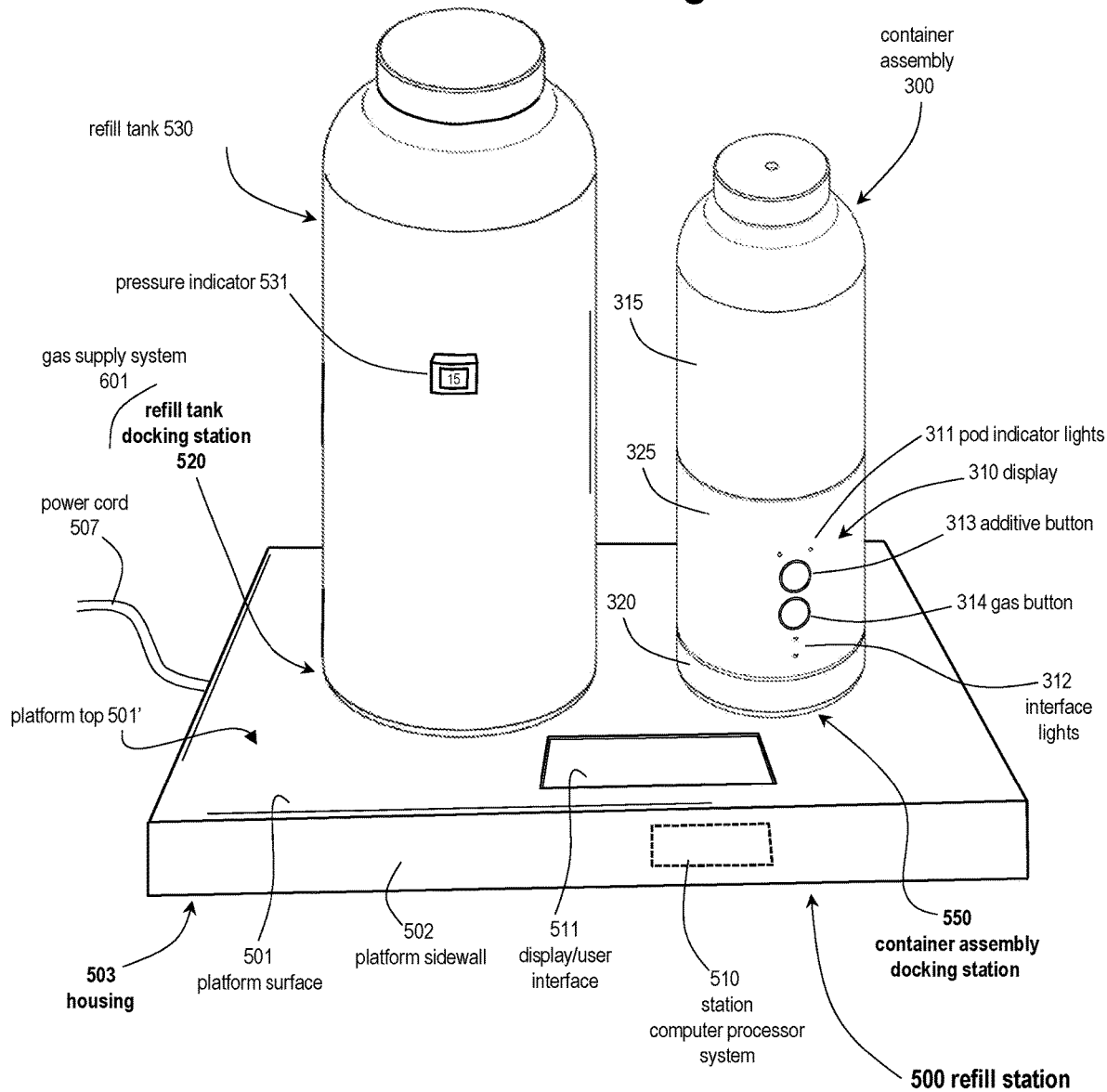
FIG. 17 is a perspective view of a hydration system or system, in accordance with at least one embodiment of the invention.

Various features and aspects of hydration systems of the disclosure are described above. In accordance with at least some embodiments, as described above in conjunction with FIG. 1, a hydration system of the disclosure can include gas dispensing in conjunction with dispensing of additives. FIG. 17 is a perspective view of a hydration system or system 600, in accordance with at least one embodiment of the invention.

As shown in FIG. 17, the hydration system 600 includes a refill station 500. The refill station 500 can include a container assembly docking station 550 and a refill tank docking station 520. The container assembly docking station 550 can engage with a container assembly 300. The refill tank docking station 520 can engage with a refill tank 530. When both the refill tank 530 and the container assembly 300 are engaged with the refill station 500, gas can be transmitted or pass from the refill tank 5302 the container assembly 300. The refill tank 530 can include a pressure indicator 531 that indicates pressure within the refill tank 530. Such pressure within the refill tank 530 in turn reflects an amount of gas that is still left in the refill tank 530.

The refill station 500 can include a housing 503 of the refill station 500. The housing 503 can include a platform top 501' and a platform sidewall 502. The housing 503 can also include a station bottom. The platform top 501' can be a structural member that includes a platform surface 501. The refill tank docking station 520 can be provided in or on the platform surface 501. The container assembly docking station can also be provided in or on the platform surface 501.

The refill station 500 can be provided with a station computer processor system 510. The station computer processor system 510 can perform various functions including monitoring the status of the refill station 500 and interfacing with a user. Relatedly, the refill station 500 can include a display interface or user interface 511. The user interface 511 can display various information regarding the status and operation of the refill station 500. The user interface 511 can be controlled by and/or interface with station computer processor system 510. Further details are described below. The refill station 500 can be powered by AC power, such as utilizing a power cord 507. The refill station 500 can be battery-powered.

In some embodiments, the refill station 500 can be unpowered, i.e., not use battery or AC current. As shown in FIG. 17, the container assembly 300 is mounted or engaged with the container assembly docking station 550. The container assembly 300 can be similar in structure and functionality to the container assembly 200 described above and herein. The container assembly 300 can include any of the features of the container assembly 200 as may be desired. The container assembly 300 can include a computer processor system 301 that includes a suitable database or other computer memory. The computer processor system 301 can be provided with computer readable instructions to perform the various operations and/or functionality as described herein.

As shown in FIG. 17, the container assembly 300 can include a beverage chamber housing 315, a base cover 320 and a housing cover 325. The housing cover 325 can be positioned between the beverage chamber housing 315 and base cover 320. The housing cover 325 can be provided with various user interface features, such as buttons or lights. Any number of user interface features can be provided so as to afford desired user control of functionality and so as to effectively control the status of the container assembly 300 and the hydration system 600 in general. An additive button 313 and a gas button 314. In accordance with at least one embodiment of the invention, a user can press the additive button 313 so as to dispense additive, from an additive vessel or vessels, into liquid contained in the container assembly 300. The user can press the gas button 314 so as to dispense gas, from an onboard gas tank, into the liquid contained in the container assembly 300. In manner as described above, the container assembly 300 can include pod indicator lights 311. The pod indicator lights 311 can be provided to represent or show which pod is selected to dispense an additive. For example, each of the pod indicator lights 311 can be associated with a respective pod, i.e. additive vessel, in the container assembly 300. When a user presses the additive button 313, the selected pod (as indicated by one of the pod indicator lights 311) can dispense the desired additive. The particular pod that the user wishes to select can be selected, by the user, through a predetermined sequence of presses of the additive button 313, for example. It is appreciated that the disclosure is not limited to the buttons, lights, and/or other user interface devices shown in FIG. 17. Rather, other user interface arrangements, features or functionality may be utilized. The interface lights 312 can provide the user with various status information regarding the bottle.

Additionally, a user may interface with the container assembly 300, which contains the computer processor 301, utilizing another user device, such as a smart phone or cell phone. Each of the container assembly 300, the refill tank 530, and the refill station 500 can be provided with computer processor systems that include suitable memory or databases. Further, each of the container assembly 300, the refill tank 530, and the refill station 500 can exchange, communicate, or transmit data to another of such components.

Figure 18:
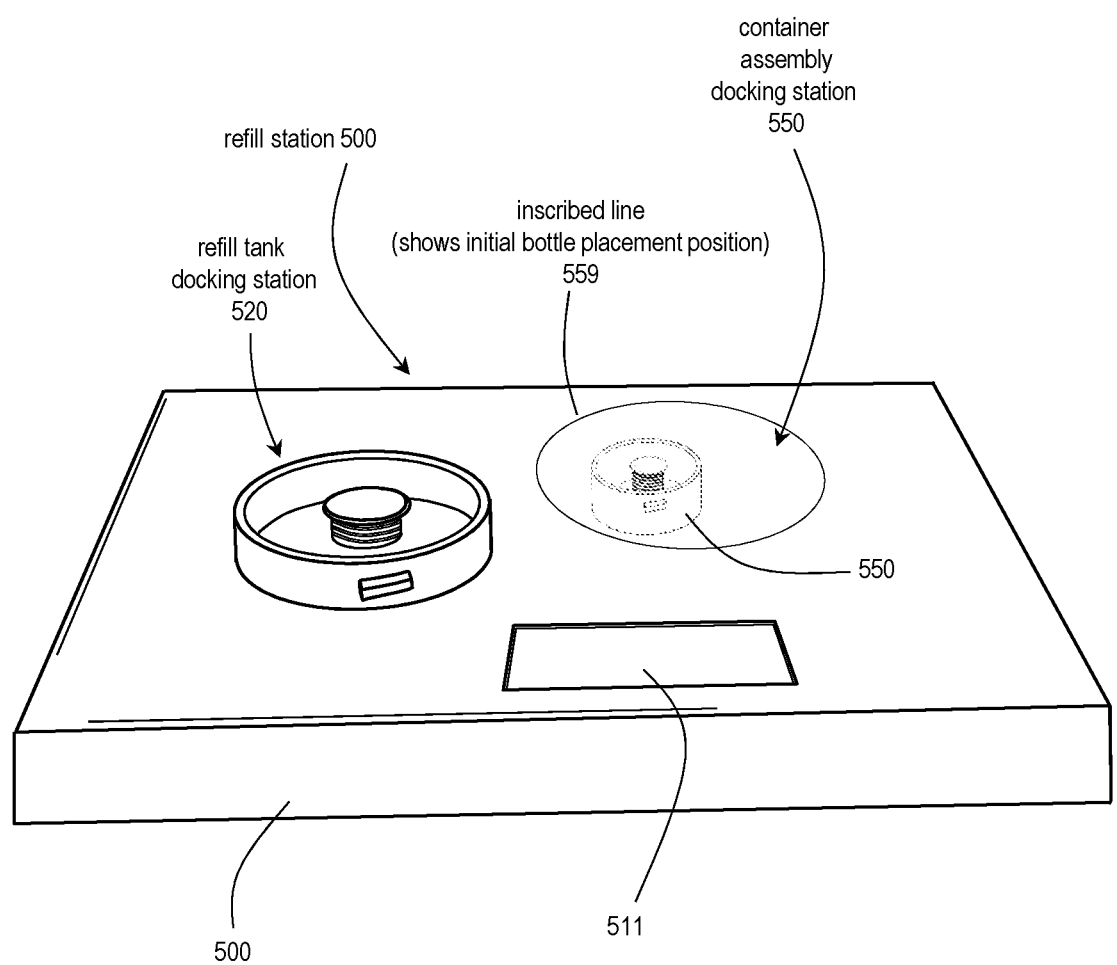
FIG. 18 is a top perspective view of a refill station the same as or similar to that of FIG. 17, in accordance with at least one embodiment of the invention.

FIG. 18 is a top perspective view of a refill station 500 the same as or similar to that of FIG. 17, in accordance with at least one embodiment of the invention. In FIG. 18, the refill tank 530 and the container assembly 300 have been removed. Accordingly, FIG. 18 shows further detail of the refill tank docking station 520 and the container assembly docking station 550. It is appreciated that the spatial arrangement of the platform surface 501, the refill tank docking station 520, the container assembly docking station 550, the user interface 511, and other features of the refill station 500 can be varied in size, interrelationship, relative positioning, and other attributes as desired. The particular size and other structure of the station 520 can be varied based on the particular refill tank 530 to which the refill tank docking station 520 will be engaged with or mated with. Also, the particular size and other structure of the container assembly docking station 550 can be varied based on the particular container assembly 302 which the docking station 550 will be engaged with or mated with.

The container assembly docking station can engage with the container assembly 300 in a non-concentric or non-centered relationship. In other words, engagement flange or other engagement member, which engages with the container assembly docking station 550 can be off-center of the container assembly 300. Such off-center arrangement may be needed or desired so as to provide for a desired spatial positioning of other components in the container assembly 300. Accordingly, it may be desired to provide an inscribed line or other indicia 559 on the platform surface 501 so as to show a user the desired position at which the container assembly 300 can be placed upon the platform surface 501. Relatedly, indicia on the platform surface 501 can be provided that matches with corresponding indicia on the container assembly 300. Such matching indicia can be provided so as to assist or ensure that the container assembly 300 is correctly placed upon the platform surface 501. For example, such matching indicia can include respective arrows or other marks that are to be matched, by the user, when placing the container assembly upon the platform surface 501.

Figure 19:
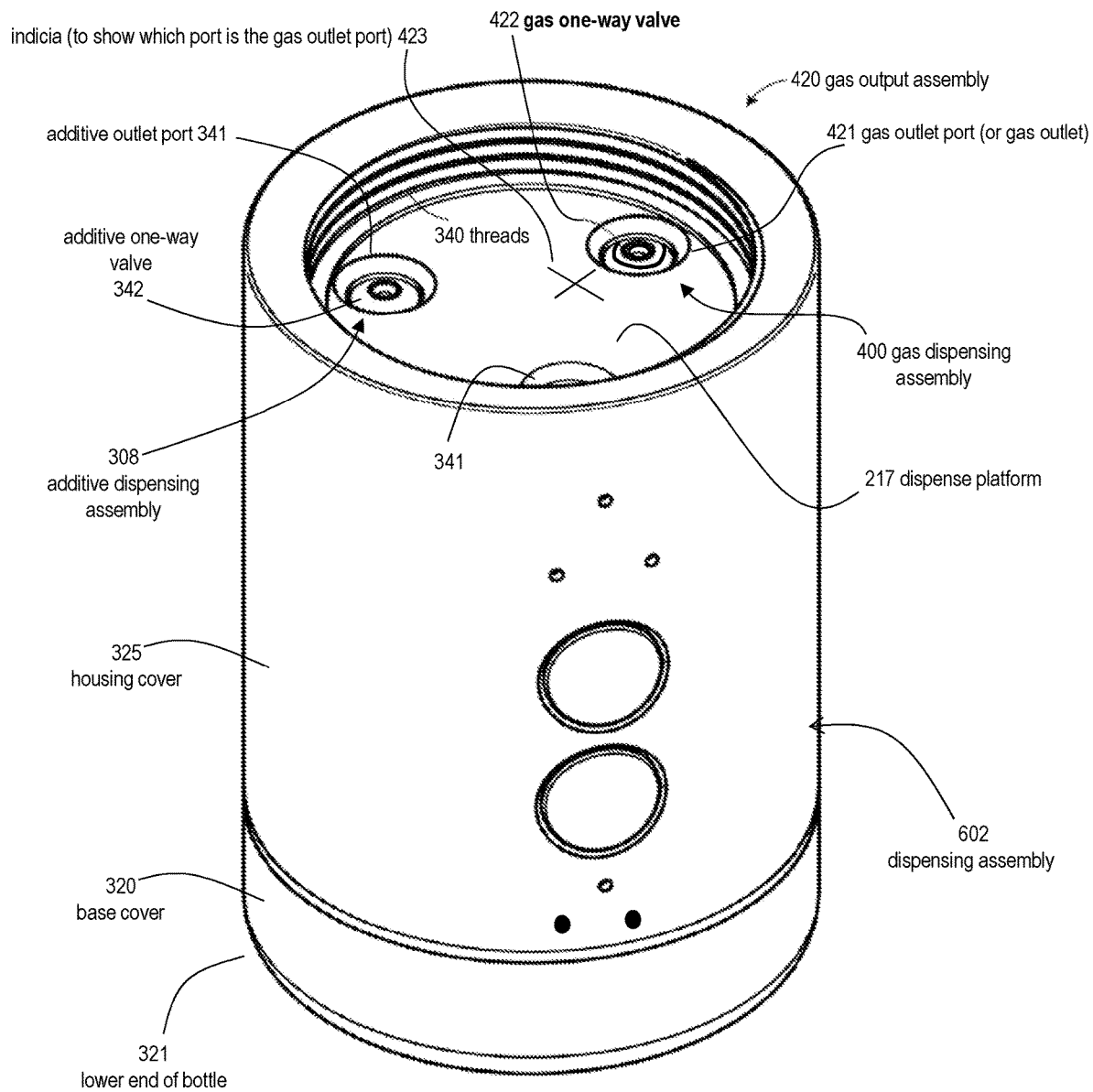
FIG. 19 illustrates a top perspective view of a dispensing assembly with the beverage chamber housing 315 removed, in accordance with one or more embodiments.

FIG. 19 illustrates a top perspective view of a dispensing assembly 602 with the beverage chamber housing 315 removed, in accordance with one or more embodiments. As shown in FIG. 19, the dispensing assembly 602 is in an upright orientation or in a normal use orientation. Accordingly, a lower end 321 of the bottle or container assembly 300 is shown at the bottom of FIG. 19. As shown, the dispensing assembly 602 includes the base cover 320 and the housing cover 325. The housing cover 325 can be removable so as to afford access for maintenance of the container assembly 300. The base cover 320 can be removable, by a user, so as to provide access for cleaning the container assembly 330. As shown in FIG. 19, the housing cover 325 can be provided with various user interface features, such as buttons and lights.

The dispensing assembly 602 can include an additive dispensing assembly 308 and a gas dispensing assembly 400. The additive dispensing assembly 308 includes various structure associated with dispensing of additives. In the arrangement of FIG. 19, the additive dispensing assembly 308 can house or include two removable additive vessels. With the functionality described above, respective additive in the two additive vessels can be dispensed through respective additive outlet ports 341. The additive outlet ports 341 can include an additive one—way valve 342. Each of the one-way valves 342 can allow additive to be dispensed, but prevent liquid from entering into the additive outlet ports 341. As shown in FIG. 19, the dispensing assembly 602 also include a gas dispensing assembly 400. The gas dispensing assembly 400 can include a gas output assembly 420. The gas output assembly 420 can include a gas outlet port or gas outlet 421. Additionally, the gas output assembly 420 can include a gas one-way valve 422. The gas one-way valve 422 can be provided to allow gas to pass out of the gas outlet 421 but prevent liquid from passing into the gas outlet 421. The gas one-way valve 422 can be of same or similar structure to the additive one-way valve 342. The gas one-way valve 422 can be of different structure relative to the additive one-way valve 342.

In the arrangement shown in FIG. 19, there are two additive outlet ports 341, which correspond to two additive vessels, and a single gas outlet port 321. It should be appreciated that the number of outlet ports can be varied as desired. For example, and other arrangement might include one additive outlet port and two gas outlet ports. Further, the outlet ports 341, 321 are arranged in a triangle shape as shown in FIG. 19. However, the invention is not limited such arrangement. The outlet ports 421, 341 can be provided on a dispense platform 217. The dispense platform 217 can be flat in nature or can be curved. The dispense platform 217 can form a bottom extent or surface of the interior volume of the container assembly 300 that holds liquid. The dispense platform 217 can be provided with one or more indicia 423 that can be provided to identify a particular outlet port as distinct from another outlet port. In particular, the indicia 423 can be utilized to identify the gas outlet port 421. In some embodiments of the invention, the gas one-way valve 422 can be of different structure so as to afford distinction in and of itself.

The dispense platform 217 can be provided in a recessed portion that is defined by a cylindrical wall that includes threads 340. The threads 340 can provide engagement arrangement or mechanism to engage with the beverage chamber housing 315. Other engagement arrangement or mechanisms can be utilized such as a friction fit, snap fit, or other arrangement.

Figure 20:
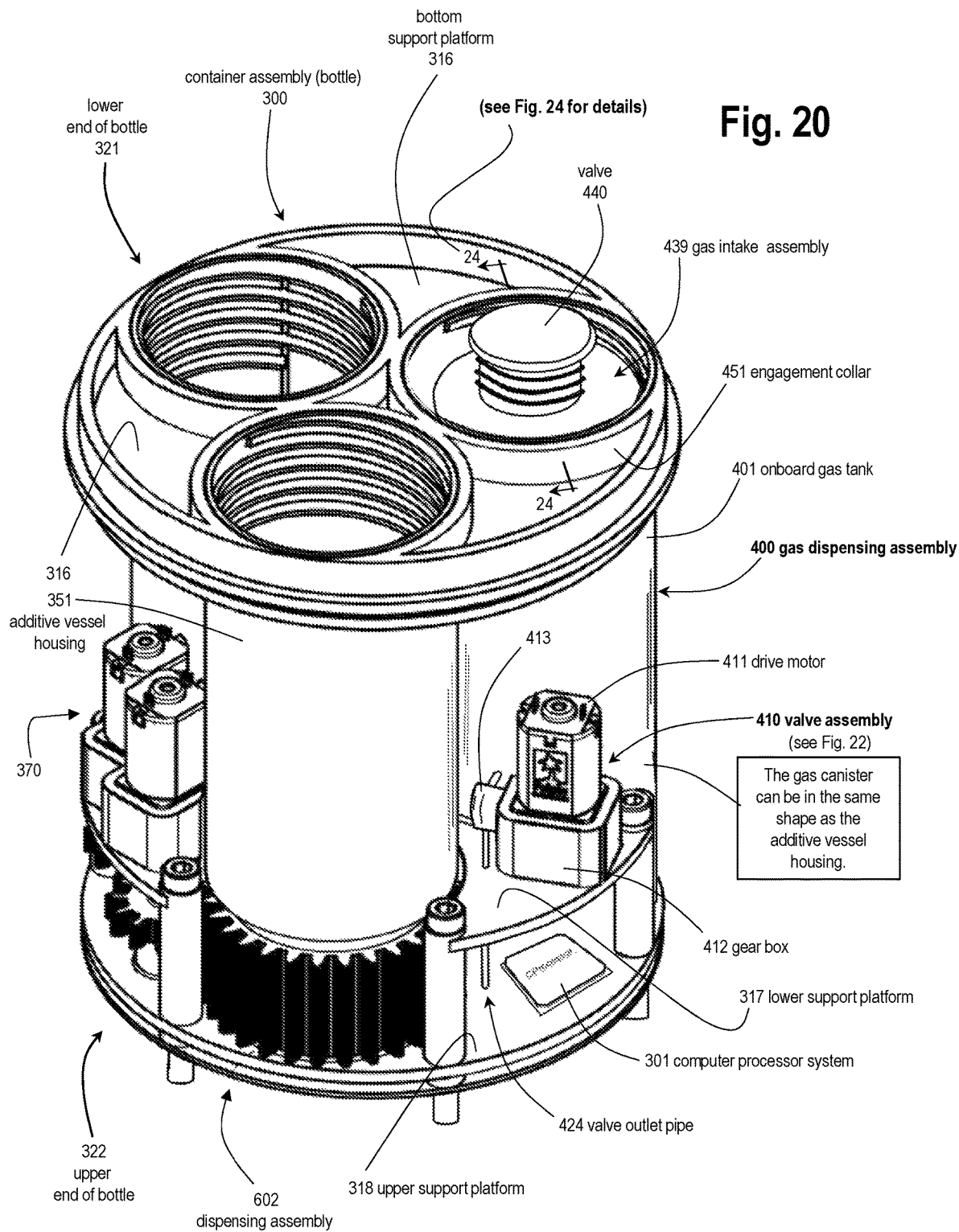
FIG. 20 illustrates a bottom perspective view of the dispensing assembly with a base cover removed and with the housing cover removed, in accordance with one or more embodiments.

FIG. 20 illustrates a bottom perspective view of the dispensing assembly 602 with a base cover removed and with the housing cover 325 removed, in accordance with one or more embodiments. Accordingly, FIG. 20 shows the dispensing assembly 602 in an inverted orientation in contrast to FIG. 19 that shows the dispensing assembly 602 in an upright orientation. Accordingly, FIG. 20 shows a lower end 321 of the bottle or container assembly positioned up, with the upper end 322 positioned down.

FIG. 20 shows various components of the dispensing assembly 602. The dispensing assembly 602 can include two additive vessel housings 351. Each of the additive vessel housings 351 can include or house a respective additive vessel. In manner as described above, additive from each of the additive vessels can be dispersed into liquid contained in the container assembly 300. Respective drive mechanisms 370 can be provided to actuate or effect dispensing from the additive vessels.

As shown in FIG. 20, the dispensing assembly 602 can include various structural platforms, connectors, fasteners, support posts, and other structure. In particular, the dispensing assembly 602 can include an upper support platform 318 and a lower support platform 317. The lower support platform 317 can be positioned below or lower than the upper support platform 318. Additionally, the dispensing assembly 602 can include a bottom support platform 316. Each of the platforms 316, 317, 318 can provide structural support and integrity to the dispensing assembly 602.

The bottom support platform 316, at the bottle lower end 321, can be provided with an engagement collar 451. The engagement collar 451 can encircle or enclose a valve 440 of the gas intake assembly 439. Further details of the valve 440 and related features are described below, such as with reference to FIG. 24. The engagement collar 451 can be of similar structure to the adjacent additive vessel housings. As shown in FIG. 20, the upper support platform 318 can support a computer processor system 301. The computer processor system 301, which can include or be associated with suitable databases or computer memory, can control or provide for operation of the container assembly 300. Various wires or other conductive paths (not shown) can be utilized so as to provide connectivity between the computer processor system 301, various motors or other drive mechanisms of the container assembly 300 and/or other components of the container assembly 300. Such wires or other conductive paths can be in the form of insulated wires that are routed between components. Such wires or other conductive paths can be integrated into one or more components of the container assembly 300.

The arrangement of FIG. 20 also shows additional features of the gas dispensing assembly 400. The gas dispensing assembly 400 can include the onboard tank or onboard gas tank 401. As described below, the onboard gas tank 401 can be filled from an external source. In particular, the onboard gas tank 401 can be filled through engagement with the refill station 500.

Figure 21:
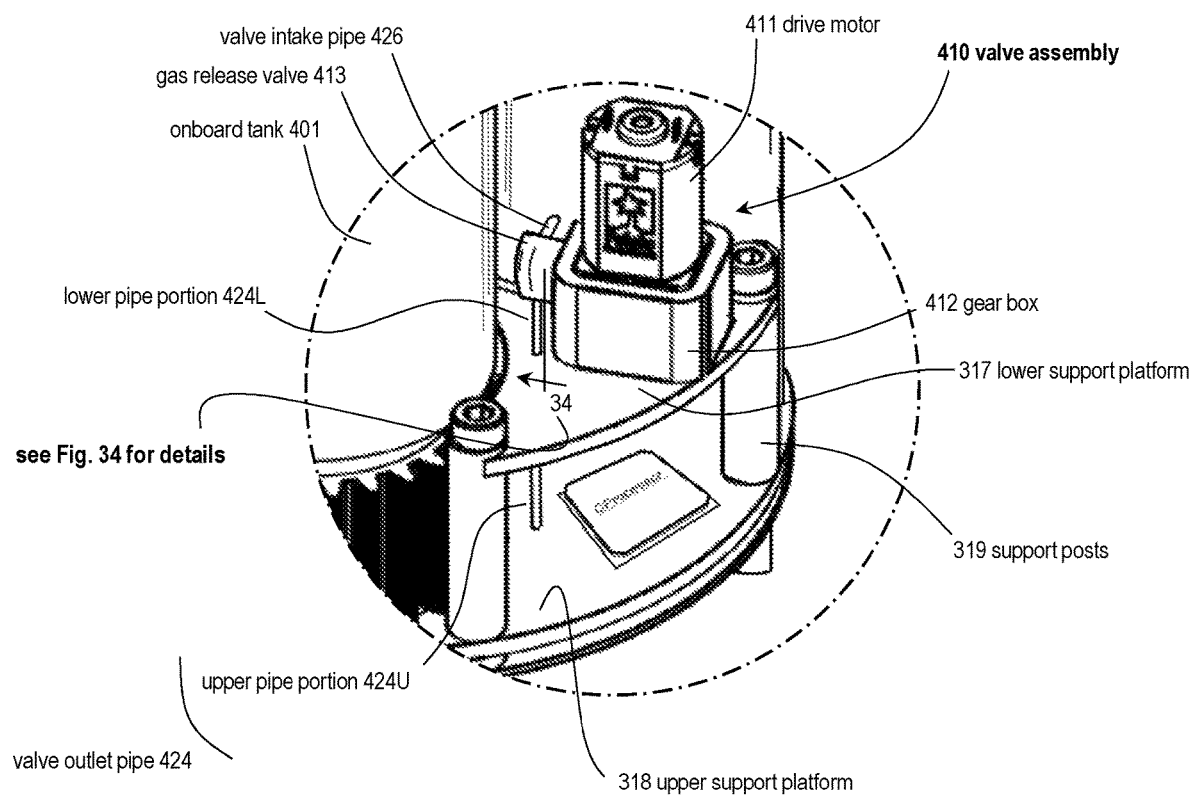
FIG. 21 is a perspective expanded view showing the valve assembly, in accordance with one or more embodiments.

FIG. 20 also shows features of a valve assembly 410. The valve assembly 410 can be provided to control the release of gas from the onboard gas tank 401 into liquid that is contained in the container assembly 300. The valve assembly 410 can include a drive motor 411, a gearbox 412, and a gas release valve 413. Additionally, the gas release valve 413 can be coupled or connected to suitable piping or hose so as to provide flow of gas from the onboard gas tank 4012 the gas release valve 413, as well as from the gas release valve 413 to the gas outlet port 421. Accordingly, the dispensing assembly 602 can include a valve outlet pipe 424. The valve outlet pipe 424 can provide flow of gas from the gas release valve 4132 the gas outlet port 421. Accordingly, the valve outlet pipe 424 can pass through the lower support platform 317. Further details are described below, such as for example with reference to FIG. 22 as shown in FIG. 20, and exterior surface of the onboard gas tank 401 can be configured in shape and look to be of similar appearance to the additive vessel housings 351. The additive vessel housings 351 can be constructed of suitable plastic, for example. On the other hand, it may be desirable to construct the onboard gas tank 401 with metal—so as to provide needed structural strength to contain the enclosed gas. FIG. 21 is a perspective expanded view showing the valve assembly 410, in accordance with one or more embodiments. As shown in FIG. 21, the arrangement is in an inverted or upside-down position. As described above, the valve assembly 410 can include a drive motor 411, a gearbox 412, and a gas release valve 413. A valve intake pipe 426 conveys gas from the onboard gas tank 401 to the gas release valve 413. The gas release valve 413 can, through actuation of the drive motor 411 and the gearbox 412, be selectively adjusted from a closed position to an open position. The motor with gearbox 412 can afford "fine-tuning" of the gas release valve 413 so as to effectively control flow of gas from the onboard gas tank 401 to the gas outlet port 421, i.e. so as to be dispensed into the liquid or beverage of the bottle, i.e. of the container assembly 300. Accordingly, the gas release valve 413 can be opened a very small amount so as to allow a very limited or small flow of gas. On the other hand, the gas release valve 413 can be opened a larger amount if a larger amount of gas flow is desired. In manner as described further below, such gas flow can be controlled by user input, including direct user input such as depressing gas button 314, via programming of the container assembly 300 is performed by the computer processor 301, or may be controlled in some other manner. Instead of drive motor 411, a lever 411' can be mechanically attached to the valve 13 and be physically manipulated (by the user) so as to control the valve 413, as further described below.

As described above, flow of gas between the gas release valve 413 and the gas outlet port 421 can be provided by a valve outlet pipe 424. The valve outlet pipe 424 can include a lower pipe portion 424L and an upper pipe portion 424U. The distinction between the lower pipe portion 424L and the upper pipe portion 424U can be demarcation of the lower support platform 317. Relatedly, the lower support platform 317 and other structural features or components of the dispensing assembly 602 can provide support for pipes, hoses, conduits, or other passageways that are utilized to convey the gas from the tank 401, to the gas release valve 413, and (if the valve is open) to the gas outlet port 421.

As shown in FIG. 21, support posts 319 or other support features can be provided between the upper support platform 318 and the lower support platform 317.

Figure 22:
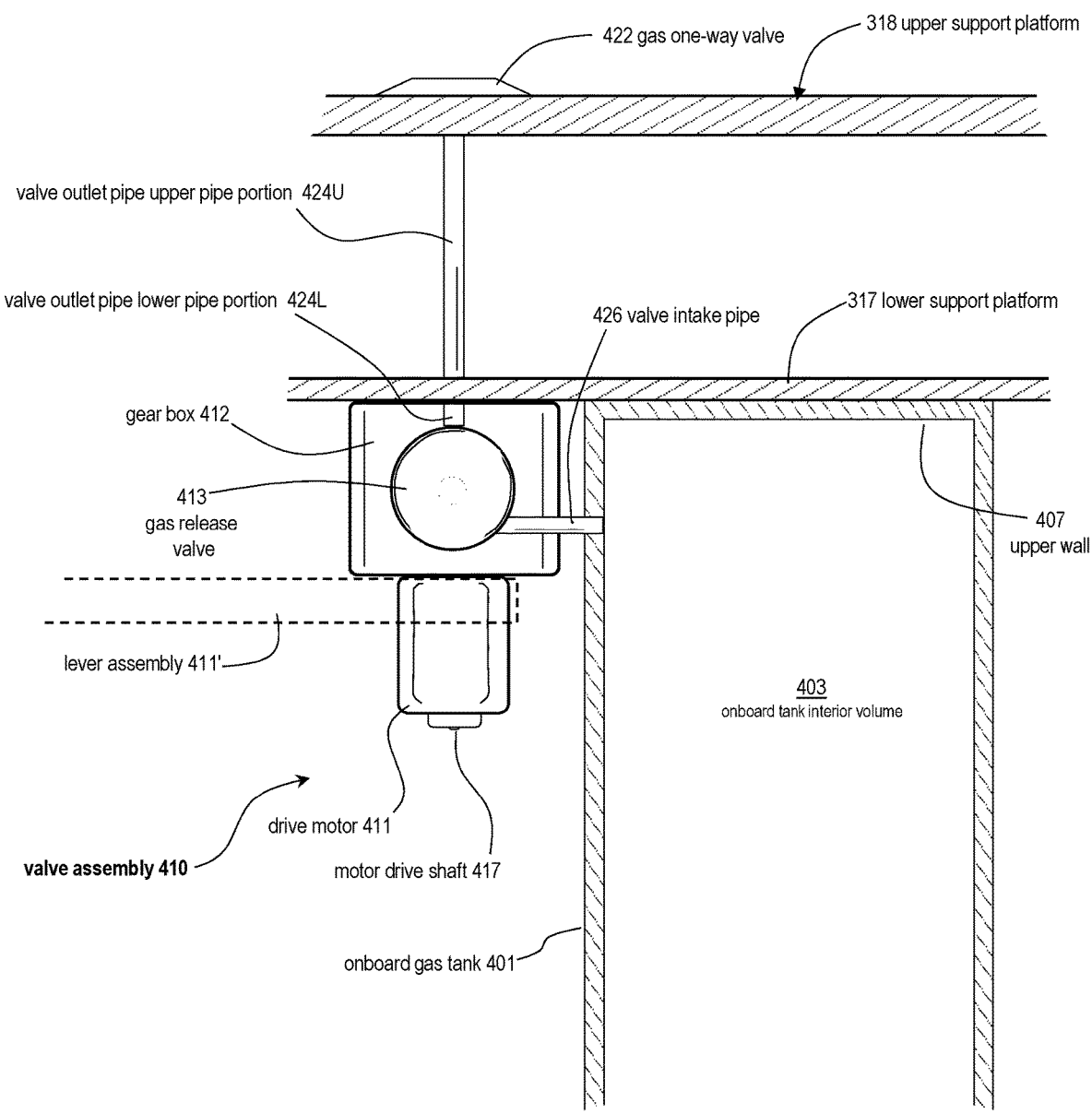
FIG. 22 is a schematic cross-sectional view showing further details of the valve assembly, in accordance with one or more embodiments.

FIG. 22 is a cross-sectional view showing further details of the valve assembly 410, in accordance with one or more embodiments. It is appreciated that FIG. 22 shows structure of the container assembly 300 in the upright position, in contrast to FIG. 21 that shows structure of the container assembly 300 in the inverted or upside-down position.

The dispensing assembly 602, and in particular the valve assembly 410, can include drive motor 411. The drive motor 411 can include motor driveshaft 417. The motor driveshaft 417 can drive a gearbox 412. In turn, the gearbox 412 can drive or actuate the gas release valve 413. The drive motor 411 in conjunction with the gearbox 412 can provide a "geared down" or "geared up" arrangement that may be desirable to effectively control the gas release valve 413. In particular, a geared down arrangement may be desirable for small or finite adjustment of the gas release valve 413. However, in other embodiments of the disclosure, the gearbox 412 can be omitted with the drive motor 411 directly connected to the gas release valve 413.

As shown in FIG. 22, the onboard gas tank 401 includes an onboard tank interior volume 403. The interior volume 403 can contain gas under pressure. For example, the gas in the onboard gas tank 401 can be $CO_2$ (carbon dioxide). However, the systems and methods of the disclosure can work with other gases. For example, the systems and methods of the disclosure can work with oxygen in the onboard gas tank 41. Accordingly, the hydration system 600 of the disclosure can provide for carbon dioxide enriched beverage, oxygen enriched beverage, or beverage enriched with another gas as may be desired. As described above, in operation of the container assembly 300, gas in the interior volume 403 can be under pressure. As a result, gas can flow out of the interior volume 403 into the valve intake pipe 426. In the situation that the gas release valve 413 is in an open position, the gas can then flow through the gas release valve 413 into the lower pipe portion 424L of the valve outlet pipe 424—and then into the upper pipe portion 424U of the valve outlet pipe. Thereafter, gas flows out of the gas one-way valve 422 and into the liquid or beverage contained in the container assembly 300.

As also described above, the gas one-way valve 422 can be provided on the upper support platform 318. The upper support platform 318 can include the dispense platform 217, as shown in FIG. 19, for example. As shown in FIG. 22, the container assembly 300 also includes the lower support platform 317. The lower support platform 317 can serve to support the onboard gas tank 401. In particular, the lower support platform 317 can support the onboard gas station 401 in conjunction with the bottom support platform 316. The onboard gas tank 401 can be connected or attached to the lower support platform 317 and other components utilizing suitable fasteners, adhesive, heat bonding, or other attachment mechanisms. In similar manner, the drive motor 411 can be connected to the gearbox 412; the gearbox 412 connected to the gas release valve 413; and the gearbox 412 connected to the lower support platform 317. The container assembly 300 can include straps, flanges, brackets, or other mechanical arrangements were devices so as to support components of the container assembly 300.

Figure 23:
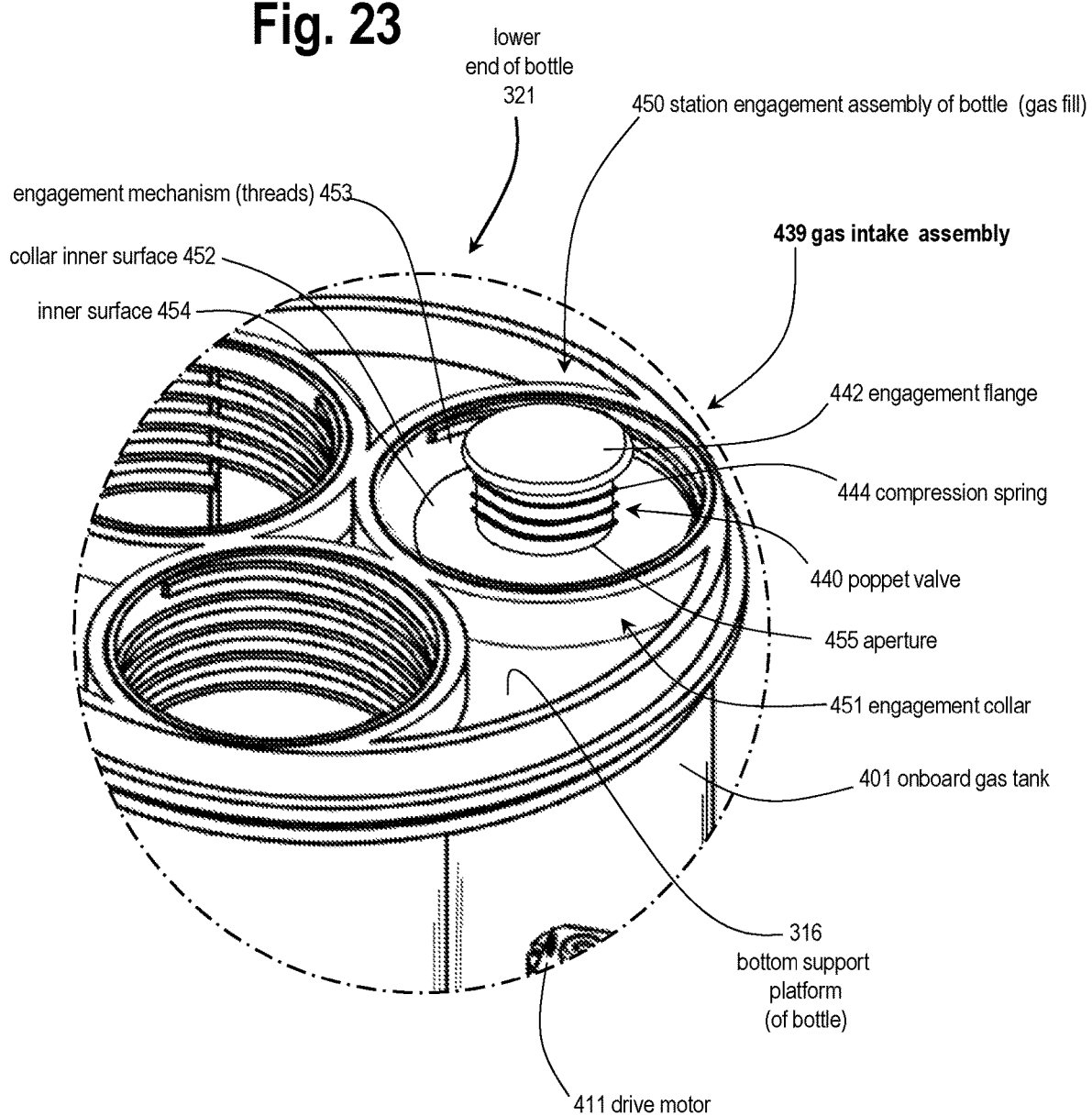
FIG. 23 is an expanded perspective bottom view of the container assembly, in accordance with one or more embodiments.

FIG. 23 is an expanded perspective bottom view of the container assembly 300, in accordance with one or more embodiments. Accordingly, FIG. 23 shows a lower end 321 of the bottle or container assembly 300. In accordance with at least some embodiments of the invention, the onboard gas tank 401 can be filled or refilled utilizing an external source. To provide this functionality, the container assembly 300 can include a gas intake assembly 439. The gas intake assembly 439 can engage with or meet with the refill station 500. In particular, the gas intake assembly 439 can engage with the container assembly docking station 550. Accordingly, the gas intake assembly 439 can be characterized as including a station engagement assembly 450. The station engagement assembly 450 provides for filling of the onboard gas tank 401 with gas through engagement with the container assembly docking station 550.

The gas intake assembly 439, and specifically the station engagement assembly 450, can include engagement collar 451. The engagement collar 451 can include a collar inner surface 452. The collar inner surface 452 can be provided with one or more engagement mechanisms 453. For example, the engagement mechanism can be a threaded arrangement or be part of a twist lock coupling arrangement. As shown in FIG. 23, the engagement collar 451 can be supported upon the bottom support platform 316. The portion of the bottom support platform 316, that is disposed within the confines of the engagement collar 451, can include an inner surface 454. The inner surface 454 can be circular in nature and correspond to the surrounding engagement collar 451. The inner surface 454 can support a valve 440 that is positioned in or extends through an aperture 455. In refilling of the onboard gas tank 401, gas flows through the aperture 455 and into the onboard gas tank 401.

In the example of FIG. 23, the valve 440 includes a poppet valve 440. The poppet valve 440 is one example of a one-way valve that can be utilized. As noted above, FIG. 23 shows a lower end 321 of the container assembly 300. Accordingly, in FIG. 23, the container assembly 300 or bottle 300 is inverted. In operation or engagement of the station engagement assembly 450, the container assembly 300 is in the upright position and can be positioned upon the container assembly docking station 550. The valve 440, in this particular example poppet valve 440, includes engagement flange 442. The engagement flange 442 can include a circular flange or disc that is engageable with a member of the refill station 500. The valve 440 can include a compression spring or other biasing member 444. The compression spring 444 can be supported between the inner surface 454 and the engagement flange 442. In this embodiment, since the spring 444 is in compression, the spring biases the valve 440 into a closed position. Further details are described below with reference to FIG. 24

Figure 24:
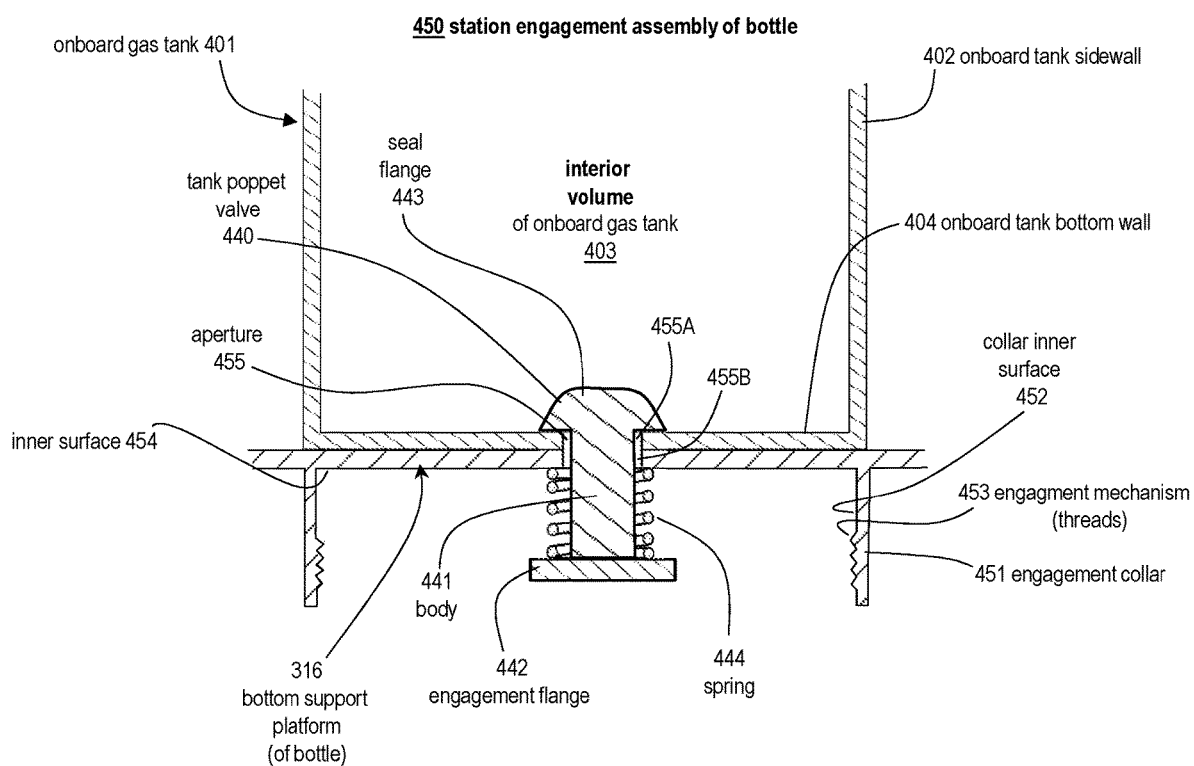
FIG. 24 is a schematic cross-sectional view of the station engagement assembly of the bottle or container assembly 300, in accordance with one or more embodiments.

FIG. 24 is a cross-sectional view of the station engagement assembly 450 of the bottle or container assembly 300, in accordance with one or more embodiments. As shown in FIG. 24, the arrangement is in an upright position, such as in use of the container assembly 300. In accordance with at least some embodiments of the invention, the station engagement assembly 450 can be a component of the gas intake assembly 439. The station engagement assembly 450 can include a valve 440. The valve 440 can include a poppet valve. The valve 440 can include an engagement flange 442, a valve body 441 and a seal flange 443. The valve can also include a spring 444, such as a compression spring.

The valve 440 can be provided on a wall of the onboard gas tank 401 so as to provide for filling of the tank 41. In the example of FIG. 24, the valve 440 is positioned on the onboard tank bottom wall 404. Alternatively, the valve 440 could be positioned on an onboard tank side wall 402. The onboard gas tank 401 can include the onboard tank bottom wall 44, the onboard tank side wall 402, and an upper wall 407. Such walls can collectively form or define an interior volume 403 of the onboard gas tank 41.

The onboard gas tank 401 can be provided upon the bottom support platform 316. The onboard gas tank 41 can be provided on an opposing side to and/or aligned with the inner surface 454. However, such spatial interrelationship is not needed. As shown in FIG. 24, an aperture 455 can be provided to allow gas flow from an exterior gas source into the interior volume of the gas tank 43. The valve 440 can selectively seal or unseal the aperture or hole 455.

The aperture or hole 455 can extend through the bottom wall 404 of the onboard tank and through the bottom support platform 316. Accordingly, the aperture 455 can include a first aperture 455A of the onboard tank bottom wall 404 and a second aperture 455B of the bottom support platform 316. The valve 440 can be biased to a closed position by spring 444. Specifically, the spring 444 can engage with the engagement flange 442 and the bottom support platform 316 and exert force, due to compression of the spring, so as to bias the valve 440 downward as shown in FIG. 24. As a result, the valve 440 is biased to a closed position since seal flange 443 is brought into engagement with the onboard tank bottom wall 404. However, force can be exerted against the engagement flange 442, in an upward direction as shown in FIG. 24, so as to open the valve 440. Such open disposition results, for example, when the station engagement assembly 450 is engaged with the container assembly docking station 550. Such engagement is shown in FIG. 25 and FIG. 26.

Figure 25:
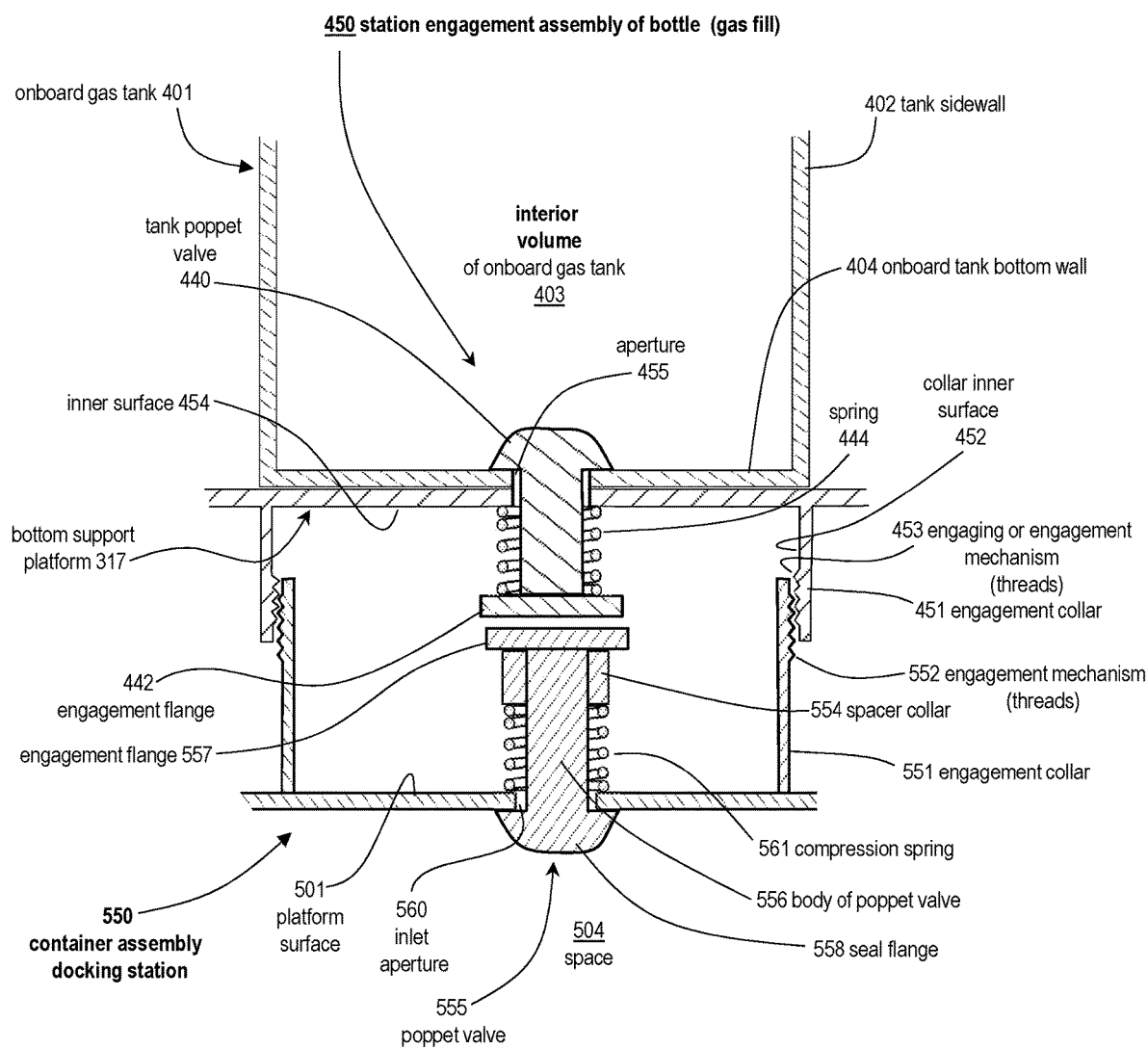
FIG. 25 is a schematic cross-sectional view of the station engagement assembly (of the container assembly 300) engaged with the container assembly docking station, with valves closed, in accordance with one or more embodiments.
Figure 26:
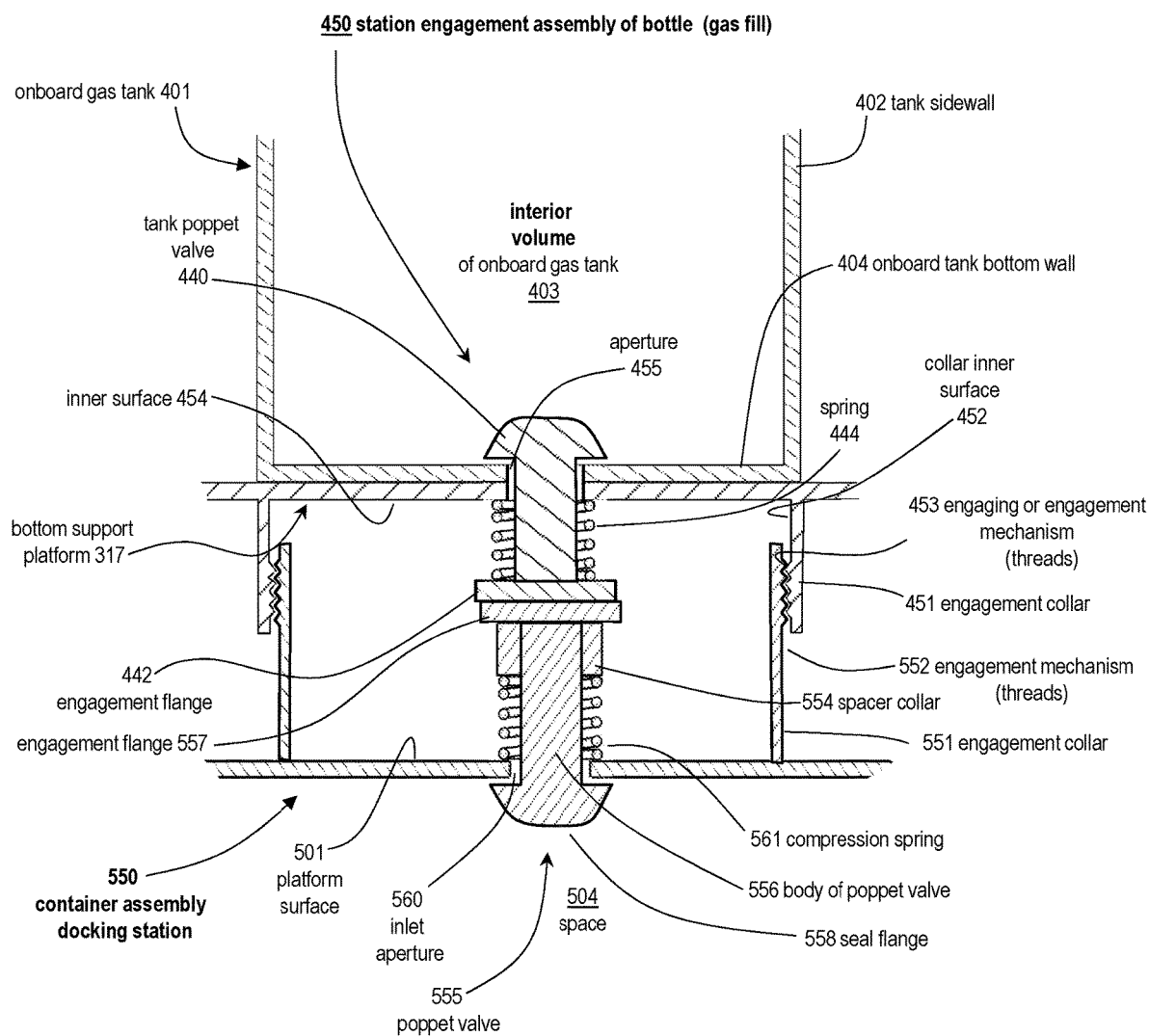
FIG. 26 is a schematic cross-sectional view of the station engagement assembly (of the container assembly 300) engaged with the container assembly docking station, with valves opened, in accordance with one or more embodiments.

FIG. 25 is a cross-sectional view of the station engagement assembly 450 (of the container assembly 300) engaged with the container assembly docking station 550, with valve closed, in accordance with one or more embodiments. In the arrangement of FIG. 25, the station engagement assembly 450, by physical positioning by a user, has been engaged with the container assembly docking station 550, but not to the extent so as to open valve 440. On the other hand, FIG. 26 depicts engagement so as to open valve 440.

The container assembly docking station 550 is shown at a high level in FIG. 18. FIG. 25 shows further details of the container assembly docking station 550. The docking station 550 can include engagement collar 551. The engagement collar 551 can be provided upon the platform surface 501. The engagement collar 551 can include one or more engagement mechanisms 552. The engagement mechanisms 552 can be in the form of threads, angled engaging in locking surfaces, or other engagement mechanisms. As shown in FIG. 25, the engagement mechanism 552 of the engagement collar 551 is engaged with engagement mechanism 453 of the container assembly 300.

The container assembly docking station 550 can include valve 555. The valve 555 can include or be in the form of a poppet valve, for example. The valve 555 can selectively open or close an inlet aperture 560 that is provided in the platform surface 501.

Relatedly, the inlet aperture 560, in the platform surface 501, can provide access or be connected to an interior space 504. The interior space 504 can be filled with a pressurized source of gas that, upon the poppet valve 555 being open, will pass into the interior volume 403 of the onboard gas tank 401. Such passage of gas can be provided due to the pressure differential between the interior space 504 and the interior volume 403. As used herein, "interior space" and "interior volume" bear the same meaning and have been used interchangeably. Accordingly, upon both the valve 555 and the valve 440 being open, and assuming a pressure differential between the interior space 504 and the interior volume 403, gas will flow out of the interior space 504, through an interior space or interior volume created by the attached engagement collars 451, 551, and into the interior volume 403. Flow of gas will occur until pressure is equalized between the interior space 504 and the interior volume 403.

It is appreciated that mechanisms or arrangements can be utilized so as to limit amount of gas that is allowed to escape or be lost in conjunction with connecting the station engagement assembly 450 with the container assembly docking station 550. For example, suitable O-rings or washers constructed of rubber or elastomeric material, for example, can be utilized so as to provide or assist with a gas tight seal. For example, and O-ring or washer can be provided at a top edge of the engagement collar 551 that interacts with the bottom support platform 317. In such arrangement, the engagement collar 551 can be provided to be taller than shown in FIG. 25—so as to engage with the bottom support platform 317.

Relatedly, it is appreciated that the height or size of either the engagement collar 551 or the engagement collar 451 can be adjusted so as to accommodate for other structure of either the container assembly 300 or the refill station 500. For example, the container assembly 300, as described above, can include additive vessels or pods that extend downwardly from the bottom support platform 317. The height of the engagement collar 451 and/or the engagement collar 551 can be constructed so as to match with the distance that the additive vessels extend down. Such arrangement can result in or provide a desirable "seating" of the container assembly 300 upon the refill station 500.

The valve 555 can include a body 556, a seal flange 558, and engagement flange 557. The body 555, as shown in FIG. 25, can include opposing ends upon which the engagement flange 557 and the seal flange 558 our respectively positioned. The valve 555, the valve 440, as well as other valves described herein can be constructed in similar manner in part or in whole. The valve 555, the valve 440, as well as other valves described herein can include similar features as may be desired. Further, it is appreciated that a feature described in conjunction with one valve of the disclosure can be used in in other valve of the disclosure as may be desired.

The valve 555 can also include a spacer collar 554 and compression spring 561. The compression spring 561 acts against the spacer collar 554 and the platform surface 501 so as to bias the poppet valve 555 into a closed position, i.e. biased up as shown in FIG. 25. Upon the engagement collar 451 being screwed onto (or otherwise engaged onto) the engagement collar 551, the engagement flange 442 will contact with the engagement flange 557. As a result of this contact, both the valve 440 and the valve 555 can be pushed to an open position. In other words, contact between the engagement flange 442 and engagement flange 557 can overcome the biasing force of the respective springs 444, 561 so as to force the valves open. Accordingly, FIG. 25 is a cross-sectional view of the station engagement assembly 450 (of the container assembly 300) engaged with the container assembly docking station 550, with valve opened, in accordance with one or more embodiments.

The structure 500 can be characterized as a "refill station" in that such a structure provides for filling the onboard gas tank 401 with gas. The structure 500 might also be characterized as a "recharge station" in that the refill station 500 "recharges" the onboard gas tank 403 with gas.

FIG. 26 is a cross-sectional view of the station engagement assembly 450 (of the container assembly 300) engaged with the container assembly docking station 550, with valve opened, in accordance with one or more embodiments. As shown, the engagement collar 451 is screwed onto the engagement collar 551 a sufficient amount so as to open the valves 440, 555. Upon the valves being open, a user may observe an audible sound (e.g. "pssst") as gas flows from the interior space 504 into the interior volume 403 of the onboard gas tank. At a point in the engagement that the valves 440, 555 are open, the engagement collar 451 can be sufficiently engaged with the engagement collar 551 so as to be gas tight. As a result, gas can be precluded from escaping into the environment.

Figure 27:
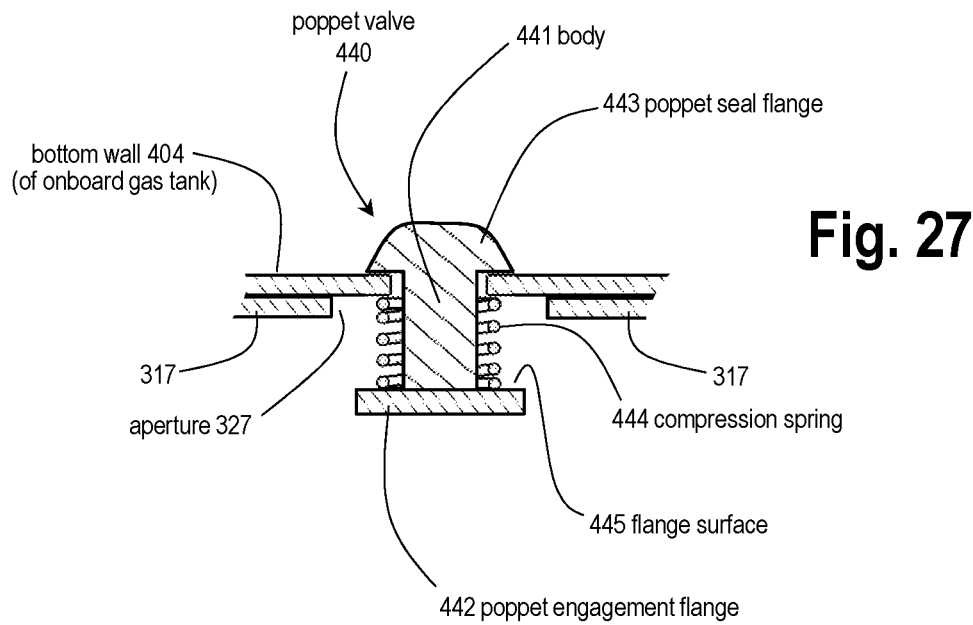
FIG. 27 is a further schematic cross-sectional diagram of the poppet valve of the container assembly, in accordance with at least one embodiment.

FIG. 27 is a cross-sectional diagram of the poppet valve 440 of the disclosure, in accordance with at least one embodiment. As described above, the poppet valve 440 can be utilized on the bottom of the onboard gas tank 401. As shown, the poppet engagement flange 442 can include a flange surface 445. The compression spring 444 can be provided upon an exert force between the flange surface 445 and the bottom wall 404. Upon sufficient pressure being applied to the poppet engagement flange 442, the force of the spring or compression spring 444 is overcome. As a result, the valve is moved up as shown in FIG. 27, i.e., the valve is moved to an open position. FIG. 27 also illustrates an arrangement in which the bottom support platform 317 includes an aperture 327 such that the valve 440 is not engaged with the bottom support platform 317. Rather, the valve 440 is only engaged with the bottom wall 44 of the gas tank.

Figure 28:
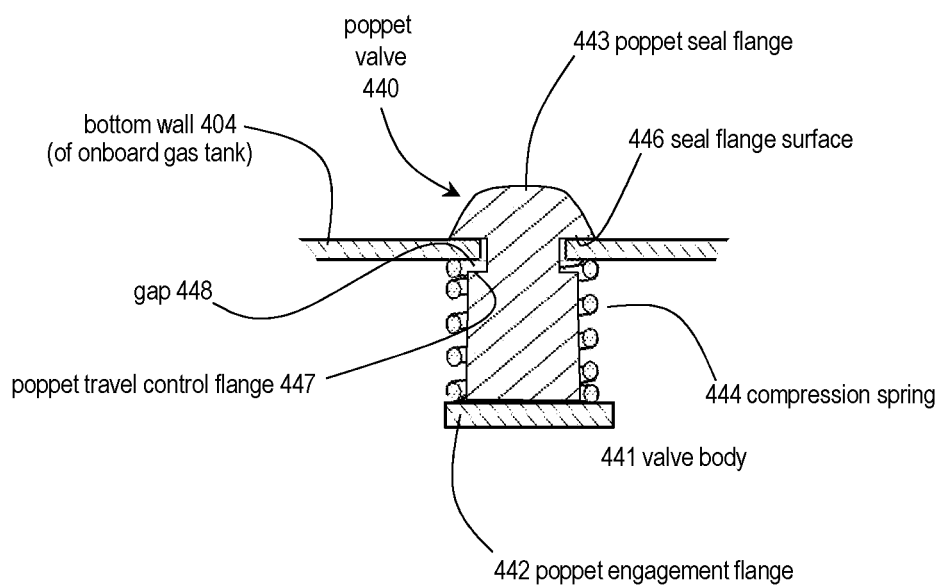
FIG. 28 is a schematic cross-sectional diagram of a further poppet valve, in accordance with at least one embodiment.

FIG. 28 is a cross-sectional diagram of a further poppet valve 440 of the disclosure, in accordance with at least one embodiment.

FIG. 28 illustrates a further poppet valve 440. The poppet valve 440 includes poppet seal flange 443 with the seal flange surface 446. The valve 440 also includes poppet engagement flange 442. A compression spring 444 surrounds a valve body 441. In the poppet valve of 440, the valve is provided with a poppet travel control flange 447. The poppet travel control flange 447 is positioned below the bottom wall 404 of the onboard gas tank, in this example.

The poppet travel control flange 447 limits travel of the valve 440 up and down. A gap 448 is provided between the poppet travel control flange 447 and the seal flange surface 446. Accordingly, travel of the poppet valve 440 up and down, as shown in FIG. 28, is limited. For example, such arrangement can be utilized in conjunction with the poppet engagement flange 442 interacting with another poppet valve—so as to ensure that both poppet valves travel the requisite distance to open. The arrangement can prevent one poppet valve from "sticking" closed and the other poppet valve being opened or moved an excessive amount. In other words, the poppet travel control flange 447 can help ensure that the poppet valve 440 travels an appropriate distance between an open position and a closed position.

Figure 29:
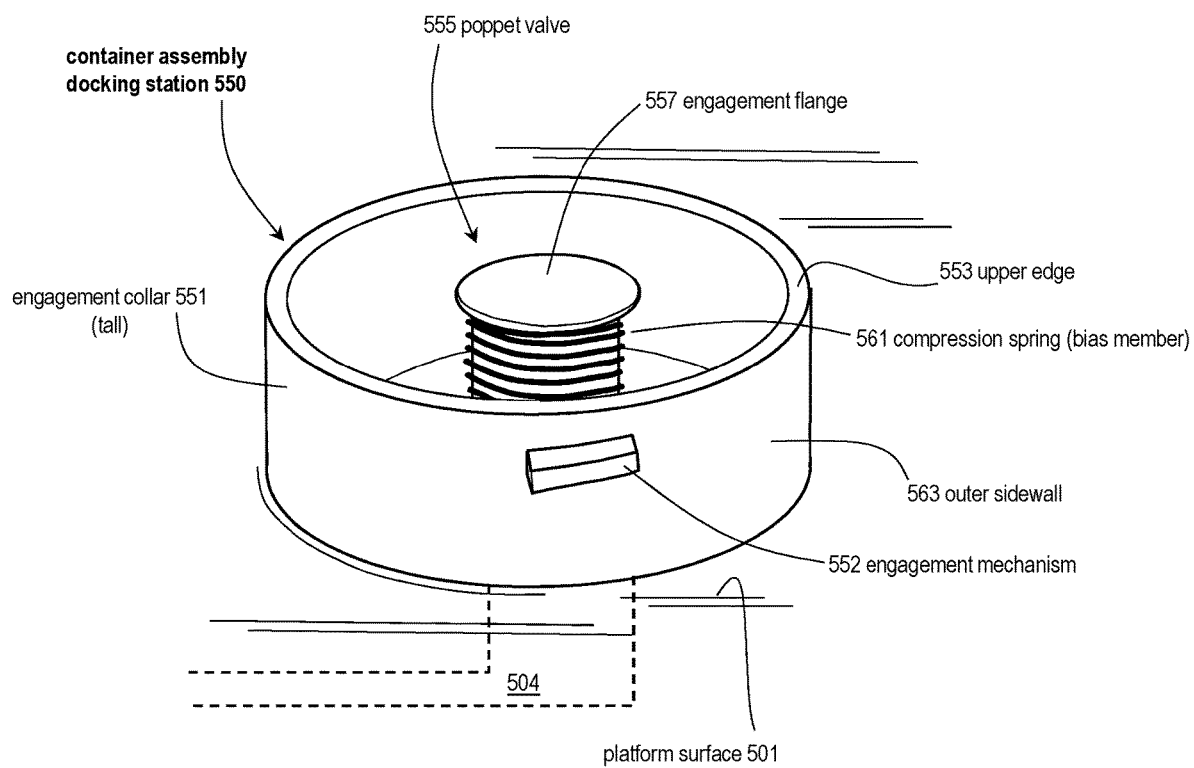
FIG. 29 is a top perspective view of a container assembly docking station, in accordance with at least one embodiment.

FIG. 29 is a top perspective view of a container assembly docking station, in accordance with at least one embodiment. The container assembly docking station 550 can engage with the bottom of container assembly 300 as described herein. Gas can be flowed from a refill tank, through a interior space, volume, or cavity 504, for example, to refill the container assembly 300. As shown, the container assembly docking station 550 includes a poppet valve 555 with an engagement flange 557. The engagement flange 557 can engage with another valve assembly, on the container assembly 300, so as to be pushed or moved to an open position. Alternatively, the engagement flange 557 can engage with a pin or post so as to be moved to an open position.

As shown in FIG. 29, the docking station includes an engagement collar 551. The engagement collar 551 can include an outer sidewall 563. The outer sidewall 563 can include an upper edge 553. One or more engagement mechanisms 552 can be provided on the outer sidewall 563. The engagement mechanisms 552 can include threads, angled flanges (as shown in FIG. 29), other locking flanges, or other arrangements.

Figure 30:
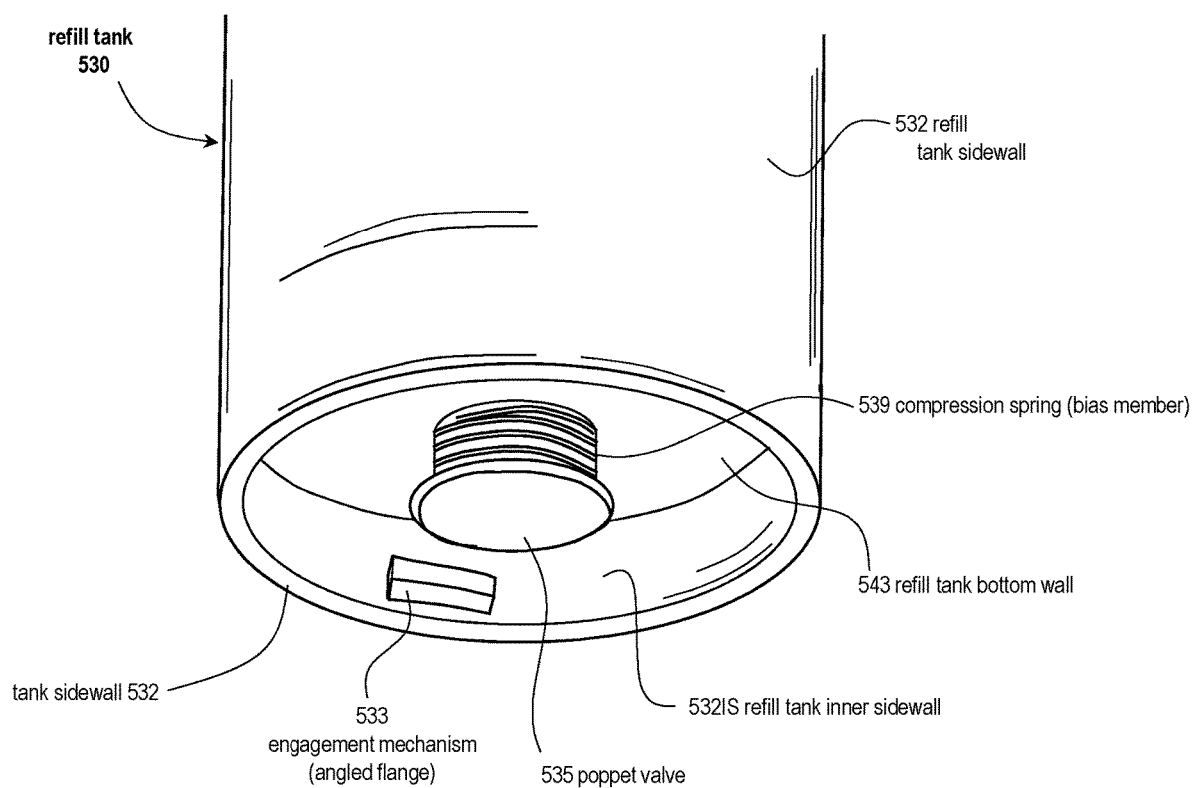
FIG. 30 is a bottom perspective view of a refill tank, in accordance with at least one embodiment.

FIG. 30 is a bottom perspective view of a refill tank 530, in accordance with at least one embodiment. The refill tank 530 can include refill tank sidewall 532 and refill tank bottom wall 543. The refill tank sidewall 532 can include a refill tank inner sidewall 53215. An engagement mechanism, such as an angled flange or threaded arrangement, can be provided on the refill tank inner sidewall 53215. As described below, the engagement mechanism 533 can engage with a docking station on a refill station 500. The refill tank 530 can also include a poppet valve 535 or other valve arrangement. The poppet valve 535 can be opened so as to provide gas flow from the refill tank 530 into the refill station 500. The refill station 500 can be provided with an internal passageway or cavity that provides gas flow from the refill tank 530, through housing 503 of the refill station 500 (see FIG. 17 for example), and to an onboard gas tank or container that is "docked" to container assembly 300. In some embodiments, the refill station 500 can accommodate more than one refill tank 530 and can accommodate more than one container assembly 300. A suitable number of respective docking stations may be provided as desired.

Figure 31:
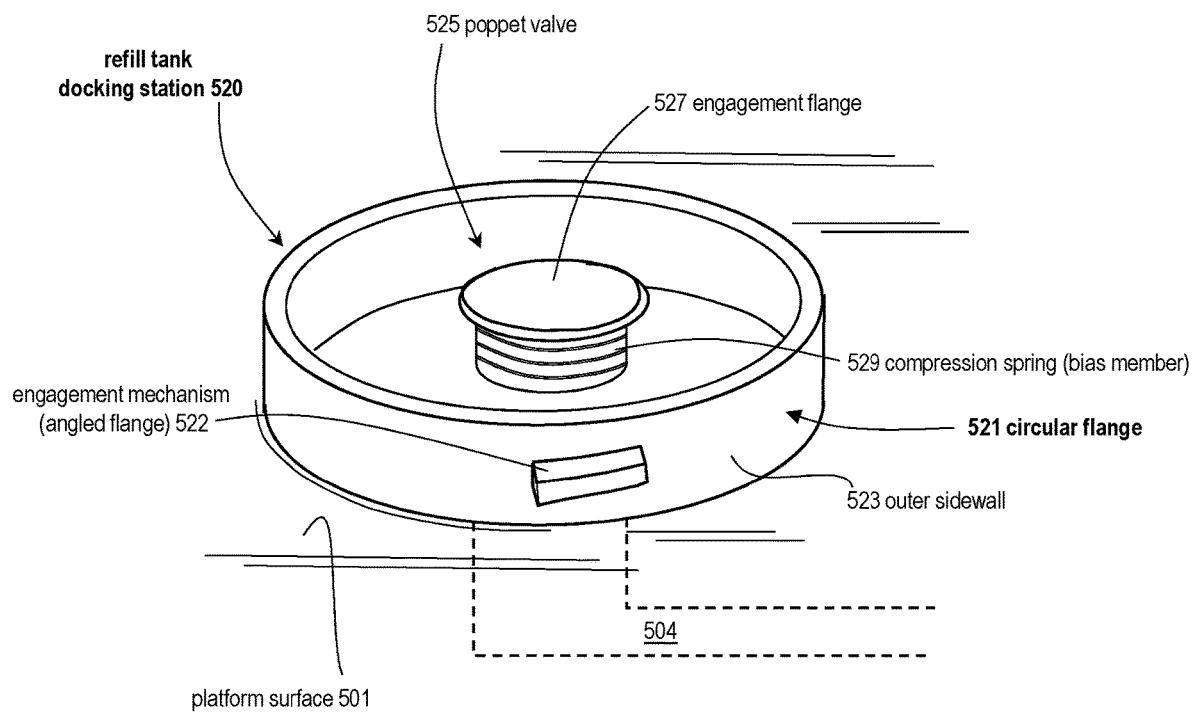
FIG. 31 is a top perspective view of a refill tank docking station, in accordance with at least one embodiment.

FIG. 31 is a top perspective view of a refill tank docking station 520, in accordance with at least one embodiment. The refill tank docking station 520 can be provided to dock or engage with the refill tank 530 as shown in FIG. 30. The refill tank docking station 520 can be mounted on platform surface 501 of the refill station 500. The refill docking station 520 can include poppet valve 525 with engagement flange 527. The poppet valve 525 can engage with poppet valve 535 (of FIG. 30) so as to open both poppet valves 525, 535. Poppet valve 525 can be biased to a closed position by a biasing member such as compression spring 529. The refill tank docking station 520 can include an outer sidewall 523 that includes engagement mechanism 522. The engagement mechanism 522 can include threads or an angled flange or flanges, for example. Accordingly, the circular flange 521 can engage with the refill tank inner sidewall 53215 of FIG. 30 so as to secure the refill tank 530 to the refill tank docking station 520. Such engagement is illustrated in FIGS. 32 and 33.

Figure 32:
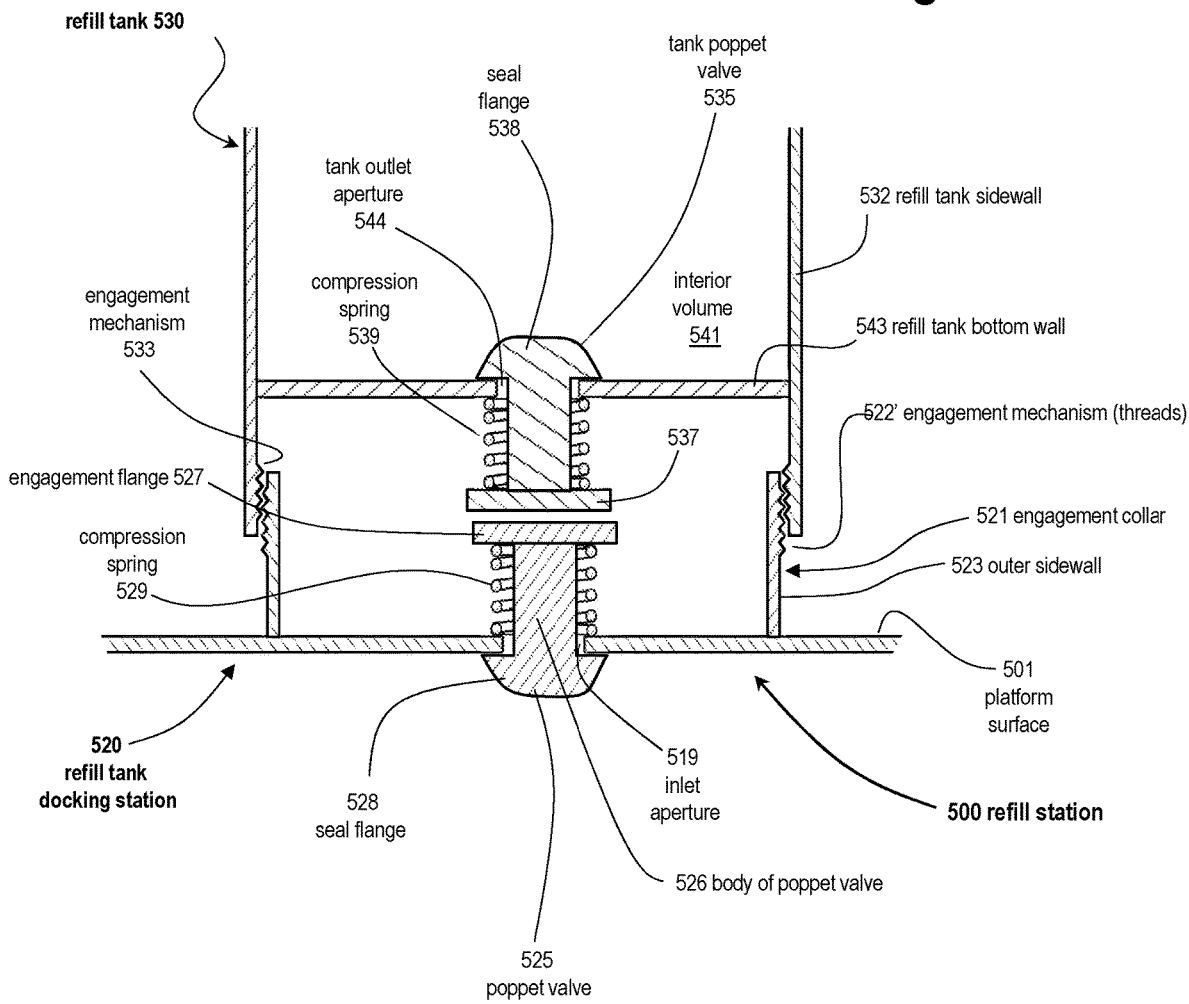
FIG. 32 is a schematic cross-sectional view of the station engagement assembly (of the refill tank docking station) engaged with the refill tank docking station, with valves closed, in accordance with one or more embodiments.
Figure 33:
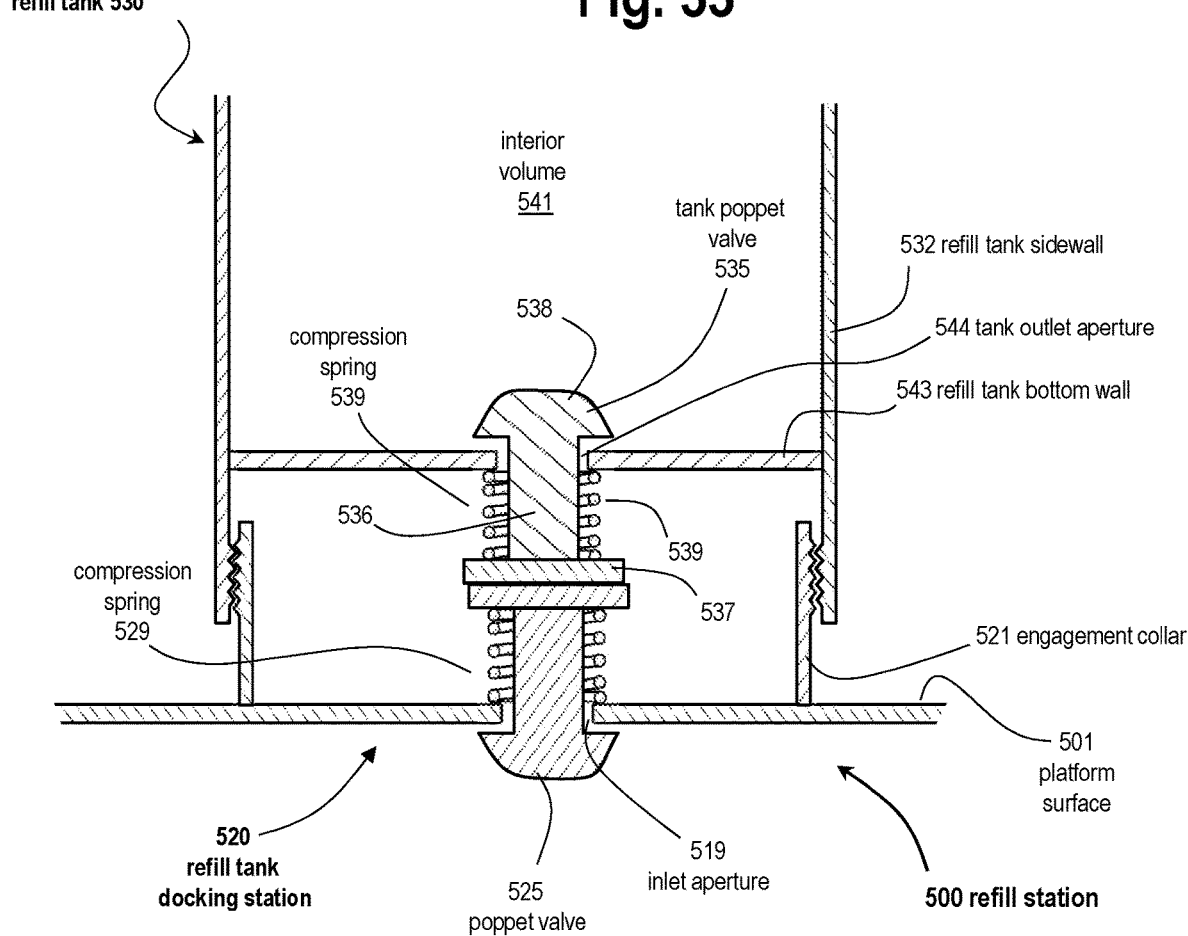
FIG. 33 is a schematic cross-sectional view of the station engagement assembly (of the refill tank docking station) engaged with the refill tank docking station, with valves open, in accordance with one or more embodiments.

FIG. 32 is a cross-sectional view of the station engagement assembly (of the refill tank docking station) engaged with the refill tank docking station, with valves closed, in accordance with one or more embodiments. In the disposition of FIG. 32, the refill tank 530 is partially engaged or screwed onto the refill tank docking station 520. However, the engagement is not yet sufficient so as to open valves 525, 535. On the other hand, engagement is sufficient to open such valves in the disposition as shown in FIG. 33.

As further shown in FIG. 32, the tank poppet valve 535 includes seal flange 538 and engagement flange 537. Compression spring 539 biases the valve 535 to a closed position. In such closed position, the seal flange 538 is pressed against the refill tank bottom wall 543 so as to prevent gas from passing through tank outlet aperture 544.

The refill station poppet valve 525 includes seal flange 528 and engagement flange 527. Compression spring 529 biases the valve 525 to a closed position. In such closed position, the seal flange 528 is pressed against the platform surface 501 so as to prevent gas from passing through inlet aperture 519. However, as compared to the disposition shown in FIG. 32, as the refill tank 530 is positioned closer and closer to the platform surface 501, the engagement flange 527 can contact the engagement flange 537. Positioning yet closer results in the engagement of the engagement flange 527 with the engagement flange 5374 pushing the valves open against the biasing force of the respective springs. As a result, tank outlet aperture 544 and inlet aperture 519 are opened so as to allow gas to flow from interior volume 541 of the refill tank 530 into an internal cavity or passageway (of the refill station 500) and into an onboard gas tank of a container assembly 300. FIG. 33 shows such disposition with valves 535, 525 both in an open state. The valves shown in FIG. 32 can utilize the poppet travel control flange 447, of FIG. 28, or other similar arrangement so as to limit travel of each of the valves 525, 535. By limiting travel of the valves, such prevents one valve from "sticking" closed with another valve moving beyond what is needed to effectively open. FIG. 33 is a cross-sectional view of the station engagement assembly (of the refill tank docking station) engaged with the refill tank docking station, with valves open, in accordance with one or more embodiments.

Figure 34:
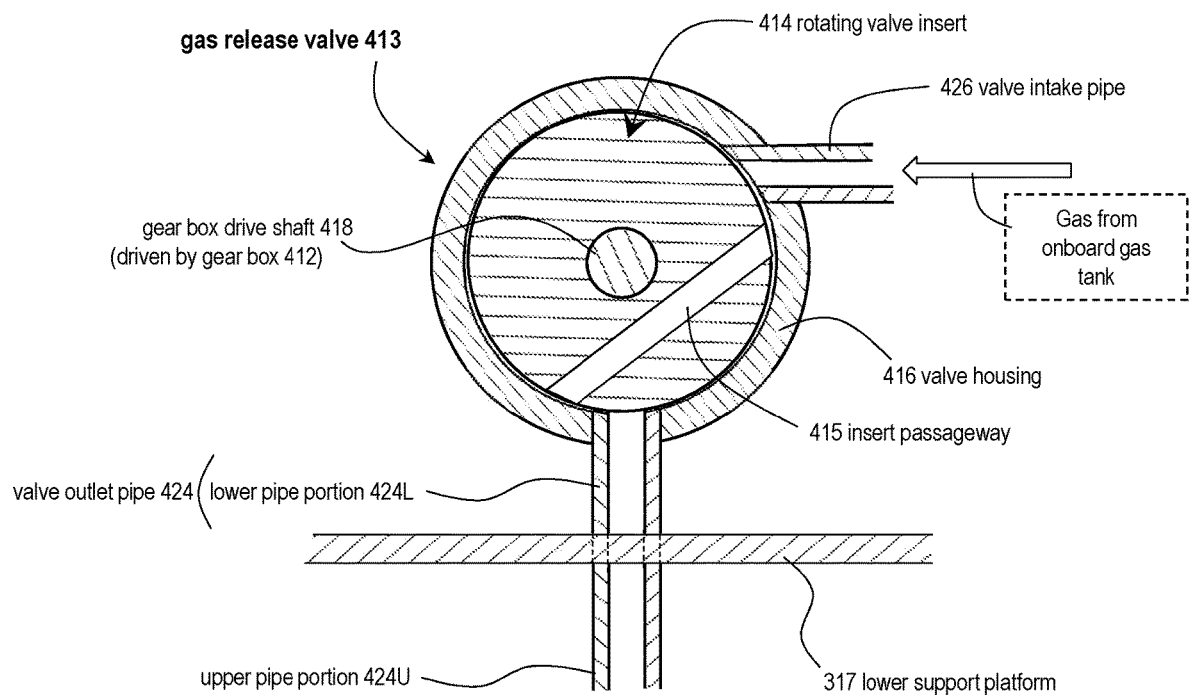
FIG. 34 is a schematic cross-sectional view along line 34 of FIG. 21 showing the gas release valve closed, in accordance with one or more embodiments.

In accordance with further aspects of the invention, FIG. 34 is a cross-sectional view along line 34 of FIG. 21 showing gas release valve 413 closed, in accordance with one or more embodiments. As described above, the gas release valve 413 can control the flow of gas from an onboard gas tank in the container assembly 300 into liquid or beverage in the container assembly 300. Such arrangement is shown in FIG. 22, for example. As shown in FIG. 34, the gas release valve 413 can include valve housing 416. Valve intake pipe 426 can provide gas flow into the gas release valve 413 from an onboard gas tank 401. Valve outlet pipe 424, and specifically lower pipe portion 424L, can provide gas flow out of the gas release valve 413 when the valve is open. Gas can flow from the lower pipe portion 424L to the upper pipe portion 424U and into a one-way valve, for example, so as to be dispensed into the liquid or beverage in the container assembly 300.

Figure 35:
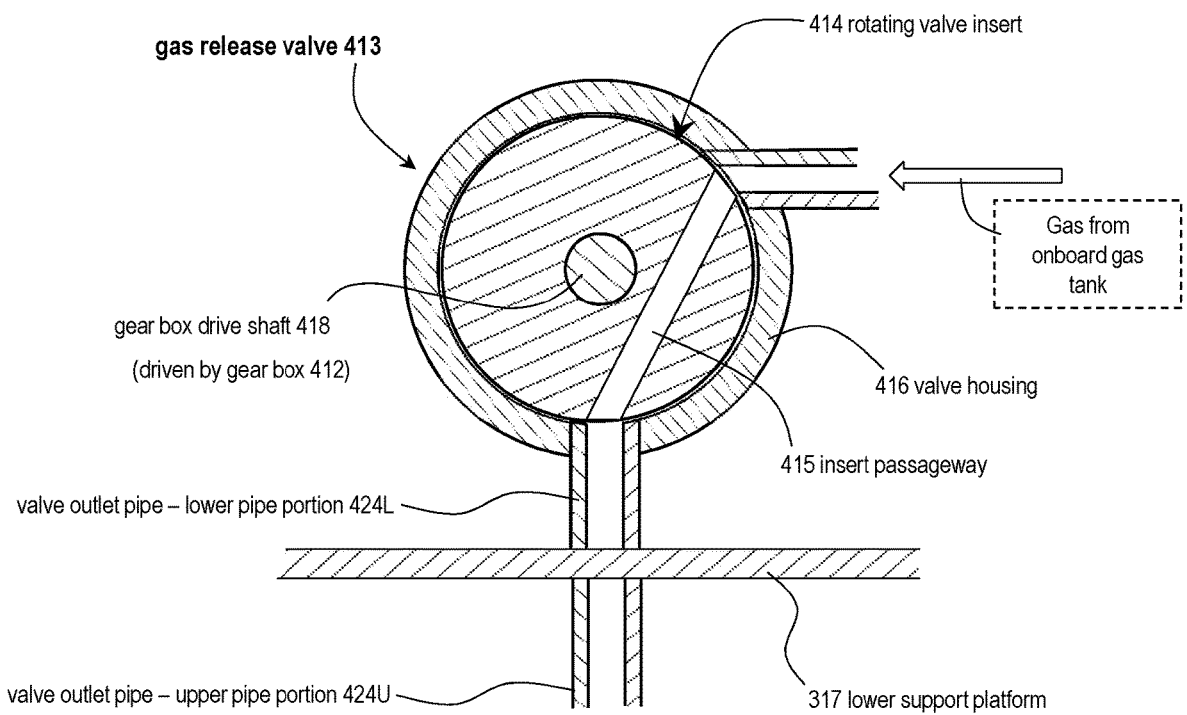
FIG. 35 is a schematic cross-sectional view along line 34 of FIG. 21 showing the gas release valve fully opened, in accordance with one or more embodiments.

To control flow of gas through the gas release valve 413, the valve 413 can include a rotating valve insert 414. The rotating valve insert 414 can be selectively rotated within valve housing 416 as actuated by gearbox driveshaft 418. The gearbox driveshaft 418 can be driven by a mechanized system such as gearbox 412. The rotating valve insert 414 can include an insert passageway 415. FIG. 34 shows a disposition of the gas release valve 413 in which the insert passageway 415 is not aligned with the valve intake pipe 426 or the lower pipe portion 424L. As a result, the valve 413 is closed and no gas is allowed to flow from the onboard gas tank 401 into liquid or beverage. However, with the disposition as shown in FIG. 35, the rotating valve insert 414 has been rotated such that the insert passageway 415 is aligned with the valve intake pipe 426 and the valve outlet pipe 424. As a result, the valve is opened and gas is allowed to flow through the valve 413. Gas flow from the onboard gas tank 401 through the gas release valve 413 (and into liquid in the container assembly 300) can be provided by a pressure differential. In other words, gas in the onboard gas tank 41 is under pressure and thus flows out through the valve 413.

Figure 36:
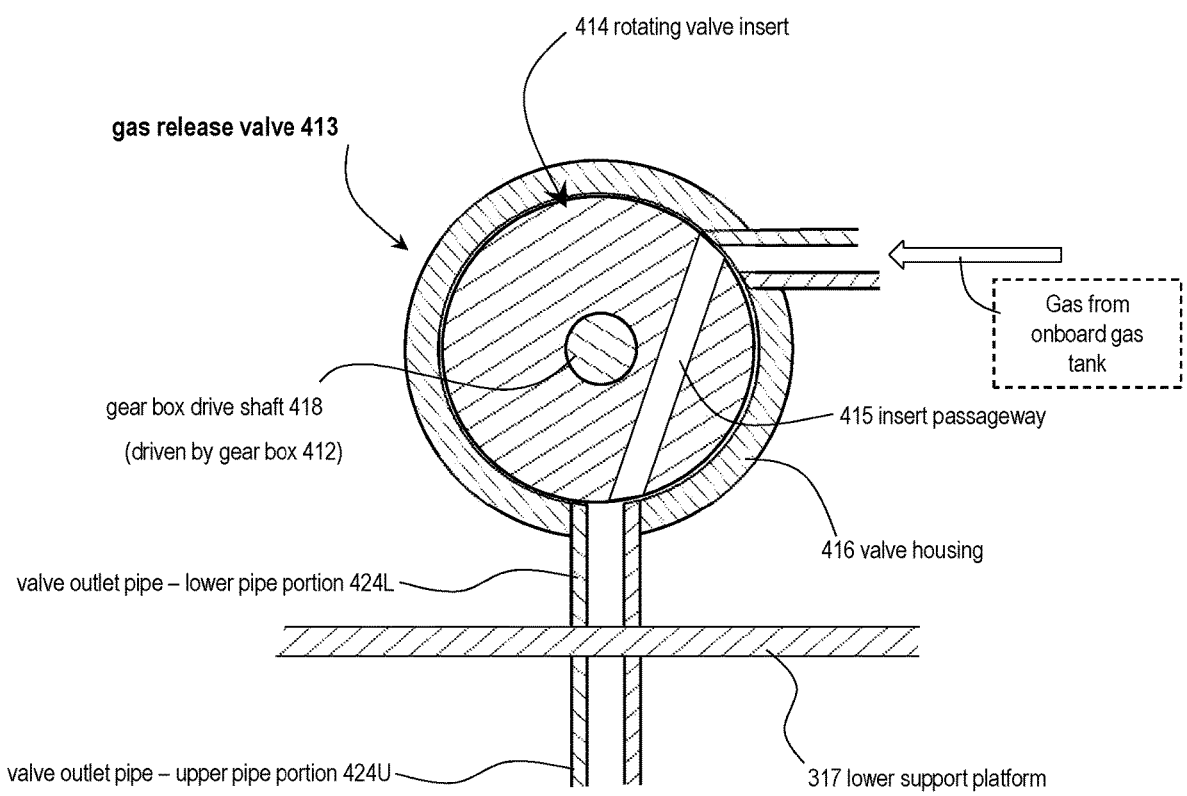
FIG. 36 is a schematic cross-sectional view along line 34 of FIG. 21 showing the gas release valve partially opened, in accordance with one or more embodiments.

FIG. 36 illustrates a further disposition of the gas release valve 413. As shown in FIG. 36, the gas release valve 413 is partially opened so as to allow limited gas flow. Accordingly, the gas release valve 413 can be controlled both in degree that the valve 413 is opened as well as time duration that the valve 413 is opened. The valve 413 can be "pulsed" or opened for short, quick durations of time. Control of the valve 413 can be performed, for example, by computer processor system 301 either by direct user control (such as by pressing a button) or by programmed control, which may be interdependent with a dispense event of one or more additives. For example, a gas dispense event can occur immediately after an additive dispense event. Such can assist in mixing of a dispensed additive.

Figure 37:
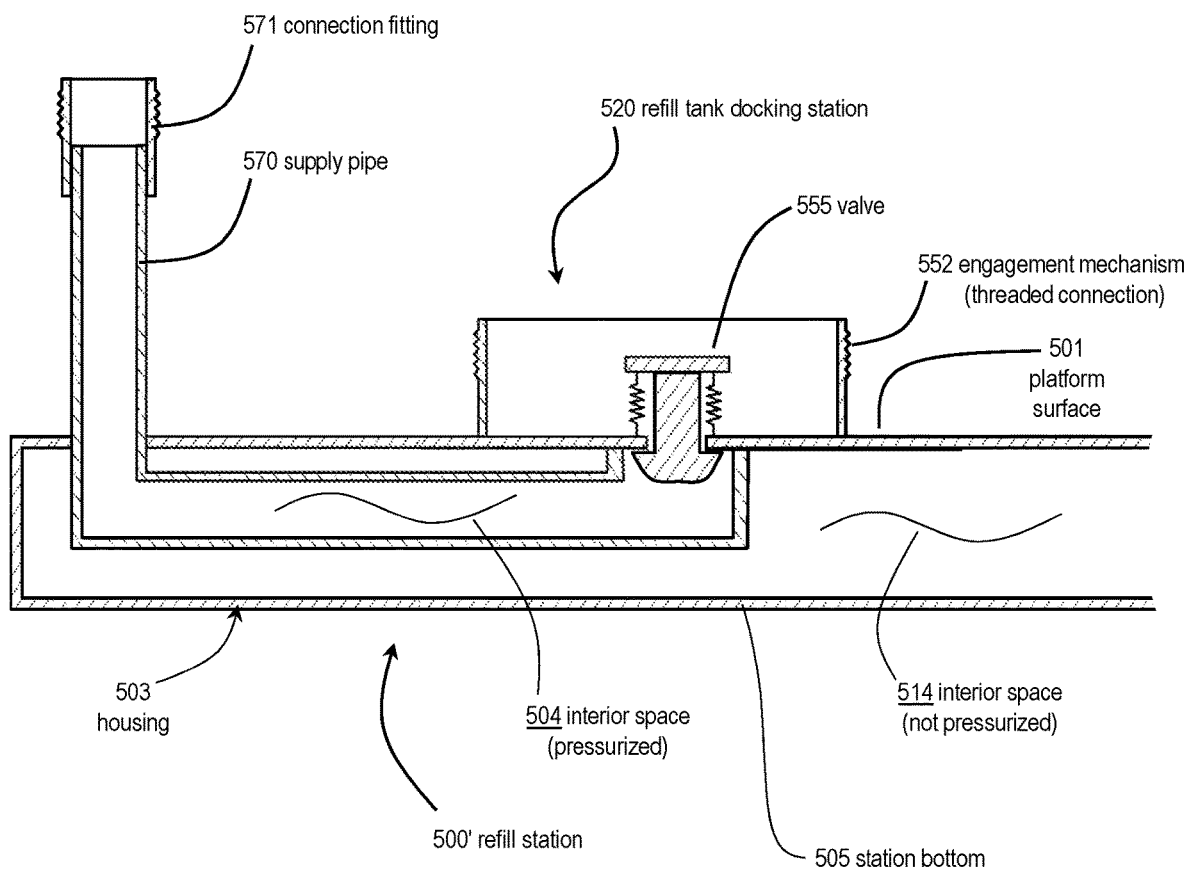
FIG. 37 is a schematic cross-sectional view of a further refill station 500 in accordance with one or more embodiments.

FIG. 37 is a cross-sectional view of a further refill station 500 in accordance with one or more embodiments. In particular, FIG. 37 is a schematic diagram showing a different arrangement for connection of a gas source. In embodiments described above, a refill tank 530 was engaged with a refill station 500. When a container assembly 300 was also engaged with the refill station 500, gas was allowed to flow from the refill tank 530, through an internal space, cavity, or passageway 504 and into the onboard gas tank 401. Various valves were utilized to control such flow of gas.

In the arrangement of FIG. 37, an alternative option is provided in which a refill tank 530 is not utilized in such manner Rather, in the arrangement of FIG. 37, a refill station 500' is provided with a supply pipe 570 with connection fitting 571. The supply pipe 570 with connection fitting 571 can be attached to any source of gas as may be desired. For example, such source of gas might provide carbon dioxide ($CO_2$) or oxygen. The connection fitting 571 can be connected to another pipe that is in turn connected to a source of gas. The connection fitting 571 can be connected to a refill tank. Additionally, the connection fitting 571 could be replaced with structure similar to refill tank docking station 520 as shown in FIG. 32, for example. Accordingly, it is appreciated that the source of gas is not limited to a refill tank attached directly on a refill station. Additionally, as otherwise described herein, it is appreciated that various valves may be utilized so as to control flow of gas. The systems and methods of the disclosure are not limited to the particular valves, including the described poppet valves, as disclosed herein.

In the arrangement of FIG. 37, gas can flow from the supply pipe 570 through the interior space 504, under pressure, and out (to a container assembly 300 with onboard gas tank 401) through the refill tank docking station 520. In manner as described above and shown in FIG. 37, the refill tank docking station can include an engagement mechanism 552 and valve 555. The engagement mechanism 552 can be a threaded or twist lock coupling arrangement, for example. The valve 551 can be a poppet valve, for example. The refill tank docking station 520 can be mounted on a platform surface 501 of the refill station 500'.

As described above, the refill station 500' includes an interior space 504 that communicates gas from the supply pipe 570 to the refill tank docking station 520. Such interior space 504 is under pressure when gas is flowed therethrough. The interior space 504 can be provided or defined by a tube structure, hose structure, baffles, membranes, walls of the refill station or other structure as may be desired. The refill station 500, such as is shown in FIG. 17, can also include an interior space 504 that provides gas flow from refill tank docking station 520 to the container assembly docking station 550. It is appreciated that the refill station 500 or 500' can include an interior space 514, as shown in FIG. 37, that is not pressurized. Such interior space can include various components of the refill station, such as station computer processor system 510 as shown in FIG. 17. Relatedly, refill station 500' include station bottom 505 that can serve to define interior space 514 of the refill station 500 prime. In other embodiments, however, it is appreciated that the entire interior structure of a refill station can serve to be pressurized and convey gas from a source of gas to a container assembly 300.

FIG. 38A is a perspective view of a dispensing assembly with "duck valve" for dispensing of gas, in accordance with at least one embodiment.

More specifically, FIG. 38A shows a dispensing assembly 710 that includes a different one-way valve for outputting gas into liquid or beverage contained in a container assembly 300. The dispensing assembly 710 can include a housing cover 718 and user interface features. Dispensing assembly 710 can include a lower end 710L of the bottle or container assembly 300. The dispensing assembly 710 can include an additive dispensing assembly 711 and a gas dispensing assembly 713. The additive dispensing assembly 711 can include one or more additive outlet ports 712. Such ports can include one-way valves. The gas dispensing assembly 713 can include valve 714. Valve 714 can include a gas one-way "duck" valve, as such may be characterized. Such duck valve can include elastic sides 715 and slit 716. The elastic sides 715 can be constructed of rubber, elastomeric, or other suitable material. The elastic sides 715 can be constructed so as to bias slit 716 to a closed configuration. However, due to the elastic construction, slit 716 can be opened when gas flows out of the valve 714. In other words, the elastic sides 715 can be opened by interior gas pressure so as to allow gas flow out of the duck valve 714. Once pressure is relieved, elastic sides 715 return to their "natural" position or configuration so as to close slit 716, thus resulting in closure of the valve 714. Accordingly, FIG. 38A provides an example of a further valve that may be utilized in the systems and methods of the disclosure.

As described herein, one-way valves may be utilized to dispense both additive and gas. Such one-way valve provides the ability for additive or gas to flow out of the dispensing assembly 710 while preventing beverage or liquid in the container assembly 300 from flowing back into the dispensing assembly 710. FIG. 38A is a perspective view of a further dispensing assembly 720 with "duck valve" for dispensing of gas, in accordance with at least one embodiment.

The dispensing assembly 720 can include a housing cover 728 and user interface features. Dispensing assembly 720 can include a lower end 720L of the bottle or container assembly 300. The dispensing assembly 720 can include an additive dispensing assembly 721 and a gas dispensing assembly 723. The additive dispensing assembly 721 can include one or more additive outlet ports 722. Such ports can include one-way valves. The gas dispensing assembly 723 can include valve 724. Valve 724 can include a gas one-way "duck" valve. Such duck valve can include elastic sides, as described above, and slit 725. The elastic sides can be constructed of rubber, elastomeric, or other suitable material. The elastic sides can be constructed so as to bias slit 726 to a closed configuration. However, due to the elastic construction, slit 726 can be opened when gas flows out of the valve 724. In other words, the elastic sides 725 can be opened by interior gas pressure so as to allow gas flow out of the duck valve 724. Once pressure is relieved, elastic sides 725 return to their "natural" position or configuration so as to close slit 726, thus resulting in closure of the valve 724.

Figure 38B:
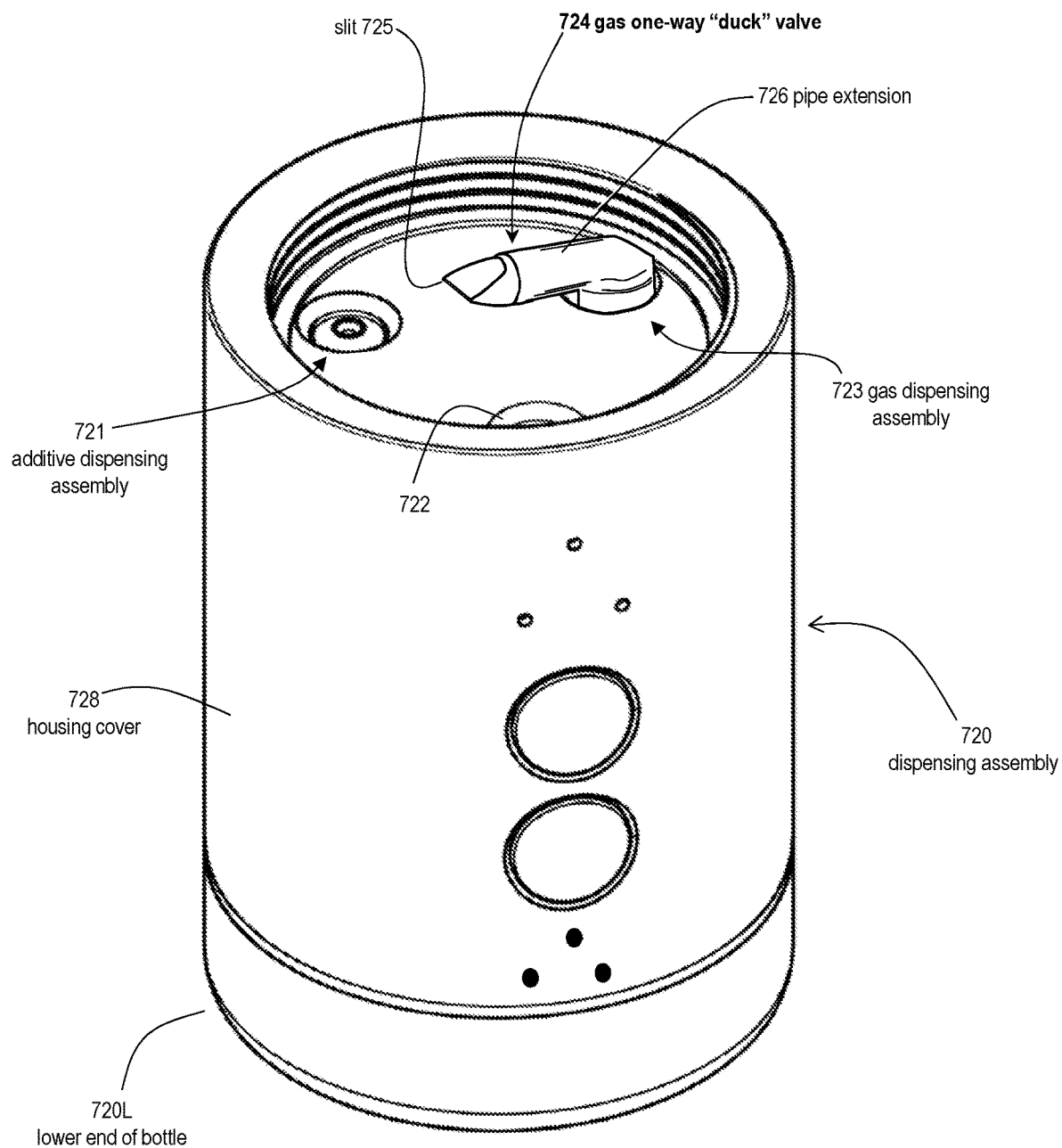
FIG. 38B is a perspective view of a further dispensing assembly with "duck valve" for dispensing of gas, in accordance with at least one embodiment.
Figure 39:
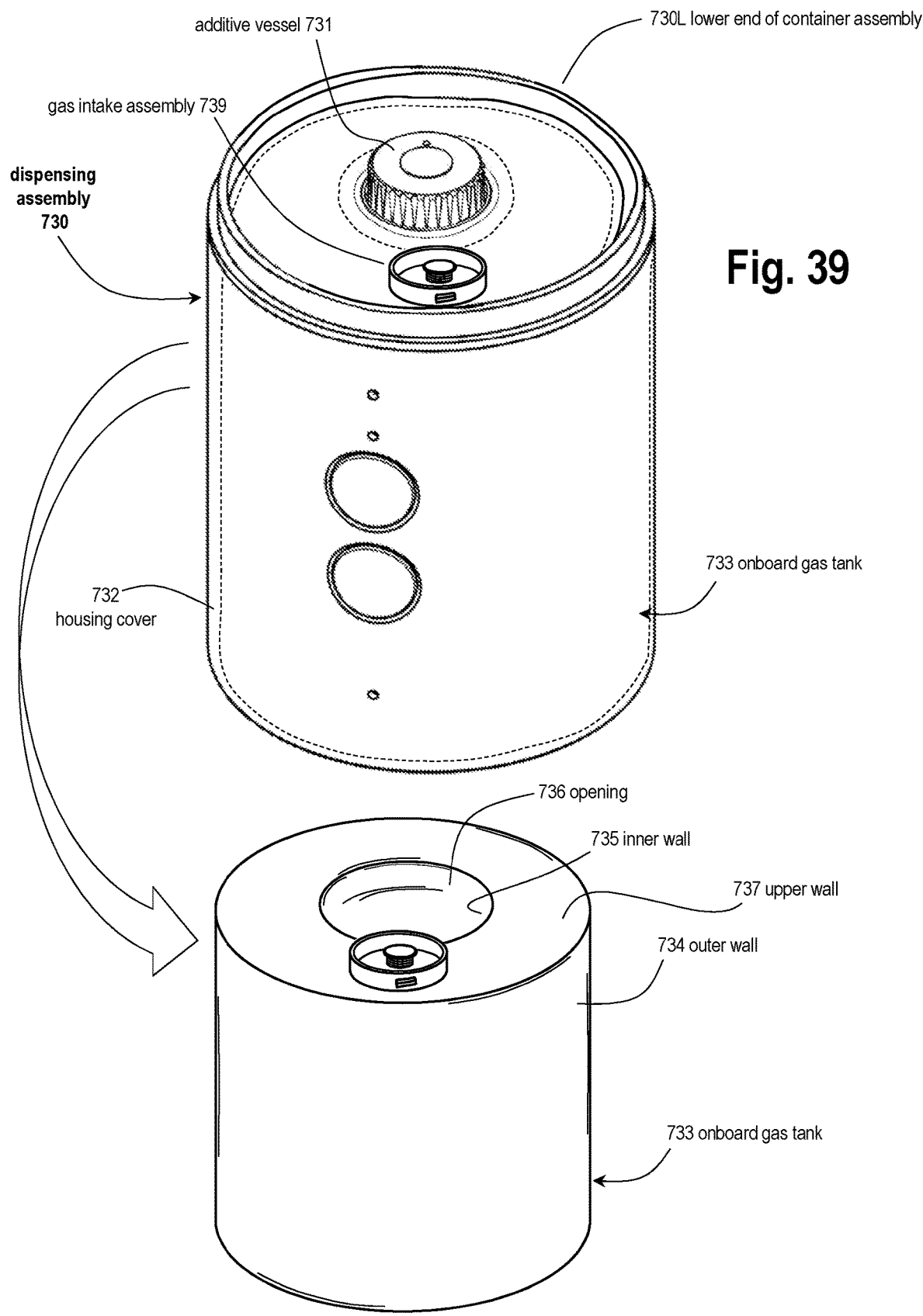
FIG. 39 is a perspective view of a "donut-shaped" onboard gas tank, in accordance with at least one embodiment.

In the arrangement of FIG. 38A, the duck valve or other valve can be positioned upon or extending from a surface of the dispensing assembly 710. In the arrangement of FIG. 38B, the valve 724, which can be a duck valve, is positioned at the end of a pipe extension 726. The pipe extension 726 can have a vertical component and a horizontal component. Such structure provides to direct output gas in a desired direction. For example, a desired direction might be towards an additive dispensing outlet. Gas flow, in such manner towards an additive dispensing outlet 722, may be beneficial or desirable so as to mix additive that is being dispensed. The pipe extension 726 is not limited to the particular arrangement shown in FIG. 38B. Different shape piping, vertical extension, horizontal extension, or other curved or straight pipe, for example, can be utilized so as to position valve 724 at a desired position and orientation. FIG. 39 is a perspective view of a "donut-shaped" onboard gas tank, in accordance with at least one embodiment. FIG. 39 shows dispensing assembly 730 that contains or houses an additive vessel 731. The dispensing assembly 730 includes a lower end 730L of the container assembly. The dispensing assembly 730 can include a housing cover 732. The dispensing assembly 730 can include an onboard gas tank 733. In accordance with at least one embodiment of the invention, an onboard gas tank 401 is described above as being in the shape of a cylinder. Such cylinder can be provided with a cylindrical outer wall, a top wall and a bottom wall so as to define an interior space, volume or cavity in which pressurized gas can be stored. Gas can be flowed into the onboard gas tank 401 utilizing a valve arrangement as described above. Gas can be flowed out of the onboard gas tank 41 through a valve intake pipe 426 as shown in FIG. 22, for example. It is appreciated that other piping, conduit, hose, or passageway arrangements can be utilized as desired.

FIG. 39 shows a further embodiment relating to the shape of the onboard gas tank, i.e. onboard gas tank 733 as shown in FIG. 39. The onboard gas tank 733 can be in the form of a "donut" or cylinder with an inner wall and an outer wall. That is, the onboard gas tank 733 can include outer wall 734 and inner wall 735. An upper wall 737 and a lower wall can be attached to the outer wall 734 and inner wall 735 so as to define an internal volume in which gas may be stored. Gas may be input into the onboard gas tank 733 utilizing a gas intake assembly 739. Gas may be output from the onboard gas tank 733 (and into liquid or beverage) utilizing a suitable arrangement such as shown in FIG. 22 and that includes valve intake pipe 426. Accordingly, FIG. 39 shows that the shape of the onboard gas tank 733 can be varied. The particular shapes of onboard gas tank 733 can be utilized in the situation that there is only one additive vessel 731 contained in the particular container assembly. The size and extent of the onboard gas tank 733 may be varied as desired or needed so as to allow for internal components of the dispensing assembly 730. The onboard gas tank 733, as well as the other onboard gas tanks described herein, can be constructed of rugged, solid construction so as to withstand pressure as can be required.

Figure 40:
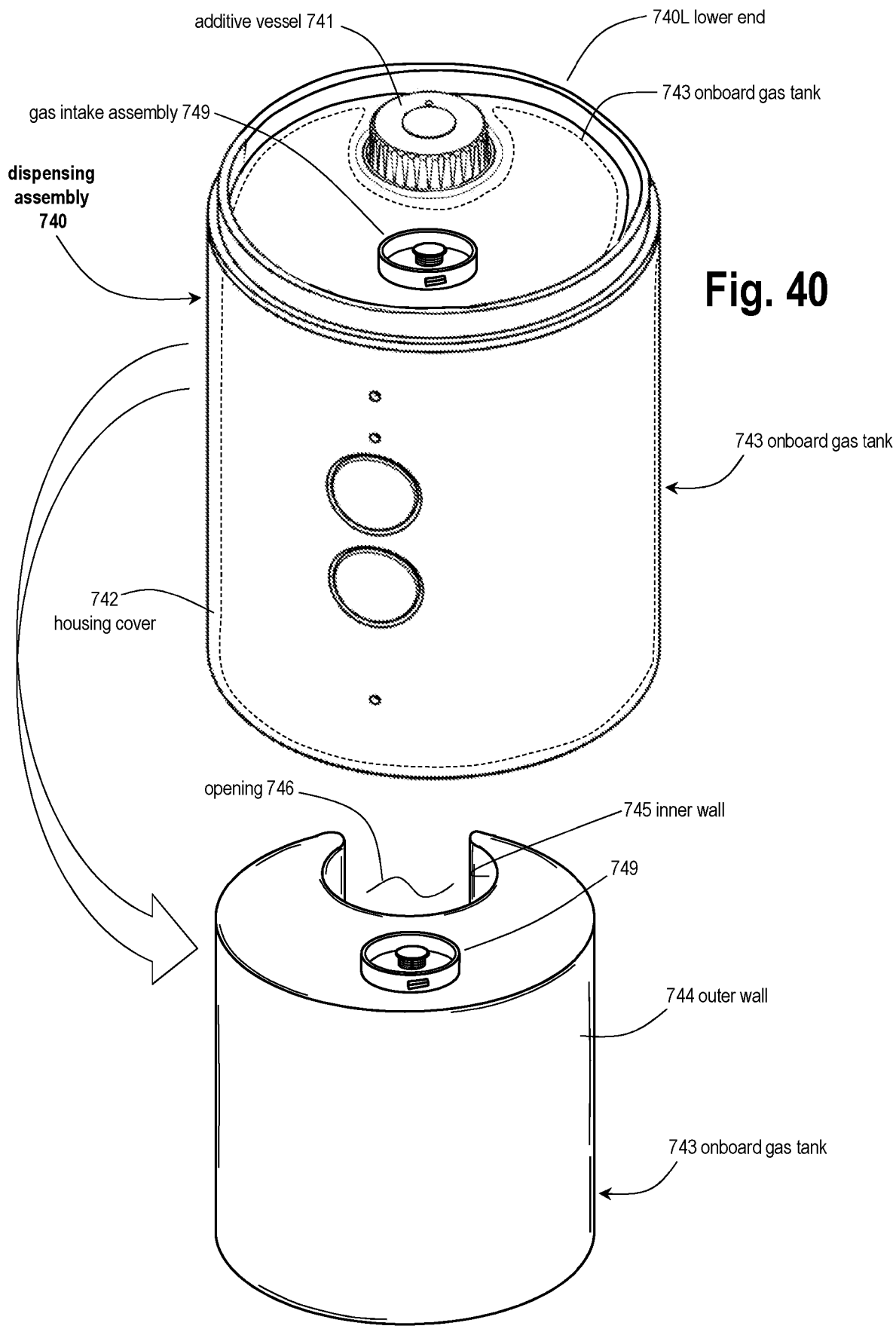
FIG. 40 is a perspective view of a "U-shaped" onboard gas tank, in accordance with at least one embodiment.

FIG. 40 is a perspective view of a "U-shaped" onboard gas tank, in accordance with at least one embodiment. FIG. 40 shows a dispensing assembly 740 that includes a housing cover 742. The dispensing assembly 740 includes lower end 740L. Accordingly, the dispensing assembly 740 is in an inverted or upside down position as shown in FIG. 40. The dispensing assembly 740 includes additive vessel 741. Additionally, the dispensing assembly 740 includes onboard gas tank 743. In this embodiment, the onboard gas tank 743 is in a U-shape. The onboard gas tank 743 can include an outer wall 744, inner wall 745, a top wall, and a bottom wall so as to define an interior volume in which to store gas. The shape of the onboard gas tank 743 can define an opening 746. The opening 746 can provide space for the additive vessel 741 as well as for other components of the dispensing assembly 740 as may be needed or desired. The onboard gas tank 743 can be provided with a gas intake assembly 749 by which the onboard gas tank 743 can be filled. Suitable outlet valves or connections can be provided, such as is illustrated in FIG. 22 and valve intake pipe 426.

Figure 41:
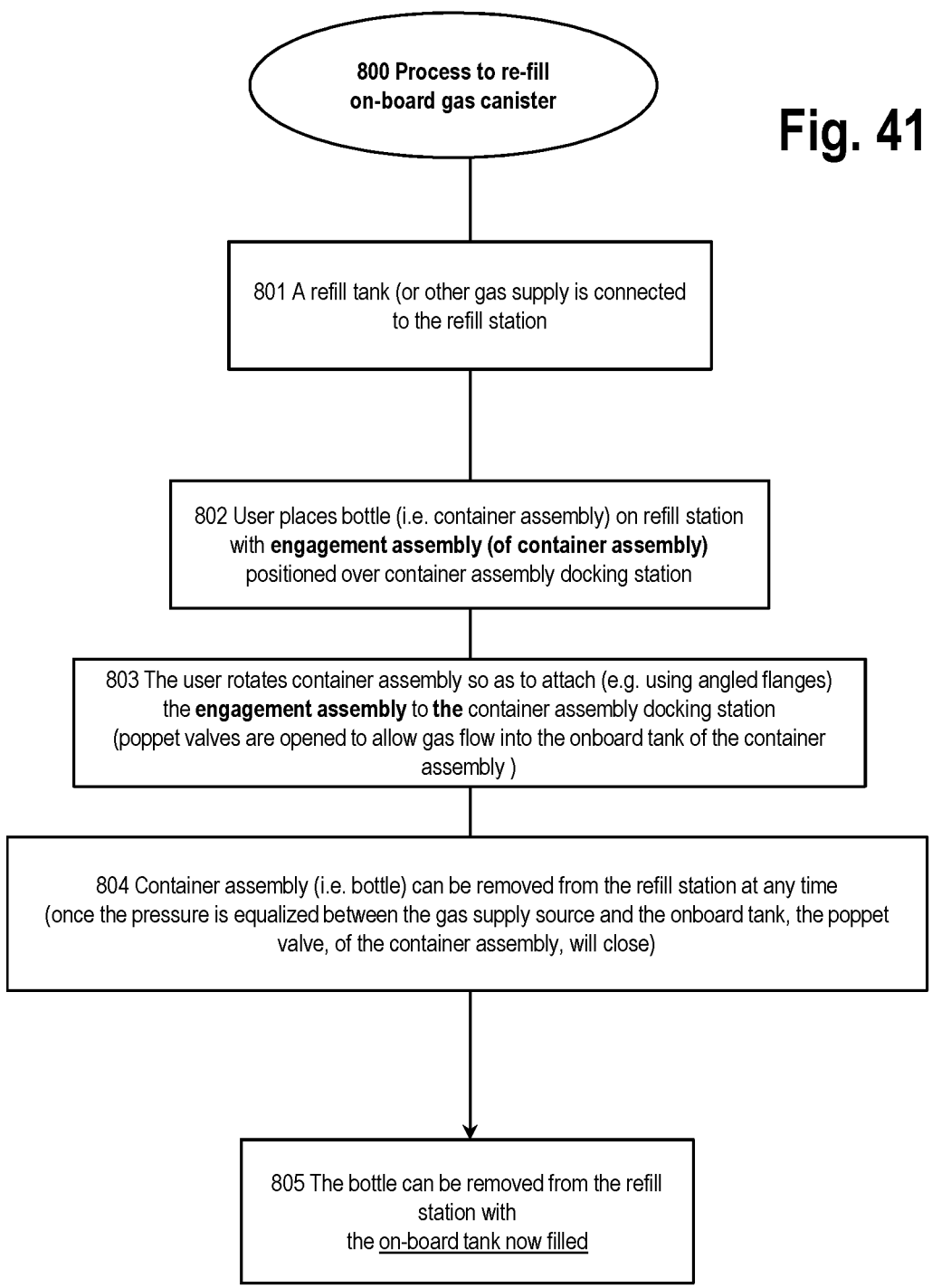
FIG. 41 it is a flowchart showing a process to refill an onboard gas tank or canister, in accordance with one or more embodiments.

FIG. 41 it is a flowchart showing a process to refill an onboard gas tank or canister, in accordance with one or more embodiments. As shown, the process starts in step 800 and passes to step 801. In step 801, a refill tank, or other gas supply, is connected to a refill station. Such may be a manual operation performed by a user. Then, in step 802, a user places a bottle, i.e. a container assembly, on the refill station. The engagement assembly of the container assembly is positioned over the container assembly docking station of the refill station. Then, in step 803, the user rotates the container assembly so as to attach the engagement assembly of the bottle to the docking station. Such engagement might be performed utilizing angled engaging flanges or threads. As the container assembly is engaged upon the container assembly docking station valves can be opened to allow gas to flow into the onboard tank of the container assembly. The valves can be poppet valves. Valves can be provided in both the container assembly and the refill station. Then, the process passes to step 804.

Figure 42:
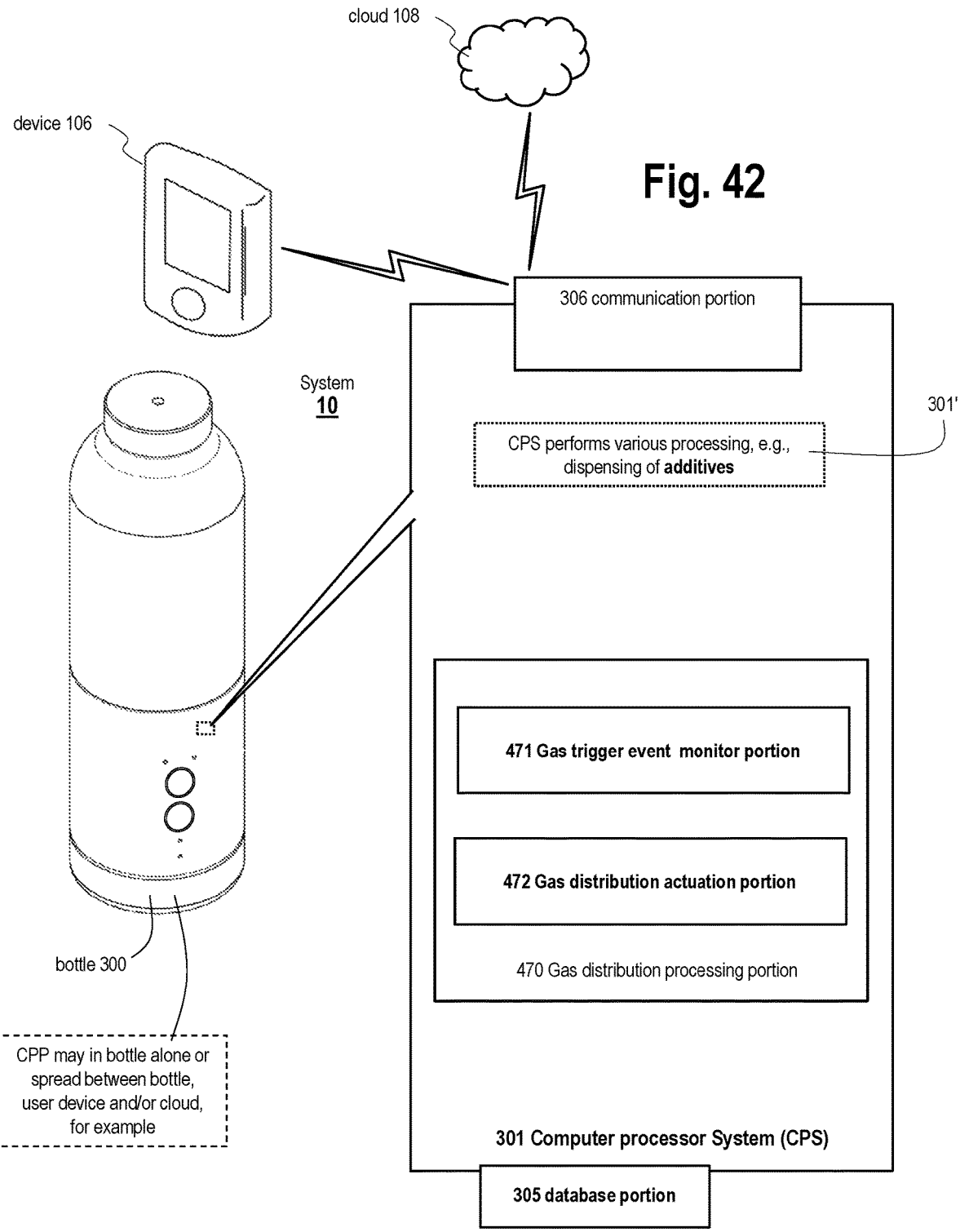
FIG. 42 is a block diagram showing additional features of a hydration system 600, in accordance with one or more embodiments.

Step 804 reflects that the container assembly can be removed from the container assembly docking station at any time, in accordance with one or more embodiments. It is appreciated the transfer of gas into the container assembly can be relatively rapid. Once pressurize is equalized between the gas supply source in the onboard tank of the container assembly, the poppet valve of the container assembly can close in accordance with at least one embodiment of the invention. Then, the process passes to step 805. In step 805, the bottle can be removed from the base receiving assembly with the onboard tank now filled. FIG. 42 is a block diagram showing additional features of a hydration system 600, in accordance with one or more embodiments. FIG. 42 illustrates aspects of a computer processor system such as that shown in FIG. 20. Accordingly, the computer processor system 301 can be contained in bottle 300 as shown in FIG. 42 of the system 10. The computer processor system 301 can be in communication with any number of user devices 106, the cloud 108, other systems and/or other networks. The computer processor system 301, i.e. CPS 301, can include a database portion 305. The database portion 305 can contain any of a wide variety of data utilized by or generated by the CPS 301. The CPS 301 can also include a communication portion 306 that provides communication. As reflected at 301', the CPS can perform a wide variety of processing related to the dispensing of additives and other processing as otherwise described herein. Such processing is not detailed in FIG. 42. In addition, the CPS 301 can perform gas distribution processing. Such is illustratively performed by a gas distribution processing portion 470. The gas distribution processing portion 470 can include a gas trigger event monitor portion 471 and a gas distribution actuation portion 472. The portion 470 can detect various events of the bottle 300. The portion 470 can then determine if a detected event triggers an action item. The action item can then be performed by the gas distribution actuation portion 472.

FIG. 43 is a flowchart showing processing performed by a computer processing portion of the system, in accordance with one or more embodiments. More specifically, FIG. 43 illustrates processing steps in which the system performs processing to control dispersion of gas. The system can be constituted by the CPS 301. As shown, the process starts in step 900 and passes to step 901. In step 901, the system performs processing to monitor for a trigger event.

Step 910 illustrates a trigger event is observed that user input is received that dictates a dispersion of gas. For example, such user input might be constituted by pressing a button on the container assembly 300. The trigger event might be an electrical pulse resulting from pressing such button or a switch that is associated with such button. Accordingly, in the situation of step 910, the user directly controls the dispersion of gas in the container assembly 300. As a result of a yes determination in step 910, the process passes to step 920. In step 920, the dictated action is performed. In this situation, the dictated action might simply be the dispersion of gas into the beverage contained in the container assembly 300.

FIG. 43 also includes step 930. In step 930, the system monitors to determine if there is a dispersion of additive event. For example, a dispersion of additive event might be the activation of a motor associated with one of the additive vessels, so as to dispense additive, or a detected signal associated with such dispense of an additive. As a result of detection of such trigger event, the process passes to step 940. In step 940, the system performs processing to determine if the event is actionable to disperse gas. That is, the system determines if a dispense of additive can be mapped or associated to a dispense of gas. Further details are described below with reference to FIG. 44.

Figure 44:
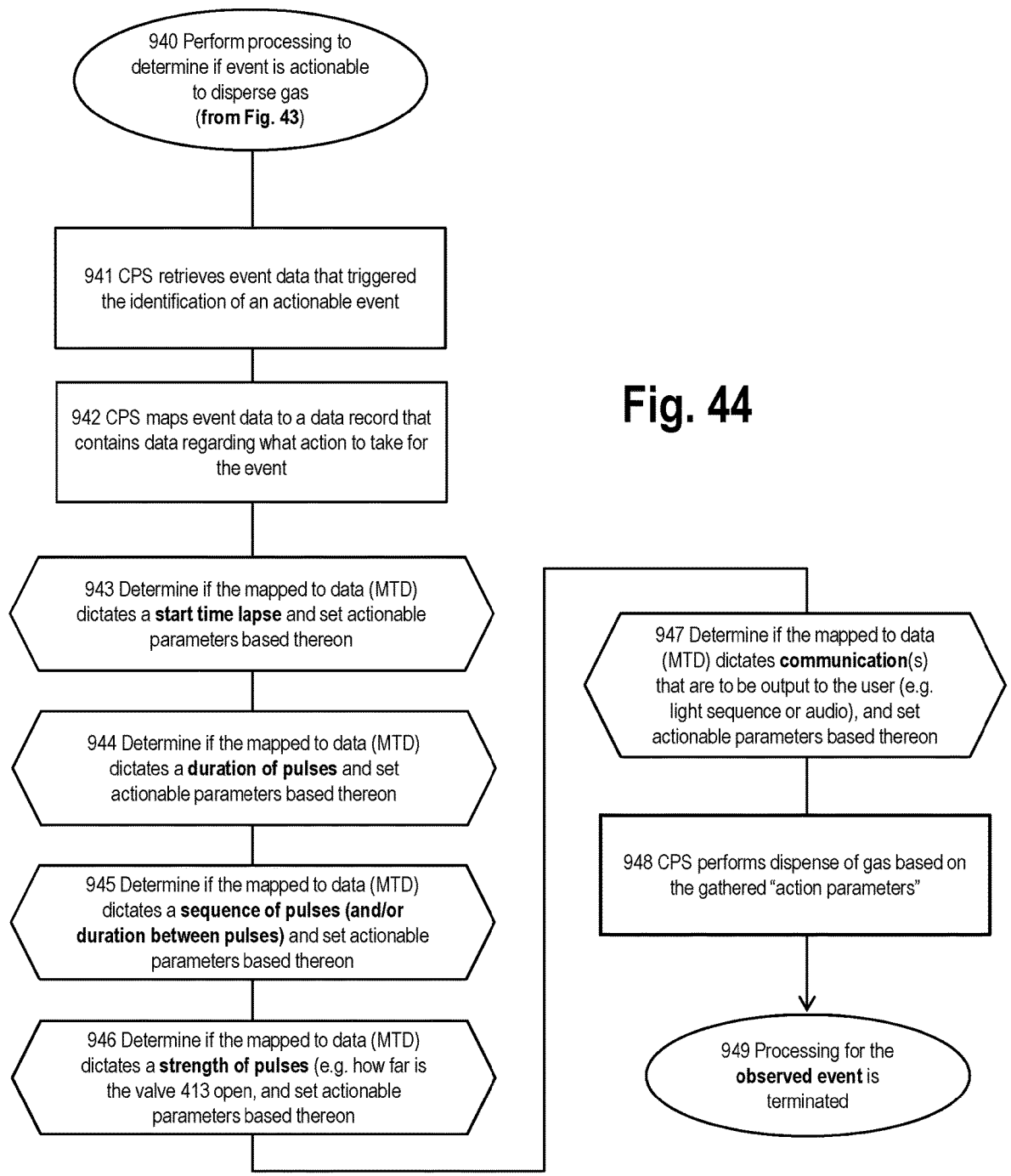
FIG. 44 is a further flowchart showing processing performed by the computer processing portion of the system, in accordance with one or more embodiments

FIG. 44 is a further flowchart showing processing performed by the computer processing portion of the system, in accordance with one or more embodiments. The process of FIG. 44 starts in step 940. In the process of FIG. 44, the system determines if an observed event, such as the dispensing of an additive, is actionable so as to dispense gas. After the process starts in step 940, the process passes to step 941. In step 941, the CPS 301 retrieves event data the trigger the identification of an actionable event. Then, in step 942, the CPS maps the event data to a data record that contains data regarding what action to take for the event. Then, in step 943, the CPS determines if the mapped to data (MTD) dictates a start time lapse. Based on such processing, the CPS 301 sets actionable parameters. Then, in step 944, the CPS determines if the MTD dictates a duration of pulses. Based on such determination, the CPS sets actionable parameters. Then, in step 945, the CPS determines if the MTD dictates a sequence of pulses and/or a duration between pulses for the dispensing of gas. Based on such processing, the CPS 301 sets actionable parameters. Then, in step 946, the CPS determines if the MTD dictates a strength of pulses. For example, the strength of pulses might be controlled by controlling an amount that the valve 413 (FIG. 22) is open. After step 946, the process passes to step 947.

In step 947, the CPS 301 determines if the MTD dictates one or more communications that are to be output to the user. For example, such communications might be lights, audio, or communication sent to the user's cell phone, for example. Then, the process passes to step 948. In step 948, the CPS performs a dispense of gas based on the gathered "action parameters". That is, the CPS dispenses gas based on the data gathered in the processing of steps 943-947. Dictated communications may also be sent in conjunction with the processing of step 948. Then, the process passes to step 949. In step 949, the processing for the observed event is terminated.

Figure 45:
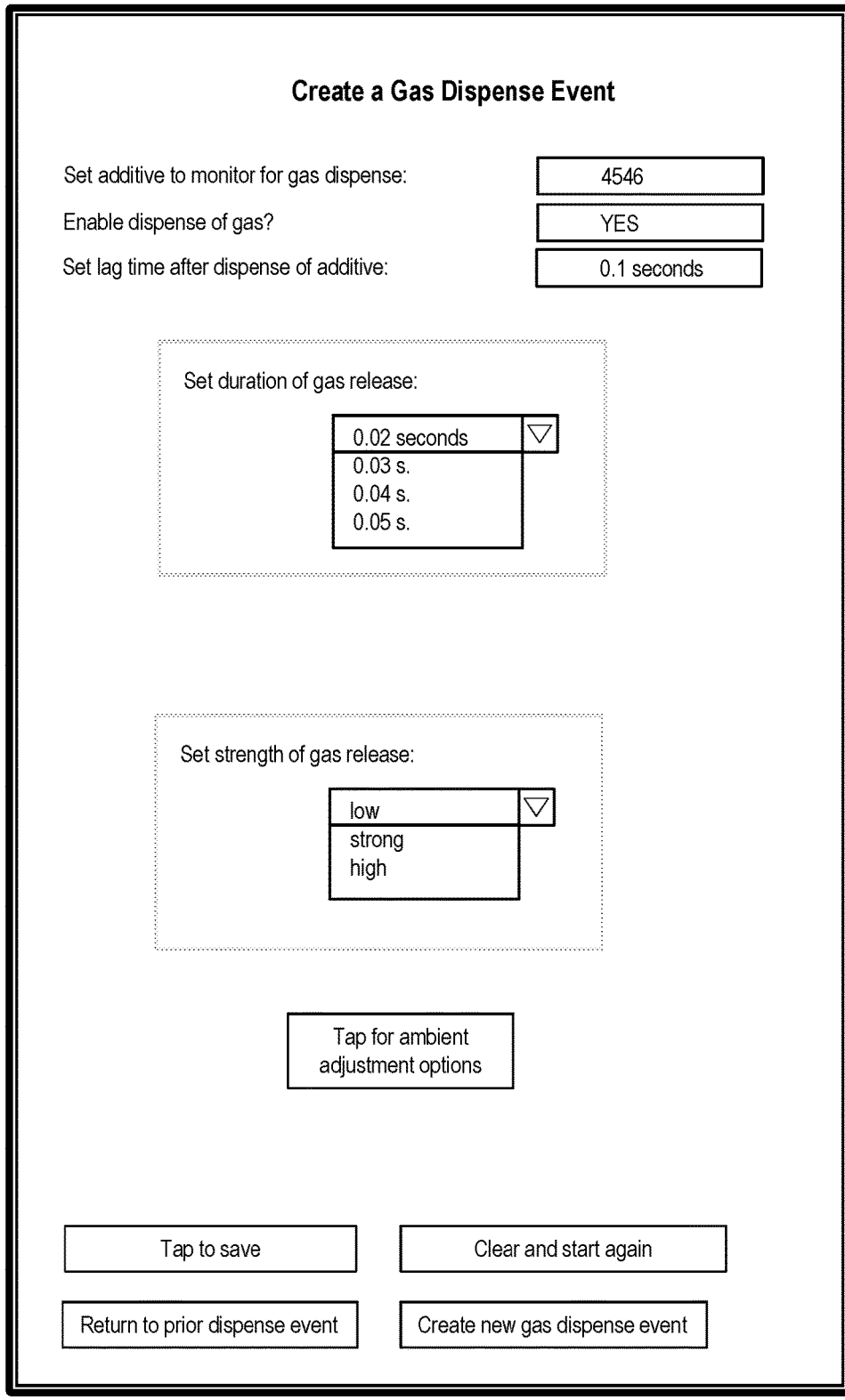
FIG. 45 is an illustrative graphical user interface (GUI), in accordance with one or more embodiments.

FIG. 45 is an illustrative graphical user interface (GUI) 4500, in accordance with one or more embodiments. The GUI 4500 allows a user to create a gas dispense event. For example, the user might be presented with the GUI 4500 on his or her cell phone. Her cell phone can be in electronic communication with the container assembly 300. Accordingly, information provided by the user, via the interface 4500, can be communicated or downloaded to the container assembly 300.

The GUI 4500 allows a user to set a particular additive to monitor for a gas dispense event. Illustratively, the additive 4546 might be monitored. It is appreciated that the numerical reference to additives are for purposes of illustration and such numerical indicia can be replaced by a name of the additive, for user-friendliness. The additive 4546 might correspond to "whey" or "caffeine", for example. Accordingly, in the situation of the GUI 4500, the additive that is set to monitor is additive 4546. By the selection of "yes" the user has enabled the dispense of gas in conjunction with the dispense of the additive 4546. Additionally, the user can set the lag time of the gas dispense after the dispense of the additive. In this case the lag time is 0.1 seconds. This can be a time duration between when the system, such as the CPS 301 detects the dispense of an additive, and when the system actuates valve 413, for example, so as to release gas. The user is also provided the ability to set the duration of the gas release, here 0.02 seconds. The user is also provided with the ability to set the strength of the gas release, here "low". Functionality may also be provided to vary a gas dispense event based on ambient conditions, such as temperature or humidity, for example. Additional user interface buttons may be provided such as tap to save, return to prior dispense event, clear and start again, and create new gas dispense event, for example.

FIG. 46 is an illustrative data record 4600, in accordance with one or more embodiments. The data record 4600 corresponds, in part, to the input information received via the GUI 4500 of FIG. 45. The CPS can access the data record 4600 upon a monitored event being determined. For example, upon a dispensing of the additive 4546, the CPS can access the data record 4601. From such data record, the CPS can control the gas release event that is associated with the identified/detected release of additive 4546. The data record 4600 includes parameters of associated gas dispense enable?, lag time, duration, and strength. It is appreciated that various other attributes and data may be included in addition to that shown.

In accordance with one or more embodiments of the disclosure, a hydration system can comprise (A) a refill station, for refilling a container assembly with gas, the refill station including: (1) a refill station housing; (2) a container assembly docking station provided on the housing, the container assembly docking station including a first engagement mechanism for engaging with a container assembly, and a container interface valve for dispensing gas from the refill station to the container assembly; (3) a gas supply assembly that provides a source of gas to the refill station; and (B) the container assembly can be configured to engage with the container assembly docking station so as to flow gas from the refill station to the container assembly, and the container assembly can include: (1) a container having a known storage capacity for storing a liquid; (2) an additive dispensing assembly, the additive dispensing assembly dispensing variable, non-zero quantities of one or more additives into the liquid stored in the container; (3) one or more vessels that each contain one of the additives, of the one or more additives, to be dispensed into the liquid; and (4) a gas dispensing assembly, the gas dispensing assembly releasing a gas into the liquid stored in the container, and the gas dispensing assembly can include (a) an onboard gas tank that includes a container fill valve, (b) a valve assembly; and (c) a gas outlet, and the valve assembly controlling flow of gas from the onboard gas tank, through the valve assembly, and to the gas outlet so as to output the gas into the liquid. The valve assembly, to perform the controlling the flow of gas, can be movable between (i) an open position, in which flow of gas is allowed to flow from the onboard gas tank to the gas outlet; and (ii) a closed position in which the flow of gas is prevented to flow from the onboard gas tank to the gas outlet.

The gas supply assembly can include a refill tank docking station, and a refill tank that is removably coupled to the refill tank docking station.

The refill tank can include a pressure indicator that indicates an amount of gas in the refill tank.

The refill tank can include a tank valve that is openable to release gas from the tank into the refill station housing; and the refill tank docking station can include a tank interface valve that is openable to input gas from the tank into the refill station housing.

Each of the refill tank docking station and refill tank can have a respective engagement mechanism that each serve to removably couple the refill tank to the refill tank docking station.

Each of the respective engagement mechanisms can be constituted by an angled wedge or threaded arrangement so as to connect the refill tank docking station with the refill tank.

The tank valve can include a poppet valve and the tank interface valve, of the refill tank docking station, includes a further poppet valve.

The refill station housing can include a passageway through which gas is communicated from the tank interface valve to the container interface valve, and the container interface valve is openable so as to allow gas to pass from refill station housing.

Each of the container assembly and the container assembly docking station can have respective engagement mechanisms that each serve to removably couple the container assembly to the container assembly docking station.

The gas dispensing assembly can include a gas intake assembly associated with the onboard gas tank, the gas intake assembly including a second valve, of the hydration system, that provides for the onboard gas tank to be refilled when connected to the refill station housing.

The second valve can be a one-way valve, and an inlet to the onboard gas tank can be positioned at a bottom of the container assembly.

The gas intake assembly can include an engagement collar for positioning the container assembly on a refill station, and the engagement collar provided with at least one engagement mechanism for securing the container assembly to the refill station.

The at least one engagement mechanism can be at least one selected from the group consisting of (a) a threaded arrangement and (b) a twist-lock coupling; and the valve is a poppet valve that is openable in conjunction with the container assembly being positioned upon the refill station.

In accordance with one or more embodiments, a container assembly can dispense additives and gas, the container assembly can include: (A) a tangibly embodied computer processor, the computer processor implementing instructions on a non-transitory computer medium disposed in a database, the database in communication with the computer processor; (B) a communication portion that interfaces between the computer processor and an electronic user device or other system; (C) the database; (D) a container having a known storage capacity for storing a liquid; (E) an additive dispensing assembly, the additive dispensing assembly dispensing variable, non-zero quantities of one or more additives into the liquid stored in the container; (F) one or more vessels that each contain one of the additives, of the one or more additives, to be dispensed into the liquid; and (G) a gas dispensing assembly, the gas dispensing assembly releasing a gas into the liquid stored in the container, and the gas dispensing assembly including: (a) an onboard gas tank; (b) a valve assembly; and (H) a gas outlet, and the valve assembly controlling flow of gas from the onboard gas tank, through the valve assembly, and to the gas outlet so as to output the gas into the liquid. The valve assembly, to perform the controlling the flow of gas, can be movable between (a) an open position, in which flow of gas is allowed to flow from the onboard gas tank to the gas outlet; and (b) a closed position in which the flow of gas is prevented to flow from the onboard gas tank to the gas outlet. The computer processor can perform processing including: identifying an event experienced by the container assembly; and based on such event, the gas dispensing assembly dispenses gas into the liquid stored in the container.

The event can be a push of a button provided on the container assembly so as to control the additive dispensing assembly to release gas into the liquid.

The event can be a user interfacing with the electronic user device so as to control the additive dispensing assembly to release gas into the liquid.

The event can be the additive dispensing assembly dispensing one of the additives; or the user physically interfacing with the container assembly; or the user interfacing with her electronic user device.

The computer processor can retrieve data, from the database regarding the event that was identified and associates such retrieved data with a data record.

The data record can include information regarding action items and/or attributes of action items that the computer processor is to perform in response to observation of the identified event.

The action item and/or an attribute of an action item can be at least one of duration of gas release, a sequence of pulses of gas release, a duration between pulses, strength of pulses regarding how much gas is released over a time, and timing of gas release.

The action item and/or an attribute of an action item can be a lag time between the observation of release of an additive and initiation of release of gas.

The release of gas can be constituted by a release of CO2 (carbon dioxide) and the release of carbon dioxide that results in a carbonated liquid in the container assembly.

Various features of the invention are described above. It is appreciated that the disclosure is illustrative and not limiting. In embodiments described above, the refill station 500 is powered either with AC electrical power or with battery power. However, the refill station 500 could be constructed without power or power requirements.

As described above, the refill tank 530 is provided with a pressure indicator 531. The pressure indicator 531 could be analog or digital, for example. The pressure indicator 531 could function without power.

Additionally, the container assembly 300 and the refill station 500 can include pressure indicators. For example, the refill station 500 could include a pressure indicator so as to indicate the pressure experienced by the refill station 500. The container assembly 300 can include a pressure indicator so as to indicate how much gas is left in the onboard gas tank 401.

In embodiments described above, the onboard gas tank 401 includes a single interior volume, cavity, or space, for example. However, the disclosure is not limited to such. The onboard gas tank 401 can include multiple volume, cavity, or spaces. Additionally, embodiments of the invention can include two or more onboard gas tanks 401, which could be provided to contain different types of gas, for example. The two or more onboard gas tanks 401 could be respectively filled utilizing off-center gas intake assemblies, such as is shown in FIG. 23. For example, embodiments described above is contained to additive vessels and one onboard gas tank could instead include one additive vessel and two onboard gas tanks.

In accordance with embodiments, the gas release valve 413, as shown in FIGS. 20-22, for example can be actuated with a motor, a drive motor, and electromechanical arrangement, or by manual manipulation of a user. Accordingly, the gas release valve 413 need not be motorized or power. For example, the gear box driveshaft 418 that is depicted in FIG. 34 could, instead of being driven by a motor, be connected to a physical lever that is accessible by a user. The user could manipulate such physical lever so as to control whether gas is released and how much gas is released, for example. The physical lever and/or a housing of the container assembly 300 could be provided with indicia or graduations so as to convey information to a user regarding what position of a lever or other mechanical operative device corresponds to which functionality provided by the container assembly. Illustratively, such indicia could include numbers that reflect how far the valve 413 is open.

It should be appreciated that various seal rings, washers, O-rings, flanges, collars, threaded attachments, locking attachments, click lock attachments, twist lock couplings, sleeves, and other mechanical arrangements, for example, can be utilized so as to provide structure relied upon in practice of the disclosure.

The terms dispersion, dispensing, dispense, and other similar terms have been used herein to convey manipulation of a liquid or other material.

In accordance with embodiments of the disclosure, a computer processing system of the invention can monitor different users that interact with the refill station 500 in refilling each users respective container assembly 300. For example, electronic indicia or tagging can be utilized such that the refill station 500 identifies which users bottle is being refilled on the refill station 500. Accordingly, communication between the refill station 500 and the container assembly 300 can utilize any known communication. For example, communication between the refill station 500 and the container assembly 300 can utilize NFC (Near-Field Communication) technology or protocols in communicating with each other.

Various patterns or schemes can be utilized such that the user can effectively communicate with the container assembly 300, as may be desired. For example, one push of a particular button could dictate to the container assembly 300 that additive should be released, where as to quick pushes of the particular button could dictate to the container assembly that gas should be released. Teachings of the above incorporated patent applications regarding user interface can be utilized in conjunction with the teachings described herein. Other features of the above incorporated patent applications can also be utilized in conjunction with the teachings described herein.

Embodiments of the disclosure, a computer processor of the container assembly 300 may provide information to the user regarding metrics associated with either gas or additives. For example, the computer processor can provide the user with information regarding how many carbon dioxide discharges are left, i.e., before the user has to refill. Such processing might be based on the pressure that is left in the onboard canister or gas tank, as described above.

It is appreciated that any of the computer processors described herein may utilize and/or have access to suitable databases. Such databases can store the various data utilized by or generated by the computer processors, for example.

Operation of the container assembly 300 may include inputting ambient conditions and affecting operations based on those ambient conditions. For example, such ambient conditions might include temperature or atmospheric pressure.

In embodiments of the invention, a refill tank 530 is utilized upon a refill station 500 so as to fill onboard gas tanks of container assemblies. In embodiments, the refill tank 530 itself can be connected to a further source of gas, such as a gas hose. In embodiments of the invention, the refill tank 530, after gas therein has been depleted, can simply be switched out with a full refill tank 530.

As described herein, illustrative gas or pneumatic arrangements are provided in systems and methods of the invention. Other known arrangements can be utilized in the invention such as known pipe or hose fittings, for example. Additionally, the refill station 500 is described herein, illustratively, is being a single unitary base. However in other embodiments of the invention, the refill station 500 can be separate, discrete units that are attached by hose or pipe, for example.

In accordance with some embodiments of the invention, a different button can be provided on the container assembly or bottle for each of the additives and for each of the gases. In other embodiments, a same button can be used for additive and gas, with different touches resulting in different action being taken by the container assembly. For example, a quick tap on a button might result in a dispense of additive, where as to hold the button down results in a dispense of both additive and gas. A quick tap on a button might result in a dispense of gas, whereas to hold the button down results in a dispense of both additive and gas. A user can vary an amount or degree that a beverage is carbonated. In accordance with one embodiment, a system of the disclosure can monitor an amount of liquid in the container assembly and limit or constrain an input amount of gas based on such amount of liquid. Such can provide a benefit of precluding a beverage from being over carbonated. As otherwise described herein, additive can be dispensed before gas. Gas can be dispensed before additive. Additive and gas can be dispensed at the same time. The container assembly can output communications regarding any aspect of status of the container assembly.

It will be appreciated that features, elements and/or characteristics described with respect to one embodiment of the disclosure may be variously used with other embodiments of the disclosure as may be desired.

It will be appreciated that the effects of the present disclosure are not limited to the above-mentioned effects, and other effects, which are not mentioned herein, will be apparent to those in the art from the disclosure and accompanying claims.

Although the preferred embodiments of the present disclosure have been disclosed for illustrative purposes, those skilled in the art will appreciate that various modifications, additions and substitutions are possible, without departing from the scope and spirit of the disclosure and accompanying claims.

It is appreciated that the various components of embodiments of the disclosure may be made from any of a variety of materials including, for example, plastic, plastic resin, nylon, composite material, foam, rubber, wood, metal, and/or ceramic, for example, or any other material as may be desired.

A variety of production techniques may be used to make the apparatuses as described herein. For example, suitable injection molding and other molding techniques and other manufacturing techniques might be utilized. Also, the various components of the apparatuses may be integrally formed, as may be desired, in particular when using molding construction techniques. Also, the various components of the apparatuses may be formed in pieces and connected together in some manner, such as with suitable adhesive and/or heat bonding.

The various apparatuses and components of the apparatuses, as described herein, may be provided in various sizes and/or dimensions, as desired.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present.

It will be understood that when an element or layer is referred to as being "onto" another element or layer, the element or layer can be directly on another element or layer or intervening elements or layers. Examples include "attached onto", secured onto", and "provided onto". In contrast, when an element is referred to as being "directly onto" another element or layer, there are no intervening elements or layers present. As used herein, "onto" and "on to" have been used interchangeably.

It will be understood that when an element or layer is referred to as being "attached to" another element or layer, the element or layer can be directly attached to the another element or layer or intervening elements or layers. In contrast, when an element is referred to as being "attached directly to" another element or layer, there are no intervening elements or layers present. It will be understood that such relationship also is to be understood with regard to: "secured to" versus "secured directly to"; "provided to" versus "provided directly to"; and similar language.

As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper", "top", "bottom", "left", "right" and the like, may be used herein for ease of description to describe the relationship of one element or feature to another element(s) or feature(s) as illustrated in the drawing figures. It will be understood that spatially relative terms are intended to encompass different orientations of structures in use or operation, in addition to the orientation depicted in the drawing figures. For example, if a device in the drawing figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein should be interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, as otherwise noted herein, when a particular feature, structure, or characteristic is described in connection with any embodiment, it is submitted that it is within the purview of one skilled in the art to effect and/or use such feature, structure, or characteristic in connection with other ones of the embodiments.

Embodiments are also intended to include or otherwise cover methods of using and methods of manufacturing any or all of the elements disclosed above.

As otherwise described herein, it is appreciated that a feature of one embodiment of the disclosure as described herein may be used in conjunction with features of one or more other embodiments as may be desired.

As used herein, "data" and "information" have been used interchangeably.

Any motorized structure as described herein may utilize gears, linkages, sprocket with chain, or other known mechanical arrangement so as to transfer requisite motion and/or energy.

Hereinafter, further aspects of implementation of the systems and methods of the disclosure will be described.

As described herein, at least some embodiments of the system of the disclosure and various processes, of embodiments, are described as being performed by one or more computer processors. Such one or more computer processors may be in the form of a "processing machine," i.e. a tangibly embodied machine. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data.

The set of instructions may include various instructions that perform a particular task or tasks, such as any of the processing as described herein. Such a set of instructions for performing a particular task may be characterized as a program, software program, code or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example.

As noted above, the machine used to implement the disclosure may be in the form of a processing machine. The processing machine may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the disclosure.

The processing machine used to implement the invention may utilize a suitable operating system. Thus, embodiments of the disclosure may include a processing machine running the Windows 10 operating system, the Windows 8 operating system, Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the disclosure as described above, it is not necessary that the processors and/or the memories of the processing machine be physically located in the same geographical place. That is, each of the processors and the memories used by the processing machine may be located in geographically distinct locations and connected so as to communicate in any suitable manner Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner Additionally, the memory may include two or more portions of memory in two or more physical locations.

To explain further, processing is described above is performed by various components and various memories. However, it is appreciated that the processing performed by two distinct components as described above may, in accordance with a further embodiment of the disclosure, be performed by a single component. Further, the processing performed by one distinct component as described above may be performed by two distinct components. In a similar manner, the memory storage performed by two distinct memory portions as described above may, in accordance with a further embodiment of the disclosure, be performed by a single memory portion. Further, the memory storage performed by one distinct memory portion as described above may be performed by two memory portions.

Further, as also described above, various technologies may be used to provide communication between the various processors and/or memories, as well as to allow the processors and/or the memories of the disclosure to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention on a processing machine, for example. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

A suitable programming language may be used in accordance with the various embodiments of the disclosure. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the systems and methods of the disclosure. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, as also described above, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the disclosure.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods of the disclosure, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example. As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the systems and methods of the disclosure, it is not necessary that a human user actually interact with a user interface used by the processing machine of the disclosure. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the systems and methods of the disclosure may interact partially with another processing machine or processing machines, while also interacting partially with a human user.

It will be readily understood by those persons skilled in the art that the present disclosure is susceptible to broad utility and application. Many embodiments and adaptations of the present disclosure other than those herein described, as well as many variations, modifications and equivalent arrangements, will be apparent from or reasonably suggested by the present disclosure and foregoing description thereof, without departing from the substance or scope of the disclosure.

Accordingly, while the present disclosure has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A container assembly comprising:
   a container having a chamber for holding a liquid; and
   a gas dispensing assembly for providing pressurized carbon dioxide gas to the chamber to carbonate the liquid in the chamber, the gas dispensing assembly including:
      an onboard gas source having a gas tank attached to the chamber and configured to hold the carbon dioxide gas under pressure;
      a gas supply conduit including a gas outlet fluidly coupled to deliver the pressurized carbon dioxide gas from the gas tank into the chamber and a gas supply valve fluidly coupled between the gas tank and the gas outlet, the gas supply valve configured to control a flow of the pressurized carbon dioxide gas from the gas tank to the gas outlet so as to output the pressurized carbon dioxide gas into the chamber; and
      a gas inlet fluidly coupled to the gas tank and configured to receive pressurized carbon dioxide gas to refill the gas tank while the gas tank is attached to the chamber, the gas inlet configured to refill the gas tank by receiving and delivering only the pressurized carbon dioxide gas to the gas tank and without delivery of liquid or carbon dioxide source material, wherein the chamber holding the liquid and the attached gas dispensing assembly including the gas tank are portable and manipulable by hand by a user to drink the liquid from the chamber.

2. The container assembly of claim 1, wherein the gas inlet includes a one-way valve configured to permit flow of pressurized carbon dioxide gas only into the gas tank.

3. The container assembly of claim 1, wherein the gas outlet includes a one-way valve configured to permit flow of the pressurized carbon dioxide gas only into the chamber.

4. The container assembly of claim 1, wherein the chamber is positioned above the gas tank.

5. The container assembly of claim 1, wherein the gas tank is contained in a housing of the container assembly attached to a lower portion of the chamber.

6. The container assembly of claim 5, wherein the housing is threadedly attached to the chamber.

7. The container assembly of claim 1, further comprising a user interface operable by a user to cause the gas supply valve to deliver the pressurized carbon dioxide gas from the gas tank to the chamber.

8. The container assembly of claim 1, wherein the container assembly is configured to be manipulated by hand by a user to drink the liquid from the chamber.

9. The container assembly of claim 1, wherein the gas inlet is located at a bottom of the container assembly and is positioned below the gas tank and the chamber.

10. The container assembly of claim 1, further comprising a housing portion in which the gas tank is located, the housing portion having a recess in which a gas inlet is located to receive pressurized carbon dioxide gas into the gas tank.

11. The container assembly of claim 1, wherein the gas supply valve is controllable to deliver a variable amount of pressurized carbon dioxide gas from the gas tank to the chamber to adjust a carbonation level of the liquid.

12. The container assembly of claim 1, wherein the gas inlet is connected to the gas tank at an inlet location separate from an outlet location at which the gas supply conduit is connected to the gas tank.

13. The container assembly of claim 1, wherein the gas inlet is configured to receive pressurized carbon dioxide gas into the gas tank during a time when the gas supply conduit delivers the pressurized carbon dioxide gas into the beverage chamber.

14. The container assembly of claim 1, wherein the chamber includes an opening and a removable cap configured seal the opening closed, the opening configured to receive the liquid into the chamber.

15. The container assembly of claim 1, further comprising an additive container configured to deliver additive from the additive container into the liquid.

16. The container assembly of claim 1, further comprising a computer processor configured to control the gas supply valve to modulate the flow of the pressurized carbon dioxide gas so as to control an amount of gas that is input into the chamber.

17. The container assembly of claim 1, further comprising a computer processor configured to control the gas supply valve to modulate the flow of the pressurized carbon dioxide gas so as to control an amount or degree that the liquid is carbonated.

18. The container assembly of claim 1, further comprising a drive motor configured to move a portion of the gas supply valve to control the flow of pressurized carbon dioxide gas.

19. The container assembly of claim 1, further comprising a housing portion in which the gas tank is located, the housing portion having a recess configured to sealingly engage with a docking station to receive pressurized carbon dioxide gas from the docking station and into the gas inlet.

20. The container assembly of claim 19, wherein the recess is configured to receive a cylindrically-shaped portion of the docking station into the recess and sealingly engage with an o-ring on the cylindrically-shaped portion.

* * * * *